United States Patent
Thomas et al.

(10) Patent No.: US 9,830,142 B2
(45) Date of Patent: Nov. 28, 2017

(54) AUTOMATIC INSTALLATION OF SELECTED UPDATES IN MULTIPLE ENVIRONMENTS

(71) Applicant: Microsoft Technology Licensing, LLC, Redmond, WA (US)

(72) Inventors: Satish Thomas, Redmond, WA (US); Arunpriyaa Nachimuthu, Bellevue, WA (US); Sri Srinivasan, Redmond, WA (US); Roberto De Lira Garza, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/151,289

(22) Filed: Jan. 9, 2014

(65) Prior Publication Data
US 2015/0082296 A1 Mar. 19, 2015

Related U.S. Application Data

(60) Provisional application No. 61/902,093, filed on Nov. 8, 2013, provisional application No. 61/877,856, filed on Sep. 13, 2013.

(51) Int. Cl.
*G06F 9/45* (2006.01)
*G06F 9/46* (2006.01)
(Continued)

(52) U.S. Cl.
CPC ............ *G06F 8/65* (2013.01); *G06F 8/62* (2013.01); *G06F 8/71* (2013.01); *G06F 11/3696* (2013.01);
(Continued)

(58) Field of Classification Search
CPC ..... G06F 8/61; G06F 8/71; G06F 8/20; G06F 8/30; G06F 8/34; G06F 8/36; G06F 8/67;
(Continued)

(56) References Cited

U.S. PATENT DOCUMENTS 5,495,610 A * 2/1996 Shing ................... G06F 8/71
  709/220
5,790,856 A * 8/1998 Lillich ................. G06F 8/65
  717/163

(Continued)

FOREIGN PATENT DOCUMENTS

WO 2004057463 A2 7/2004
WO 2005033934 A2 4/2005

OTHER PUBLICATIONS

Barbara G. Ryder et al., Change Impact Analysis for Object-Oriented Programs, Jun. 2001, [Retrieved on May 23, 2016]. Retrieved from the internet: <URL: http://delivery.acm.org/10.1145/380000/379661/p46-ryder.pdf?> 8 Pages (46-53).*

(Continued)

*Primary Examiner* — Tuan Q Dam
*Assistant Examiner* — Anibal Rivera
(74) *Attorney, Agent, or Firm* — Christopher J. Volkmann; Kelly, Holt & Christenson, PLLC

(57) ABSTRACT

An update installer generates an update display for a user that allows the user to select updates be applied to a first environment. An export display allows the user to export the selected updates so they can be saved for installation in another environment.

17 Claims, 47 Drawing Sheets

(51) Int. Cl.
*G06F 9/445* (2006.01)
*G06F 9/44* (2006.01)
*G06F 11/36* (2006.01)

(52) U.S. Cl.
CPC .............. *G06F 8/68* (2013.01); *G06F 9/4448* (2013.01); *G06F 11/3688* (2013.01)

(58) Field of Classification Search
CPC ... G06F 8/65; G06F 8/38; G06F 17/30; G06F 17/30091; G06F 17/30117; G06F 17/3012; G06F 8/62; G06F 8/63; G06F 11/3664; G06F 9/45529; G06F 9/4446; G06F 8/68; G06F 8/60; G06F 8/453; G06F 17/30377; G06F 8/433; G06F 8/70; G06F 8/78; G06F 11/3696; G06F 11/3688; G06F 11/3672; G06F 9/4448; G06F 9/4433
See application file for complete search history.

(56) References Cited

U.S. PATENT DOCUMENTS

| | | | |
|---|---|---|---|
| 5,860,007 A | | 1/1999 | Soni et al. |
| 5,892,953 A | * | 4/1999 | Bhagria ................ G06F 8/60 714/1 |
| 5,898,872 A | * | 4/1999 | Richley ................ G06F 8/78 713/100 |
| 6,381,694 B1 | | 4/2002 | Yen |
| 6,425,126 B1 | | 7/2002 | Branson et al. |
| 6,477,703 B1 | | 11/2002 | Smith et al. |
| 6,964,044 B1 | | 11/2005 | Hudson et al. |
| 7,024,471 B2 | | 4/2006 | George et al. |
| 7,055,130 B2 | | 5/2006 | Charisius et al. |
| 7,069,547 B2 | | 6/2006 | Glaser |
| 7,076,778 B2 | | 7/2006 | Brodersen et al. |
| 7,096,464 B1 | | 8/2006 | Weinmann |
| 7,127,707 B1 | | 10/2006 | Mishra et al. |
| 7,194,475 B2 | * | 3/2007 | DelMonaco ............. G06F 8/70 |
| 7,278,163 B2 | | 10/2007 | Banzhof et al. |
| 7,313,792 B2 | | 12/2007 | Buban et al. |
| 7,318,226 B2 | | 1/2008 | Chefalas et al. |
| 7,334,222 B2 | | 2/2008 | Keller |
| 7,516,367 B1 | | 4/2009 | Beltowski et al. |
| 7,529,780 B1 | | 5/2009 | Braginsky et al. |
| 7,536,678 B2 | | 5/2009 | Kothari et al. |
| 7,565,419 B1 | | 7/2009 | Kwiatkowski et al. |
| 7,577,948 B2 | | 8/2009 | Zomaya et al. |
| 7,614,042 B1 | | 11/2009 | Hardy et al. |
| 7,614,046 B2 | | 11/2009 | Daniels et al. |
| 7,624,086 B2 | | 11/2009 | Keith |
| 7,624,393 B2 | | 11/2009 | Egan et al. |
| 7,676,448 B2 | | 3/2010 | Henderson et al. |
| 7,702,497 B2 | | 4/2010 | Dombrowski et al. |
| 7,716,077 B1 | | 5/2010 | Mikurak |
| 7,735,080 B2 | | 6/2010 | Barturen et al. |
| 7,778,963 B2 | | 8/2010 | Novik et al. |
| 7,788,119 B2 | | 8/2010 | Najmi et al. |
| 7,895,592 B2 | | 2/2011 | Subramanian et al. |
| 7,945,906 B2 | | 5/2011 | Bourke-Dunphy et al. |
| 7,966,278 B1 | | 6/2011 | Satish |
| 7,966,346 B1 | * | 6/2011 | Jameson ................ G06F 8/71 707/625 |
| 7,975,265 B2 | | 7/2011 | Schnoebelen et al. |
| 8,074,213 B1 | | 12/2011 | Holtz |
| 8,176,483 B2 | | 5/2012 | Hoefler et al. |
| 8,185,888 B2 | | 5/2012 | Duplessis et al. |
| 8,224,472 B1 | | 7/2012 | Maluf et al. |
| 8,245,216 B2 | | 8/2012 | Felts |
| 8,402,452 B2 | | 3/2013 | Baratti et al. |
| 8,418,150 B2 | | 4/2013 | Thirumalai et al. |
| 8,429,610 B2 | | 4/2013 | Clemm et al. |
| 8,516,308 B1 | | 8/2013 | Gill |
| 8,516,471 B2 | | 8/2013 | Bhakta et al. |
| 8,516,477 B1 | | 8/2013 | Kearns et al. |
| 8,539,477 B2 | | 9/2013 | Balascio et al. |
| 8,555,273 B1 | | 10/2013 | Chia et al. |
| 8,566,391 B2 | | 10/2013 | Saito et al. |
| 8,635,608 B2 | | 1/2014 | Ramesh et al. |
| 8,677,348 B1 | | 3/2014 | Ramanathpura et al. |
| 8,701,078 B1 | | 4/2014 | Holler et al. |
| 8,713,525 B2 | | 4/2014 | Attalla |
| 8,745,611 B2 | | 6/2014 | Saraf et al. |
| 8,782,606 B1 | * | 7/2014 | Cohen ................ G06F 11/3672 717/124 |
| 8,782,608 B2 | | 7/2014 | Ackerman et al. |
| 8,799,044 B2 | | 8/2014 | Sudarshan et al. |
| 8,806,450 B1 | * | 8/2014 | Maharana ........... G06F 11/3688 717/133 |
| 8,839,222 B1 | * | 9/2014 | Brandwine ............. G06F 11/36 717/168 |
| 8,881,136 B2 | | 11/2014 | DeJana et al. |
| 8,886,571 B2 | | 11/2014 | Mannava et al. |
| 9,026,851 B2 | | 5/2015 | Mondal et al. |
| 9,122,422 B2 | | 9/2015 | Johnston et al. |
| 9,348,585 B2 | | 5/2016 | Eliá et al. |
| 2001/0052108 A1 | | 12/2001 | Bowman-Amuah |
| 2002/0099728 A1 | | 7/2002 | Lees |
| 2002/0198750 A1 | | 12/2002 | Innes et al. |
| 2003/0046675 A1 | * | 3/2003 | Cheng ................ G06F 8/62 717/173 |
| 2003/0051236 A1 | * | 3/2003 | Pace ................ G06F 8/60 717/177 |
| 2003/0172368 A1 | | 9/2003 | Alumbaugh et al. |
| 2003/0218628 A1 | * | 11/2003 | Deshpande ........... G06F 9/4446 715/738 |
| 2003/0221182 A1 | * | 11/2003 | Tip ................ G06F 9/4433 717/116 |
| 2003/0221190 A1 | * | 11/2003 | Deshpande .............. G06F 8/61 717/171 |
| 2004/0006704 A1 | | 1/2004 | Dahlstrom et al. |
| 2004/0015918 A1 | | 1/2004 | Kawahito et al. |
| 2004/0122870 A1 | | 6/2004 | Park et al. |
| 2004/0123234 A1 | * | 6/2004 | Anderson ............. G06F 9/4448 715/751 |
| 2004/0143811 A1 | | 7/2004 | Kaelicke et al. |
| 2004/0210653 A1 | * | 10/2004 | Kanoor ................ G06F 8/65 709/223 |
| 2004/0255290 A1 | | 12/2004 | Bates et al. |
| 2005/0044187 A1 | | 2/2005 | Jhaveri et al. |
| 2005/0055686 A1 | * | 3/2005 | Buban ................ G06F 8/65 717/170 |
| 2005/0132348 A1 | * | 6/2005 | Meulemans ............ G06F 8/65 717/168 |
| 2005/0132349 A1 | * | 6/2005 | Roberts ................ G06F 8/65 717/168 |
| 2005/0132359 A1 | * | 6/2005 | McGuire ................ G06F 8/68 717/175 |
| 2005/0144619 A1 | | 6/2005 | Newman |
| 2005/0177617 A1 | | 8/2005 | Banginwar et al. |
| 2005/0223117 A1 | | 10/2005 | Terry et al. |
| 2006/0020937 A1 | | 1/2006 | Schaefer |
| 2006/0064666 A1 | | 3/2006 | Amaru et al. |
| 2006/0075001 A1 | | 4/2006 | Canning et al. |
| 2006/0080656 A1 | | 4/2006 | Cain et al. |
| 2006/0106806 A1 | | 5/2006 | Sperling et al. |
| 2006/0117310 A1 | * | 6/2006 | Daniels ................ G06F 8/68 717/168 |
| 2006/0123022 A1 | | 6/2006 | Bird |
| 2006/0130040 A1 | | 6/2006 | Subramanian ........... G06F 8/65 717/168 |
| 2006/0130046 A1 | | 6/2006 | O'Neill |
| 2006/0136327 A1 | * | 6/2006 | You ................ G06Q 40/025 705/38 |
| 2006/0200658 A1 | | 9/2006 | Penkethman |
| 2006/0218548 A1 | | 9/2006 | Mason et al. |
| 2006/0282830 A1 | | 12/2006 | Kavalam et al. |
| 2007/0021116 A1 | | 1/2007 | Okita et al. |
| 2007/0033276 A1 | * | 2/2007 | Brockhoff ............ G06Q 10/06 709/224 |
| 2007/0061732 A1 | | 3/2007 | Bobbin et al. |
| 2007/0074172 A1 | | 3/2007 | Bird et al. |

(56) References Cited

U.S. PATENT DOCUMENTS

| | | | |
|---|---|---|---|
| 2007/0106978 A1 | 5/2007 | Felts | |
| 2007/0106979 A1 | 5/2007 | Felts | |
| 2007/0106980 A1 | 5/2007 | Felts | |
| 2007/0113225 A1 | 5/2007 | Felts | |
| 2007/0130561 A1 | 6/2007 | Siddaramappa et al. | |
| 2007/0143735 A1* | 6/2007 | Clemm | G06F 8/71 717/100 |
| 2007/0168201 A1 | 7/2007 | Chellam | |
| 2007/0169079 A1* | 7/2007 | Keller | G06F 8/65 717/168 |
| 2007/0180075 A1 | 8/2007 | Chasman et al. | |
| 2007/0198599 A1 | 8/2007 | Tobies | |
| 2007/0220506 A1 | 9/2007 | Maruyama | |
| 2007/0220510 A1* | 9/2007 | Bell | G06F 9/4446 717/174 |
| 2007/0226794 A1 | 9/2007 | Howcroft et al. | |
| 2007/0277167 A1 | 11/2007 | Smith et al. | |
| 2007/0282914 A1 | 12/2007 | Sivapragasam et al. | |
| 2007/0283321 A1 | 12/2007 | Hegde et al. | |
| 2008/0033700 A1* | 2/2008 | Kano | G06F 17/50 703/1 |
| 2008/0071844 A1 | 3/2008 | Gopal et al. | |
| 2008/0109791 A1 | 5/2008 | Carteri et al. | |
| 2008/0134145 A1 | 6/2008 | Halcrow et al. | |
| 2008/0162509 A1* | 7/2008 | Becker | G06F 17/30377 |
| 2008/0201701 A1* | 8/2008 | Hofhansl | G06F 8/60 717/168 |
| 2008/0201702 A1 | 8/2008 | Bunn | |
| 2008/0215349 A1 | 9/2008 | Baran et al. | |
| 2008/0262860 A1 | 10/2008 | Schneider et al. | |
| 2008/0288934 A1* | 11/2008 | Ozawa | G06F 8/68 717/168 |
| 2008/0295086 A1* | 11/2008 | Greenwood | G06F 8/65 717/168 |
| 2008/0313626 A1* | 12/2008 | Kodaka | G06F 8/65 717/168 |
| 2009/0144756 A1 | 6/2009 | Inami | |
| 2009/0182567 A1* | 7/2009 | Stine | G06Q 10/06 705/348 |
| 2009/0216712 A1 | 8/2009 | Cohen et al. | |
| 2009/0271696 A1 | 10/2009 | Bailor et al. | |
| 2009/0307650 A1 | 12/2009 | Saraf et al. | |
| 2010/0023919 A1 | 1/2010 | Chaar et al. | |
| 2010/0063855 A1 | 3/2010 | Nguyen | |
| 2010/0082803 A1 | 4/2010 | Nguyen | |
| 2010/0095273 A1 | 4/2010 | Matthiesen | |
| 2010/0131939 A1 | 5/2010 | Hieb et al. | |
| 2010/0138812 A1* | 6/2010 | Narayanan | G06F 11/3696 717/131 |
| 2010/0153908 A1 | 6/2010 | Sarkar et al. | |
| 2010/0191623 A1 | 7/2010 | Macy et al. | |
| 2010/0235823 A1 | 9/2010 | Garbers et al. | |
| 2010/0275263 A1 | 10/2010 | Bennett et al. | |
| 2010/0299653 A1* | 11/2010 | Iyer | G06F 8/65 717/121 |
| 2010/0306651 A1* | 12/2010 | Quennesson | G06F 8/71 715/704 |
| 2010/0313179 A1 | 12/2010 | Groves et al. | |
| 2011/0016461 A1 | 1/2011 | Bankston et al. | |
| 2011/0041124 A1 | 2/2011 | Fishman et al. | |
| 2011/0055544 A1 | 3/2011 | Vidal et al. | |
| 2011/0099050 A1* | 4/2011 | Coldicott | G06Q 10/06 705/7.37 |
| 2011/0113493 A1* | 5/2011 | Moore | G06F 21/105 726/30 |
| 2011/0173266 A1* | 7/2011 | Ohashi | G06Q 10/10 709/205 |
| 2011/0197099 A1 | 8/2011 | Mahajan et al. | |
| 2011/0225575 A1* | 9/2011 | Ningombam | G06F 8/65 717/170 |
| 2011/0231828 A1 | 9/2011 | Kaulgud et al. | |
| 2011/0265077 A1 | 10/2011 | Collison et al. | |
| 2011/0296394 A1* | 12/2011 | Vidal | G06F 8/453 717/171 |
| 2011/0307336 A1 | 12/2011 | Smirnov et al. | |
| 2011/0307798 A1 | 12/2011 | Lezama et al. | |
| 2012/0030658 A1 | 2/2012 | Hu et al. | |
| 2012/0053936 A1 | 3/2012 | Cardno et al. | |
| 2012/0060144 A1 | 3/2012 | Novak et al. | |
| 2012/0089964 A1 | 4/2012 | Sawano | |
| 2012/0166458 A1 | 6/2012 | Laudanski et al. | |
| 2012/0174073 A1 | 7/2012 | Rajopadhye | |
| 2012/0210294 A1 | 8/2012 | Gores | |
| 2012/0232948 A1 | 9/2012 | Wolf et al. | |
| 2013/0036415 A1* | 2/2013 | Birtwhistle | G06F 8/65 717/173 |
| 2013/0042221 A1* | 2/2013 | Mehalingam | G06F 8/433 717/123 |
| 2013/0042227 A1 | 2/2013 | Little et al. | |
| 2013/0060489 A1 | 3/2013 | Crossman et al. | |
| 2013/0061167 A1 | 3/2013 | Rhodes et al. | |
| 2013/0132777 A1 | 5/2013 | Froehlich et al. | |
| 2013/0159989 A1* | 6/2013 | Deckert | G06F 8/61 717/172 |
| 2013/0179868 A1 | 7/2013 | Greifeneder et al. | |
| 2013/0268914 A1* | 10/2013 | Oslake | G06F 8/30 717/120 |
| 2014/0047427 A1* | 2/2014 | Evans | G06F 9/45529 717/168 |
| 2014/0100676 A1 | 4/2014 | Scott et al. | |
| 2014/0201573 A1 | 7/2014 | Huang et al. | |
| 2014/0331200 A1 | 11/2014 | Wadhwani et al. | |
| 2014/0337982 A1 | 11/2014 | Crosby et al. | |
| 2015/0058822 A1 | 2/2015 | Eliás et al. | |

OTHER PUBLICATIONS

K. H. Bennett et al., Software Maintenance and Evolution: a Roadmap, ACM 2000, [Retrieved on May 23, 2016]. Retrieved from the internet: <URL: http://delivery.acm.org/10.1145/340000/336534/p73-bennett.pdf?> 14 Pages (73-87).*

Shawn A. Bohner, Impact Analysis in the Software Change Process: A Year 2000 Perspective, 1996 IEEE, [Retrieved on Aug. 23, 2016]. Retrieved from the internet: <URL: http://ieeexplore.ieee.org/stamp/stamp.jsp?arnumber=564987> 10 Pages. (42-51).*

James Law et al., Whole Program Path-Based Dynamic Impact Analysis, 2003 IEEE, [Retrieved on Aug. 23, 2016]. Retrieved from the internet: <URL: http://ieeexplore.ieee.org/stamp/stamp.jsp?arnumber=1201210> 11 Pages. (1-11).*

L.C. Briand et al., Impact Analysis and Change Management of UML Models, 2003 IEEE, [Retrieved on Jul. 11, 2017]. Retrieved from the internet: <URL: http://ieeexplore.ieee.org/stamp/stamp.jsp?arnumber=1235428> 10 Pages (1-10).*

Barbara G. Ryder et al., Change impact analysis for object-oriented programs, 2001, [Retrieved on Jul. 11, 2017]. Retrieved from the internet: <URL: http://dl.acm.org/citation.cfm?id=379661> 8 Pages (46-53).*

International Search Report and Written Opinion for International Application No. PCT/US2014/054631, mailing date: Nov. 24, 2014, filing date: Sep. 9, 2014, 13 pages.

International Search Report and Written Opinion for International Application No. PCT/US2014/054632, mailing date: Nov. 24, 2014, filing date: Sep. 9, 2014, 12 pages.

International Search Report and Written Opinion for International Application No. PCT/US2014/055285, mailing date: Dec. 2, 2014, filing date: Sep. 12, 2014, 13 pages.

Prosecution History for U.S. Appl. No. 14/151,296 including: Response to Notice to File Corrected Application Papers dated Apr. 15, 2014, Notice to File Corrected Application Papers dated Jan. 27, 2014 and Application and Drawings filed Jan. 9, 2014, 90 pages.

Application and Drawings for U.S. Appl. No. 14/152,694, filed Jan. 10, 2014, 84 pages.

Application and Drawings for U.S. Appl. No. 14/151,306, filed Jan. 9, 2014, 84 pages.

Application and Drawings for U.S. Appl. No. 14/151,329, filed Jan. 9, 2014, 84 pages.

(56) References Cited

OTHER PUBLICATIONS

"Prism Deploy", Published on: Jun. 3, 2002, Available at: http://amtsoft.com/prismdeploy/.
Cordero V, Randall, "Apply updates to database, AOS, and clients [AX 2012]", Published on: Dec. 21, 2013, Available at: http://technet.microsoft.com/en-us/library/hh538446.aspx.
"Update System Center 2012 Configuration Manager", Published on: Aug. 1, 2013, Available at: http://technet.microsoft.com/en-us/library/jj553405.aspx.
"SQL Server Distributed Replay", Published on: Apr. 24, 2012, Available at: http://technet.microsoft.com/en-us/library/ff878183.aspx.
"Managing Multiple Environments from Development to Production", Published on: Jan. 18, 2012, Available at: http://docs.oracle.com/cd/B28359_01/owb.111/b31280/configs_11.htm#WBINS12301.
Dunagan, et al., "Towards a Self-Managing Software Patching Process Using Black-Box Persistent-State Manifests", In Technical Report, MSR-TR-2004-23, Mar. 21, 2004, 9 pages.
Terry, et al., "Managing Update Conflicts in Bayou, a Weakly Connected Replicated Storage System", In Proceedings of the 15th ACM Symposium on Operating Systems Principles, Dec. 3, 1995, 12 pages.
"JD Edwards EnterpriseOne Tools—Software Updates Guide", Published On: Mar. 2011, Available at: http://docs.oracle.com/cd/E17984_01/doc.898/e14719.pdf.
"Apply Updates and Hotfixes [AX 2012]", Published On: Jun. 19, 2013, Available at: http://technet.microsoft.com/en-us/library/hh335183.aspx.
Sherriff, et al., "Empirical Software Change Impact Analysis using Singular Value Decomposition", In 1st International Conference on Software Testing, Verification, and Validation, 10 pages.
Prosecution History for U.S. Appl. No. 14/151,306 including: Non-Final Office Action dated Jun. 23, 2015, Response to Notice to File Missing Parts dated Mar. 6, 2014 and Notice to File Missing Parts dated Jan. 27, 2014, 24 pages.
Non-Final Office Action for U.S. Appl. No. 14/151,329 dated Jun. 23, 2015, 18 pages.
Prosecution History for U.S. Appl. No. 14/152,694 including: Non-Final Office Action dated Jul. 14, 2015, Response to Notice to File Missing Parts dated Apr. 8, 2014 and Notice to File Missing Parts dated Jan. 28, 2014, 29 pages.
"Second Written Opinion Received for PCT Patent Application No. PCT/US2014/054631", Mailed Date: Jul. 21, 2015, 6 Pages.
The Second Written Opinion for International Application No. PCT/US2014/054632, mailing date: Aug. 25, 2015, filing date: Sep. 9, 2014, 9 pages.
Amendment for U.S. Appl. No. 14/151,306 dated Sep. 23, 2015, 12 pages.
Amendment for U.S. Appl. No. 14/151,329 dated Sep. 23, 2015, 12 pages.
Amendment for U.S. Appl. No. 14/152,694 dated Oct. 13, 2015, 13 pages.
Microsoft, Software Update Management Using SMS 2003, Mar. 15, 2007, [Retrieved on Oct. 30, 2015]. Retrieved from the internet: <URL:http://www.google.com/url?sa=t&rct=j&q=&esrc=s&source=web&cnload%2Ff%2F6%2Fa%2Ff6acc021-a05a-48a1-88e2->103 pages.
Non-Final Office Action for U.S. Appl. No. 14/151,306 dated Nov. 13, 2015, 23 pages.
Final Office Action for U.S. Appl. No. 14/152,694 dated Nov. 13, 2015, 27 pages.
Final Office Action for U.S. Appl. No. 14/151,329 dated Nov. 16, 2015, 25 pages.
International Preliminary Report on Patentability for International Application No. PCT/US2014/054631, date of mailing: Dec. 11, 2015, date of filing: Sep. 9, 2014, 21 pages.
International Preliminary Report on Patentability for International Application No. PCT/US2014/054632, date of mailing: Dec. 17, 2015, date of filing: Sep. 9, 2014, 16 pages.
Prosecution History for U.S. Appl. No. 14/151,329 including: Final Office Action dated Feb. 3, 2016, Applicant Initiated Interview Summary dated Feb. 3, 2016, and Interview Summary dated Jan. 26, 2016, 28 pages.
Amendment With RCE for U.S. Appl. No. 14/152,694 dated Feb. 3, 2016, 16 pages.
Amendment for U.S. Appl. No. 14/151,306 dated Feb. 26, 2016, 13 pages.
Final Office Action for U.S. Appl. No. 14/151,306 dated Mar. 31, 2016, 18 pages.
Michelle L. Lee, "Change Impact Analysis of Object-Oriented Software", 1998, [Retrieved on Mar. 18, 2016], Retrieved from the Internet:<URL:http://cs.gmu.edu/~offutt/rsrch/LiLiDiss.pdf>202 pages.
Prosecution History for U.S. Appl. No. 14/151,329 including: Applicant Initiated Interview Summary dated May 10, 2016 and Amendment with RCE dated May 3, 2016, 18 pages.
Jyotish Gogoi, "SAP Software Update Manager Tool—SPS Update Demo—Part I", Dated Mar. 20, 2012 [Retrieved on Sep. 2, 2016]. Retrieved from the Internet: <URL:http://scn.sap.com/docs/DOC-25113>6 pages.
Konnie Daglis, et al. "Software Update Manager (SUM) for SAP Solutions", Dated May 14, 2012 [Retrieved on Sep. 2, 2016]. Retrieved from the Internet: <URL:http://events.asug.com/2012AC/1602_Software_Update_Manager_for_SAP_Solutions.pdf>26 pages.
ALM Solution Management, "Test Automation with SAP Solution Manager 7.1 and HP QTP", Dated Sep. 2012 [Retrieved on Sep. 2, 2016]. Retrieved from the Internet: <URL:http://www.sdn.sap.com/irj/scn/go/portal/prtroot/docs/library/uuid/e01fcb07-691b-3010-48b8-cf2881e14a64?overridelayout=true>31 pages.
Enda O'Connor, "Patch Management Best Practices", Dated Apr. 2008 [Retrieved on Sep. 9, 2016]. Retrieved from the Internet: <URL:http://www.oracle.com/technetwork/systems/articles/patch-management-jsp-135385.html>4 pages.
David Marshall, "Patch Management Best Practices", Dated Apr. 23, 2013 [Retrieved on Sep. 2, 2016]. Retrieved from the Internet: <URL: http://www.infoworld.com/article/2614556/server-virtualization/vmware-sells-off-shavlik-patch-management-to-landesk.html>3 pages.
ManageEngine, "Automated Patch Management for Windows", Undated [Retrieved on Sep. 2, 2016]. Retrieved from the Internet: <URL: http://www.infoworld.com/article/2614556/server-virtualization/vmware-sells-off-shavlik-patch-management-to-landesk.html>2 pages.
"Oracle 6 Using the Software Update Impact Analysis Tool", retrieved from, <https://docs.oracle.com/cd/E24705_01/doc.91/e24260/impactanalysistool.htm#EOTSU00104> accessed on Sep. 29, 2016. Believed to have been publically available at least as of Aug. 2013. 10 pages.
"Business Process Change Analyzer in SAP Solution Manager 7-1", retrieved from: <http://sapassets.edgesuite.net/sapcomidocs/2015/07/9a426487-5b7c-0010-82c7-eda71a1511fa,pdf> accessed on Sep. 29, 2016, dated Jul. 11, 2012, Believed to have been publically available at least as of Aug. 2013, 13 pages.
"SAP Solution Manager 7.1 Business Process Change Analyzer (BPCA)", retrieved from: <https://supportsap.com/content/dam/library/SAP%20Support%20Portal/support-programs-services/solution-manager/processes/Media%20Library/Test%20Management/Overview%20of%20Business%20Process%20Change%20Analyzer(BPCA).pdf>, accessed on Sep. 29, 2016, Believed to have been publically available at least as of Aug. 2013, 115 pages.
"Test Management with SAP Solution Manager 7.1", retrieved from: <https://support.sap.com/content/dam/library/SAP%20Support%20Portal/support-programs-services/solution-manager/processes/Media%20Library/Test%20Managernent/SAP/%20Test%20Management%20with%20SAP%20SolMan%207.1.pdf>, accessed on Sep. 29, 2016. Believed to have been publically available at least as of Aug. 2013, 85 pages.
Amendment for U.S. Appl. No. 14/152,694 dated Nov. 15, 2016, 15 pages.
Amendment for U.S. Appl. No. 14/151,296 dated Nov. 11, 2016, 12 pages.

(56) References Cited

OTHER PUBLICATIONS

Notice of Allowance for U.S. Appl. No. 14/151,306 dated Dec. 6, 2016, 25 pages.
Chi-Keung Luk et al., "Pin: Building Customized Program Analysis Tools with Dynamic Instrumentation", ACM 2005, [Retrieved on Sep. 1, 2016], Retrieved from the Internet <URL:http://gram.eng.uci.edu/students/swallace/papers_wallace/pdf/PLDI-05-Pin.pdf>11 pages.
Non-Final Office Action for U.S. Appl. No. 14/152,694 dated Jul. 15, 2016, 33 pages.
Notice of Allowance for U.S. Appl. No. 14/151,329 dated Jul. 13, 2016, 23 pages.
Chengzheng Sun et al., "A Multi-version Approach to Conflict Resolution in Distributed Groupware Systems", 2000 [Retrieved on Jun. 8, 2016]. Retrieved from the Internet <URL:http://ieeexplore.ieee.org/stamp/stamp.jsp.?tp=&arnumber=840944>10 pages. (1-10).
tra Brosch et al., "We can work it out: Collaborative Conflict Resolution in Model Versioning", Sep. 2009, [Retrieved on Jun. 8, 2016]. Retrieved from the Internet: <URL:http://download.springer.com/static/pdf/607/chp%253A10.1007%252F978-1-84882-854-4_12.pdf>8 pages (207-214).
Amendment with RCE for U.S. Appl. No. 14/151,306 dated Aug. 1, 2016, 16 pages.
Non-Final Office Action for U.S. Appl. No. 14/151,296 dated Aug. 12, 2015, 23 pages.
Final Office Action for U.S. Appl. No. 14/151,306 dated Dec. 21, 2016, 18 pages.
Amendment After Notice of Allowance for U.S. Appl. No. 14/151,306 dated Dec. 15, 2016, 9 pages.
Final Office Action for U.S. Appl. No. 14/152,694 dated Dec. 23, 2016, 25 pages.
Non-Final Office Action for U.S. Appl. No. 14/151,296 dated May 19, 2017, 19 pages.
Amendment with RCE for U.S. Appl. No. 14/151,296 dated Apr. 21, 2017, 15 pages.
Jonghyun Park et al., "Monitoring Impact Events Using a System-Identification Method", AIAA Journal vol. 47, No. 9, Sep. 2009, [Retrieved on Feb. 24, 2017], Retrieved from the Internet:<URL:http://arc.aiaa.org/doi/ pdf/10.2514/1.34895?>11 pages.
Olivier Crameri et al., "Staged Deployment in Mirage, an Integrated Software Upgrade Testing and Distribution System", Oct. 14-17, 2007, [Retrieved on Feb. 24, 2017], Retrieved from the Internet:<URL:http://delivery.acm.org/10.1145/1300000/1294283/p221-crameri.pdf?>, 16 pages.
Notice of Allowance for U.S. Appl. No. 14/152,694 dated Mar. 2, 2017, 17 pages.
Shawn A. Bohner, "Impact Analysis in the Software Change Process: A Year 2000 Perspective", 1996 IEEE, 10 pages.
Advisory Action for U.S. Patent Appl. No. 14/151,296 dated Feb. 24 2017, 5 pages.

\* cited by examiner

ACME UPDATE INSTALLER

Prerequisite validation results
The following prerequisites are required to install the selected components. For more information on a specific prerequisite, click the link in the status column.

| | Prerequisite | Status | Download | Configure |
|---|---|---|---|---|
| | Internet Information Services (IIS) | Error | | |
| | ACME.NET Framework 4.5 | Success | Link | |
| | Computer restart pending | Success | | |
| | Domain user account | Success | | |
| | Local administrator | Success | | |
| | Something else | Success | | |
| | Another thing | Success | | |
| | Etc. | Success | | |
| | Etc. | Success | | |
| | Etc. | Success | | |
| | Etc. | Success | | |
| | If more lines, show scroll bar on right. | Success | | |

Total  102
Error    2
Warning  0
Success 100

Welcome
Software license terms
Update configuration
   Select packages
   Specify a service account
   Specify SSIS location
   Choose a model store
   Select type of installation
   Select application updates
   Review updates
Ready to install
Installation progress
Complete View report
View log file
View log directory

262

282

284

[ < Back ] [ Configure ] [ Revalidate ] [ Next > ] [ Cancel ]

FIG. 6

ACME UPDATE INSTALLER

Specify a service account
Specify an account for Data Import/Export Framework service.

/ 288

Welcome
Software license terms
Update configuration
  Select packages
  Specify a service account
  Specify SSIS location
  Choose a model store
  Select type of installation
  Select application updates
  Review updates
Ready to install
Installation progress
Complete

262

Specify an account that has dbdatareader and dbdatawriter access to the business and model store databases, as well as administrator rights to ACME Business System.

We recommend that you use the same account that is used for the AOS service.

Domain/User name    290

Password    292

Details

< Back    Next >    Cancel

AUTOMATIC INSTALLATION OF SELECTED UPDATES IN MULTIPLE ENVIRONMENTS

CROSS-REFERENCE TO RELATED APPLICATION

The present application is based on and claims the benefit of U.S. provisional patent application Ser. No. 61/877,856, filed Sep. 13, 2013, and U.S. provisional patent application Ser. No. 61/902,093, filed Nov. 8, 2013, the content of which is hereby incorporated by reference in its entirety.

BACKGROUND

Computer systems are currently in wide use. Some such systems are customized (some significantly) before they are deployed at an end user's site. Such systems often also have updates which can be installed.

By way of example, some such computer systems include business systems, such as customer relations management (CRM) systems, enterprise resource planning (ERP) systems, line-of-business (LOB) systems, etc. In these types of systems, a general business system is first purchased by a user or customer, and the user or customer often makes customizations, extensions or other modifications to that general business system, in order to obtain their own customized deployment.

Such systems often have updates published for them. The updates can include new releases, as well as bug fixes. For instance, when new releases of the business system are generated, they are often followed by a number of bug fixes for problems that were not fixed prior to release. The fixes are normally released, piecemeal, as they are generated. Periodically, however, a cumulative update package is released which includes all of the fixes generated, to that point. This may, for example, include hundreds or even thousands of fixes.

When customers wish to apply the fixes from the cumulative update to their own customer product, they have conventionally had to either apply all of the fixes in the cumulative update, or none of them. There has not been any ability to pick and choose which specific customizations to apply, from a cumulative update.

Further, a user may apply multiple different fixes to their product over time. It can be difficult for the user to know the comprehensive update status of the product. This is not tracked or stored.

Also, in such business systems, it is not uncommon for users to be operating in multiple different environments. For instance, a user may be a developer that is operating in a development environment, and a test environment, or multiple development and test environments. Similarly, where a product has been deployed, there may be a production environment as well, among other environments.

It is currently difficult for a user to decide whether to apply any updates, and if so, which ones. If the user operates in multiple environments, the user may need to apply the selected updates in all environments. This is time consuming. Also, the user is unable to determine how the updates will affect the underlying business processes and objects within the business system, before they are applied. Further, if the user chooses to apply all of the updates in the cumulative update, there are often conflicts. That is, a user's customization may conflict with an applied update. It can take the user a great deal of time and effort to resolve such conflicts.

The discussion above is merely provided for general background information and is not intended to be used as an aid in determining the scope of the claimed subject matter.

SUMMARY

An update installer generates an update display for a user that allows the user to select updates be applied to a first environment. An export display allows the user to export the selected updates so they can be saved for installation in another environment.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIGS. 1B-1 to 1B-3 (collectively referred to as FIG. 1B) show a flow diagram illustrating one embodiment of the overall operation of the architecture shown in FIG. 1.

FIGS. 2-33 are illustrative user interface displays.

DETAILED DESCRIPTION

Figure 1:
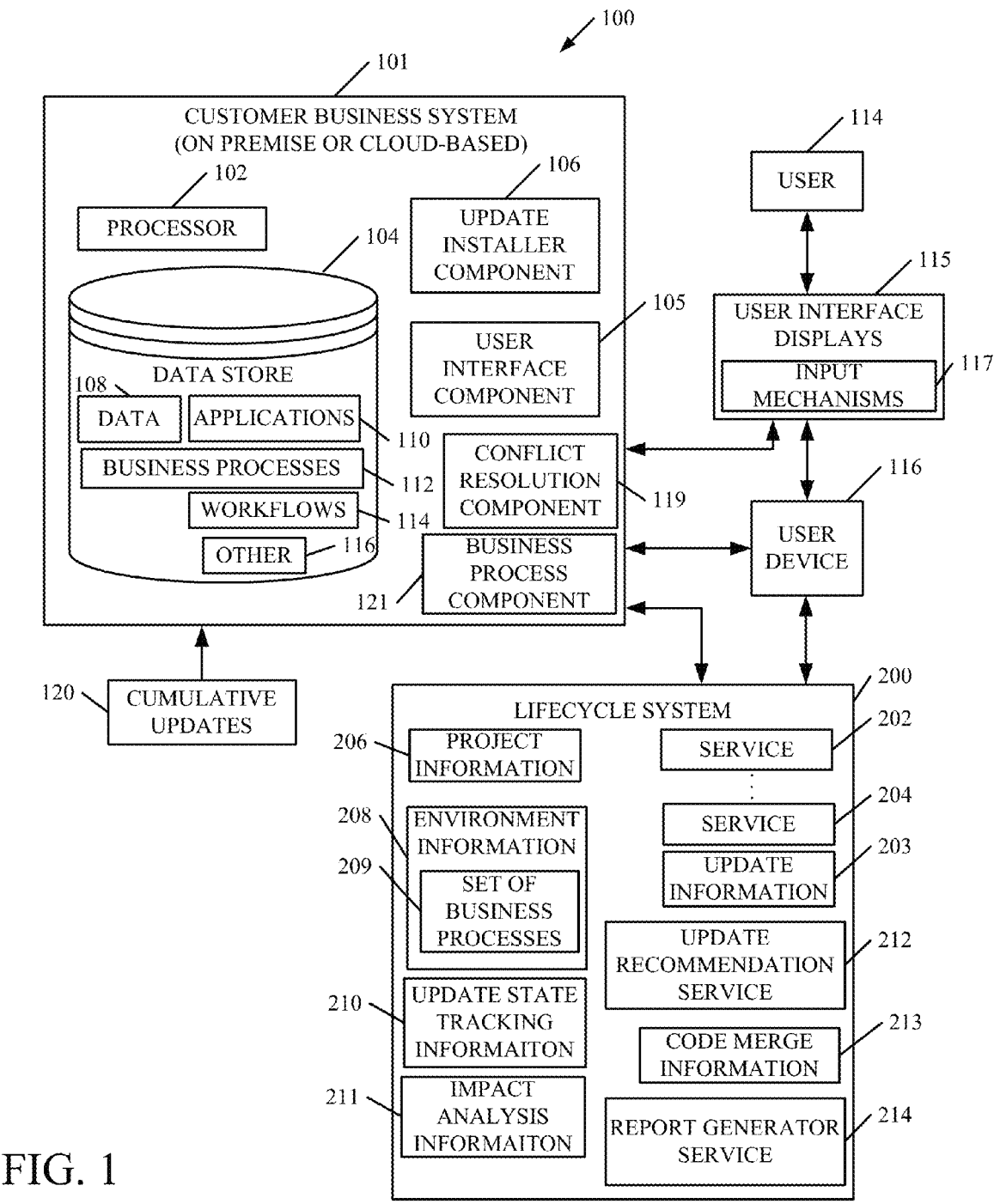
FIG. 1 is a block diagram of one illustrative update architecture.

FIG. 1 shows a block diagram of one illustrative architecture 100. Architecture 100 includes customer business system 101 (which can be an on premise system, a cloud-based system, or another system). Architecture 100 also illustratively includes life cycle system 200. Business system 101 and life cycle system 200 can illustratively be accessed by user 114 through user interface displays 115 generated either by systems 101 and 200, themselves, or by user device 116. In one embodiment, user interface displays 115 have user input mechanisms 117 that can be actuated by user 114 in order to manipulate and control systems 101 and 200.

Customer business system 101 illustratively includes processor 102, data store 104, user interface component 105, update installer component 106, conflict resolution component 119 and business process component 121. Data store 104, itself, illustratively includes data 108, applications 110, business processes 112, workflows 114, and other items 116. In one embodiment, applications 110 illustratively include the business logic used to run business processes 112 and workflows 114 in business system 101. Applications 110 illustratively operate on data 108, which can include entities that represent items in the business system 101. Thus, applications 110 can include a general ledger application, inventory application, applications that allow a user to track business opportunities, track sales or production in a business system, or a wide variety of other business applications. The entities, for instance, include customer entities that represent customers, opportunity entities that represent business opportunities, inventory entities that represent inventory items, quote and proposal entities that represent quotes and proposals, etc. The data 108 can include a wide variety of other entities and data, and those mentioned above are mentioned for the sake of example only. User 114 (or other users) can illustratively access customer business system 101 in order to perform activities, tasks, workflows, etc. that are done in carrying out the business of the organization that deploys business system 101.

Life cycle system 200 illustratively includes project information 206, environment information 208 (which can include information representative of a set of business processes 209 that are used by the user in customer business system 101), update state tracking information 210, services 202-204, update information 203, update recommendation service 212, impact analysis information 211, code merge information 213 and report generator service 214. Services 202-204 can be used by various persons in order to identify, track and resolve issues that arise during various life cycle stages of a project (e.g., from presale to implementation and maintenance). For instance, as business system 101 is designed, built, deployed and tested, the various services 202-204 illustratively allow the developers as well as the user organization to track issues which arise, and to determine whether the user's expectations are met when the final instance of business system 101 is deployed at the organization.

User 114 can illustratively log in to life cycle system 200 to view the various information provided by services 202-204. In one embodiment, for instance, services 202-204 include a service that allows a user to identify the needs of an organization and the basic functionality that is provided with a business system and generate a fit gap list that identifies the functionality or customizations that need to be made, to the business system, in order to meet the needs of the customer that is deploying the business system. The services also illustratively include a diagnostic service that allows life cycle system 200 to identify the particular environmental information that defines the environment of the deployed business system 101. For instance, the environmental data may identify the version number and identity of the operating system, the version number of the base system 101, the particular fixes that have been applied to system 101, the version number of the database and other application platforms used by business system 101, whether business system 101 is in a production environment, a test environment, a user acceptance testing environment, etc., and a wide variety of other information.

User 114 can access life cycle system 200 to view project information 206 that defines the user's projects, environmental information 208 that includes the environmental data mentioned above, as well as an indication of the set of businesses processes 209 that are run on business system 101, update tracking information 210 that identifies the update state of business system 101 (for example, which updates have been applied and when), update information 203 that indicates available updates or detailed information corresponding to updates that have been installed, update recommendation service 212 that recommends updates for business system 101 based upon the information gathered from business system 101, impact analysis information 211 that shows the affect that selected updates have on business system 101 (such as the business processes 112, the objects, layers, etc.), code merge information 213 that shows the affect of automatic conflict resolution. and report generator service 214 that can be used to generate various reports that are discussed in greater detail below.

Before describing the overall operation of architecture 100 in more detail, a brief overview will be provided to enhance understanding. Cumulative updates 120 may intermittently become available to update customer business system 101, and specifically the applications 110 or information in data store 104, in system 101. The cumulative updates 120 may include hot fixes or a variety of other updates as well. In one embodiment, update installer component 106 uses user interface component 105, to generate user interface displays 115 that allow user 114 to select the various updates that are desired, and to also see an impact analysis which indicates the impact (e.g., in terms of potential conflicts) of those updates on the user's business system 101. Update installer component 106 also illustratively allows user 114 to search for various updates based on subject matter or otherwise, and to view the impact on the business processes 112, as well as to save selected updates for replay (or application) in other environments. Update installer component 106 also illustratively installs the selected updates, and can automatically resolve conflicts, when commanded to. The update state of customer business system 101 is illustratively uploaded to life cycle system 200 as update state tracking information 210. Thus, user 114 can also log on to life cycle system 200 in order to view the update state tracking information 210 and to receive recommended updates from update recommendation service 212, and to view various other information and reports as described in greater detail below.

Figure 1A:
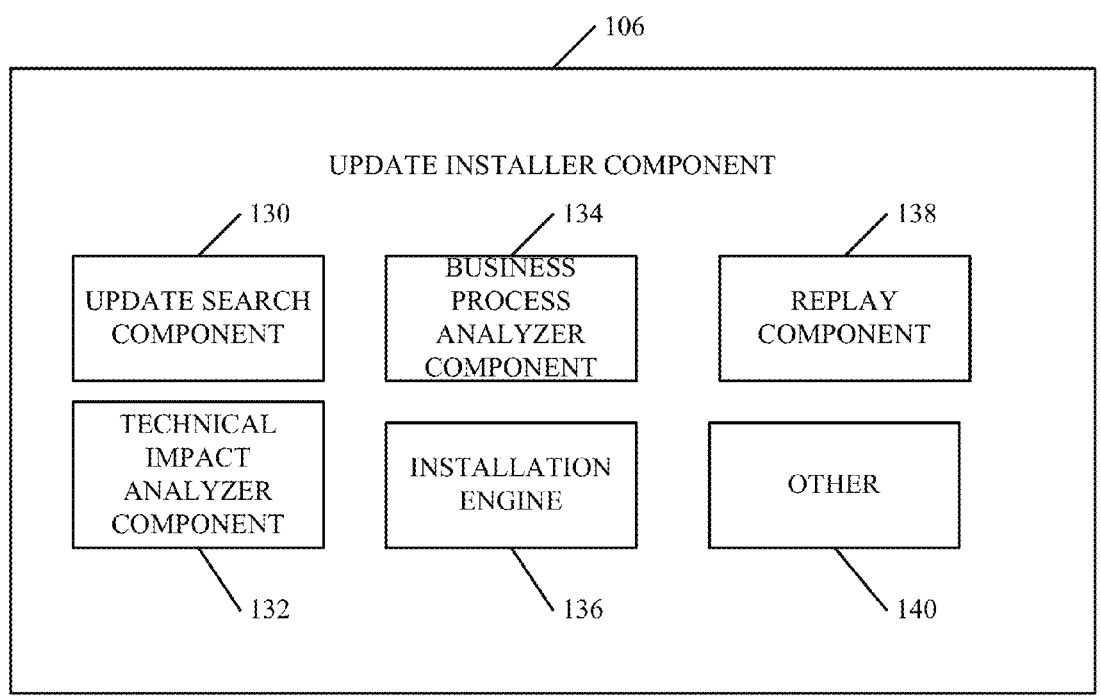
FIG. 1A shows one example of a more detailed block diagram of an update installer component.

FIG. 1A is a block diagram of one example of a more detailed embodiment of update installer component 106. FIG. 1A shows that update installer component 106 illustratively includes update search component 130, technical impact analyzer component (or impact analyzer component) 132, business process analyzer component 134, installation engine 136, and reply component 138. It can include other components 140 as well. Update search component 130 allows the user to search for updates Impact analyzer component 132 allows the user to see the impact of selected updates on objects and layers in business system 101, before they are applied. Business process analyzer component 134 allows the user to see the impact of selected updates on business processes in system 101, before they are applied. Installation engine 136 installs selected updates, and replay component 138 replays (or installs) the selected updates in other environments.

Figures 1, 1B:
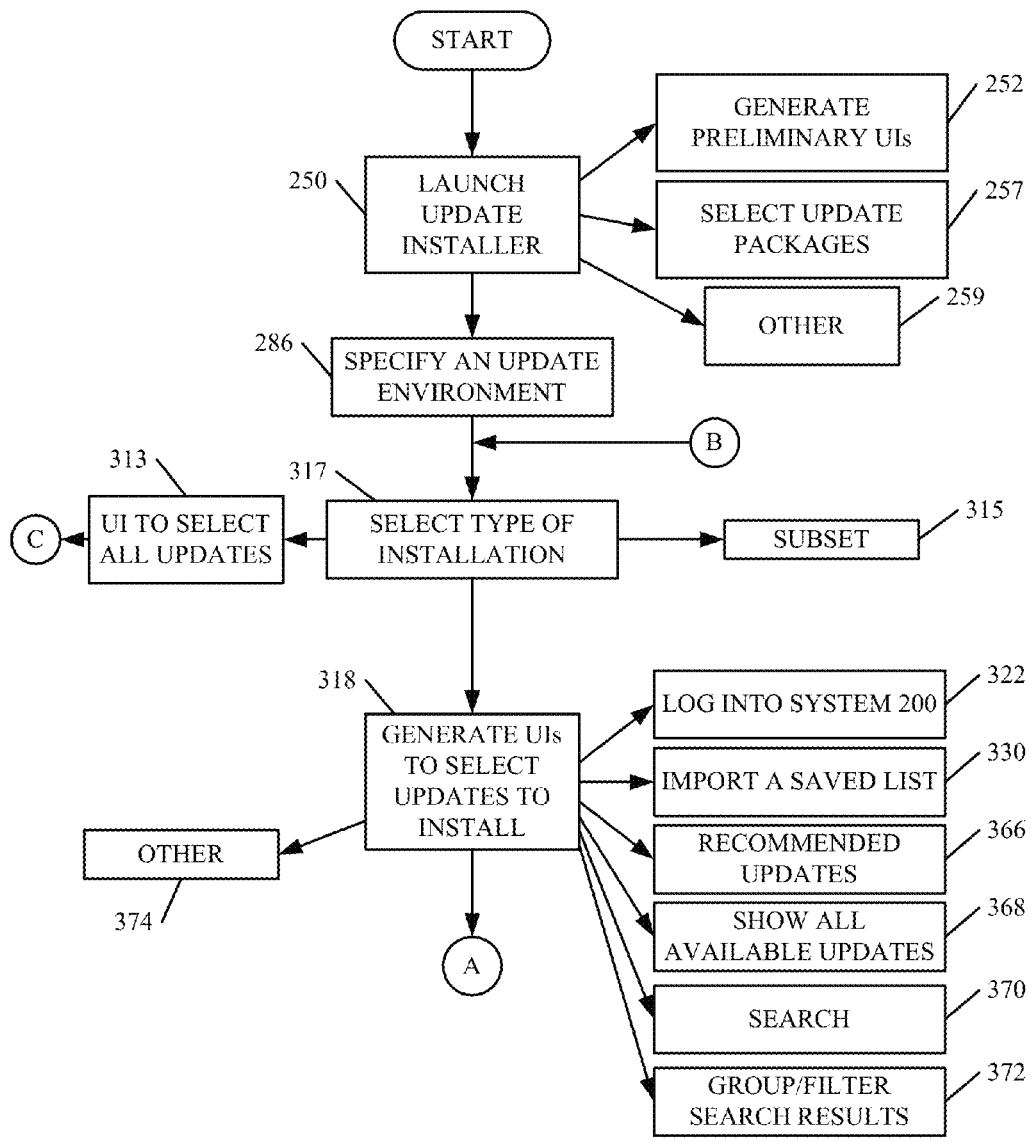

FIGS. 1B-1 to 1B-3 (collectively referred to as FIG. 1B) show a flow diagram of one exemplary embodiment of the overall operation of component 106 and architecture 100 shown in FIG. 1. FIGS. 1 to 1B will now be described in conjunction with one another.

In order to begin installing updates, user 114 first launches update installer component 106. This is indicated by block 250 in FIG. 1B. Update installer component 106 illustratively generates a variety of different preliminary user interface displays that can be viewed by the user. This is indicated by block 252. Update installer component 106 also generates user interface displays that allow the user to select a given environment to which the updates are to be applied. This is indicated by block 254. The user interface displays can also allow the user to select the type of installation (such as an express installation in which all updates are automatically applied, or an advanced installation in which user 114 can optionally log into user life cycle system 200 to identify the particular updates that the user wishes to apply). Selecting the type of installation is indicated by block 256 in FIG. 1B.

Figures 1, 1B, 2:
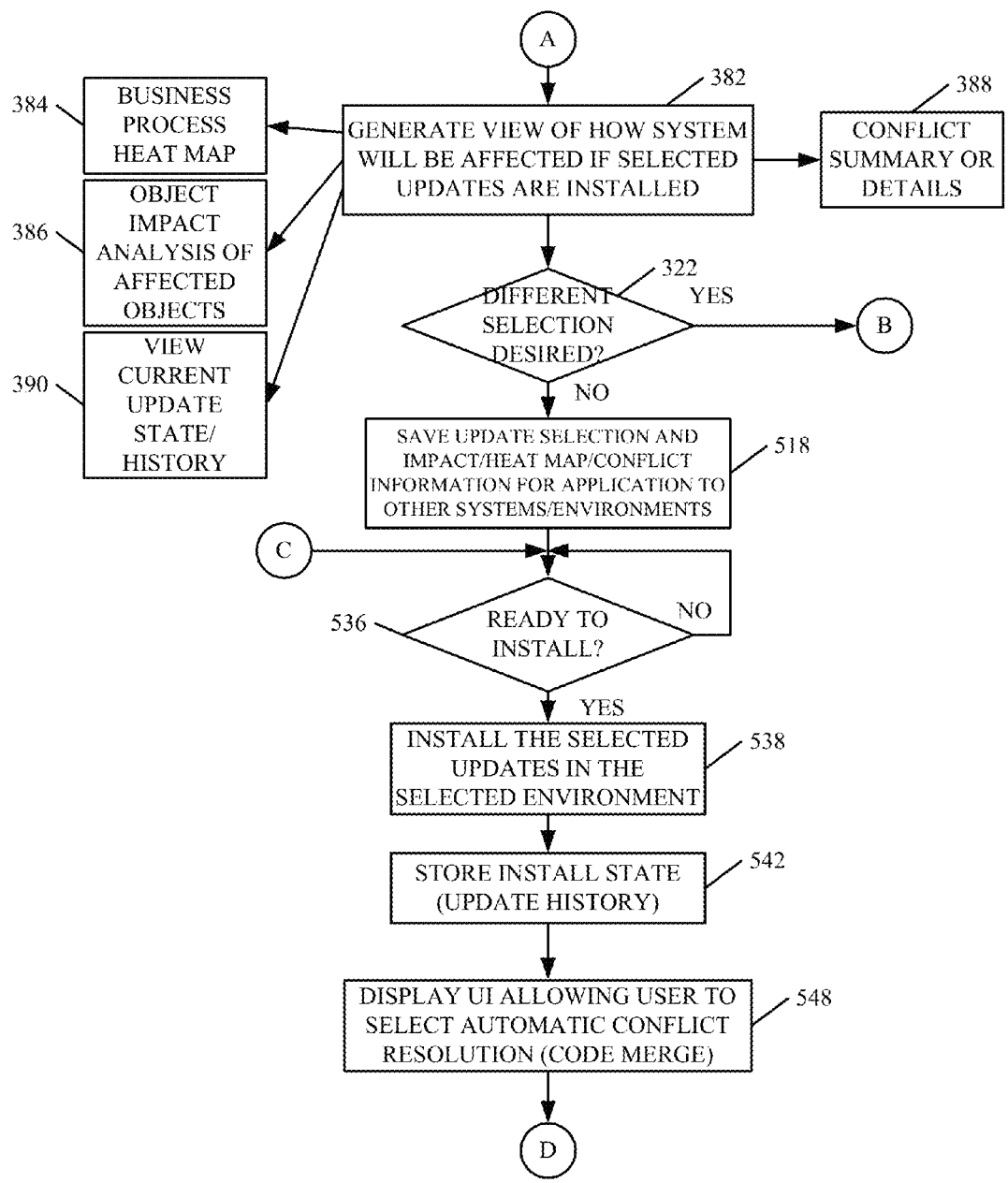

FIGS. 2-12 show exemplary user interface displays representative of update installer component 106 generating the preliminary user interface displays, and the set of user interface displays that allow the user to select the environment and the type of installation. FIG. 2 shows one example of a user interface display 258. Display 258 illustratively includes an introductory display pane 260 that shows an introductory message that explains that the user can use the following user interface displays in order to apply selected updates from a cumulative update package. Display 258 also illustratively includes a navigation pane 262 which displays the various steps that the user will go through in order to apply the updates.

Figures 1, 1B, 2, 3:
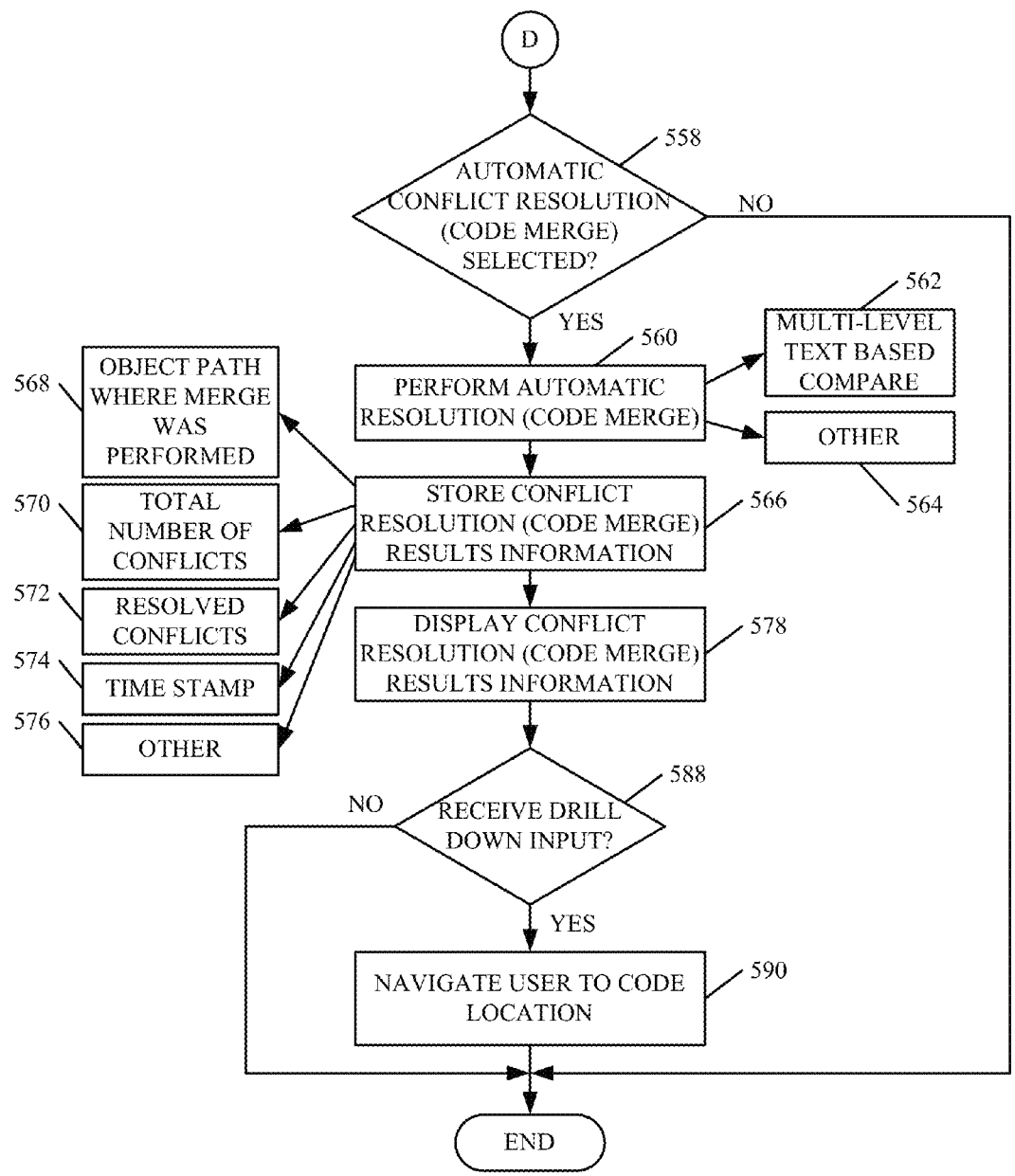

FIG. 3 shows a user interface display that can be generated when the user actuates the "next" button 264 in the display of FIG. 2. Some of the items shown in FIG. 3 are similar to those shown in FIG. 2, and they are similarly numbered. FIG. 3 shows display 266. Display 266 shows that the user has advanced to the "software license terms" node in pane 262. Thus, pane 260 illustratively displays a set of license terms. The user can accept the license terms by actuating button 266. The user can thus continue with the updating process.

Figure 4:
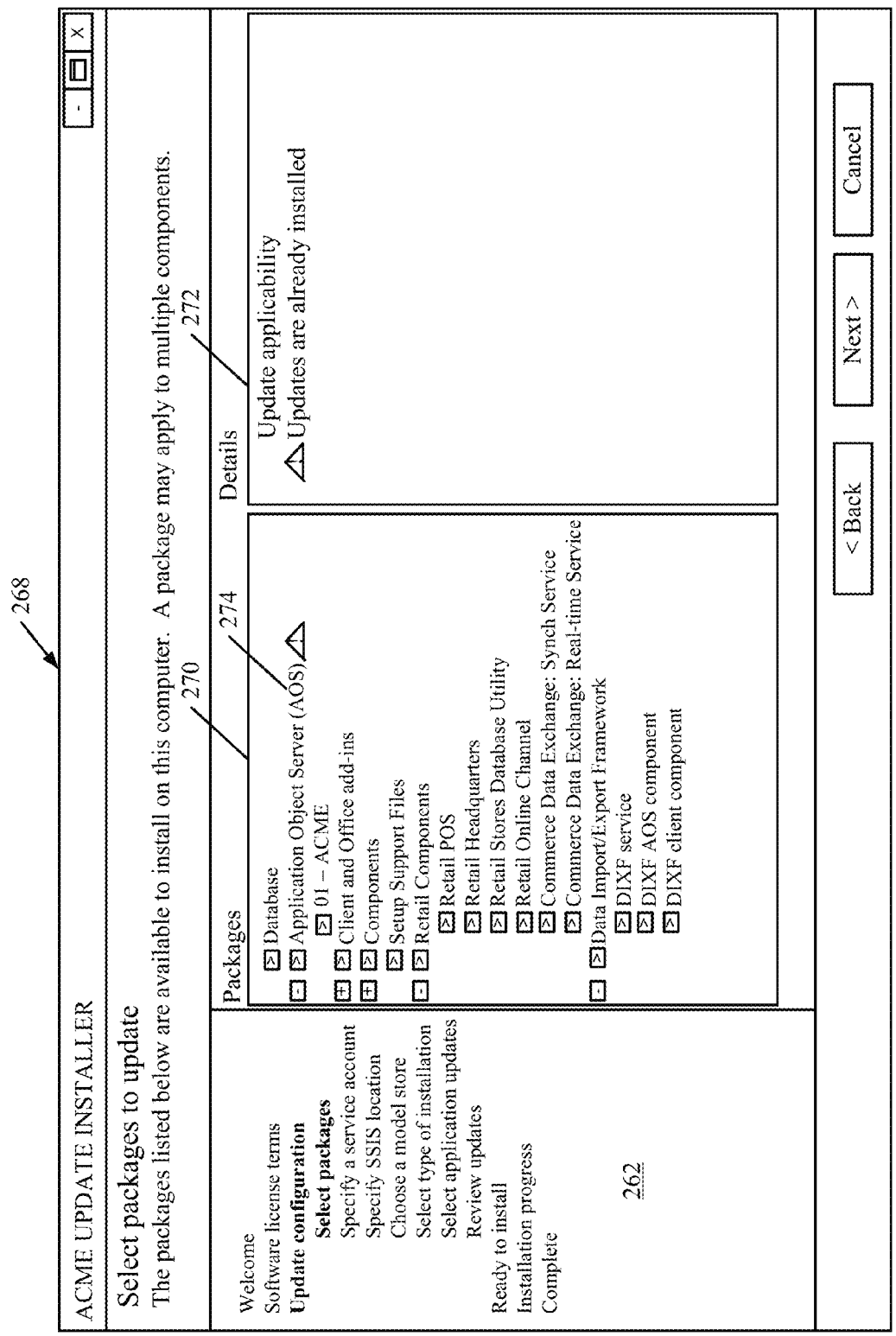
Figure 5:
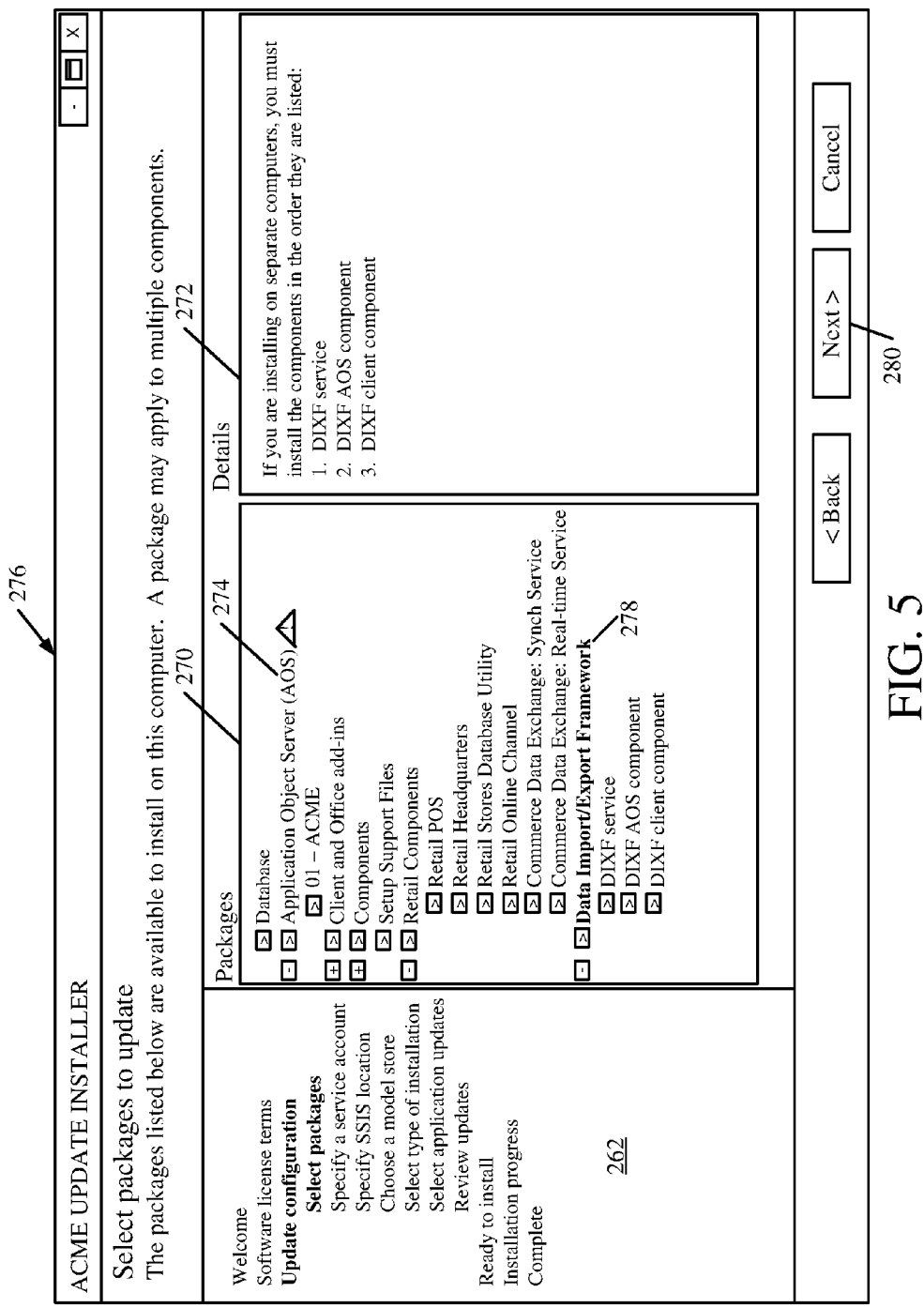
Figure 8:
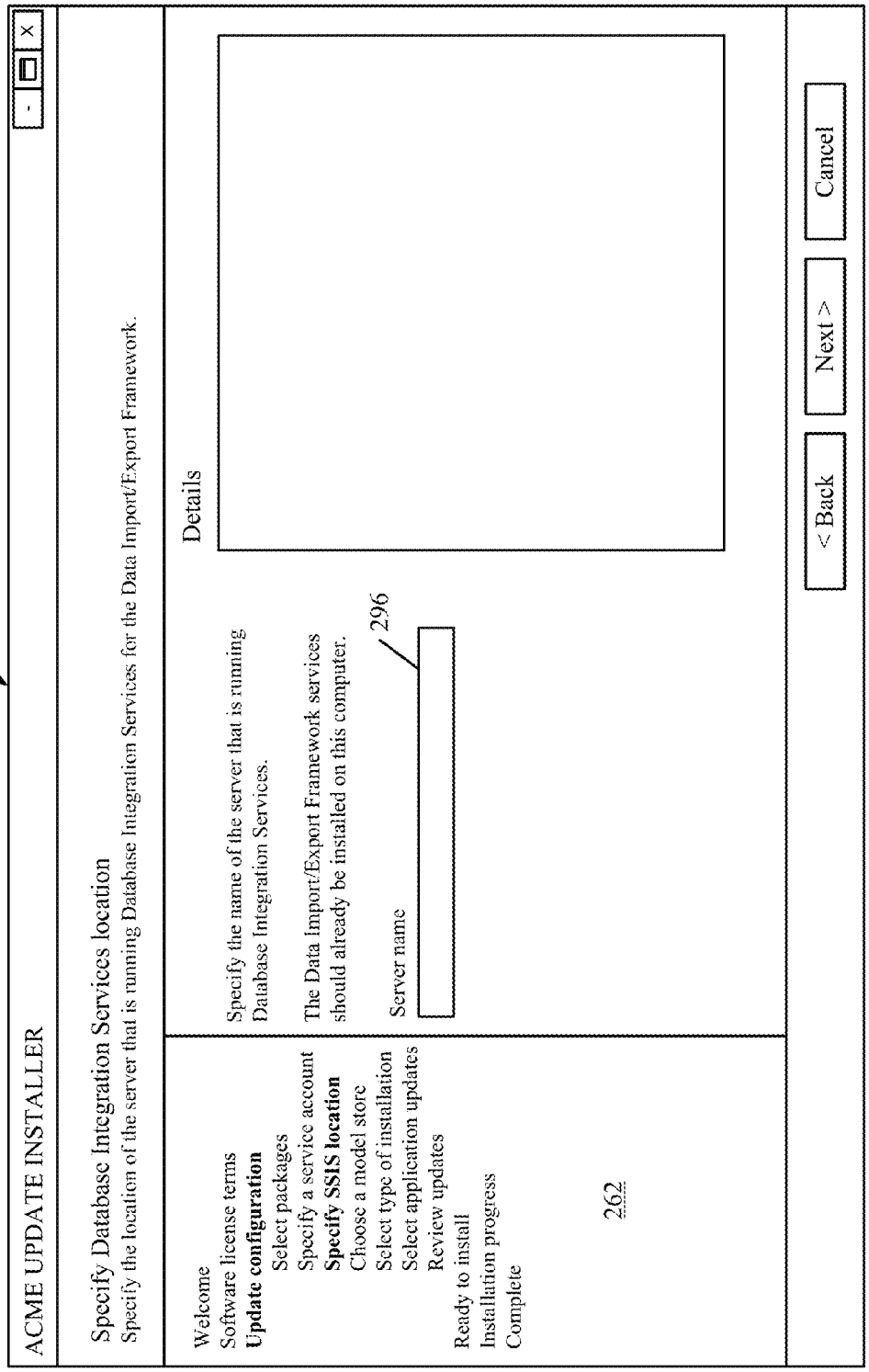
Figure 9:
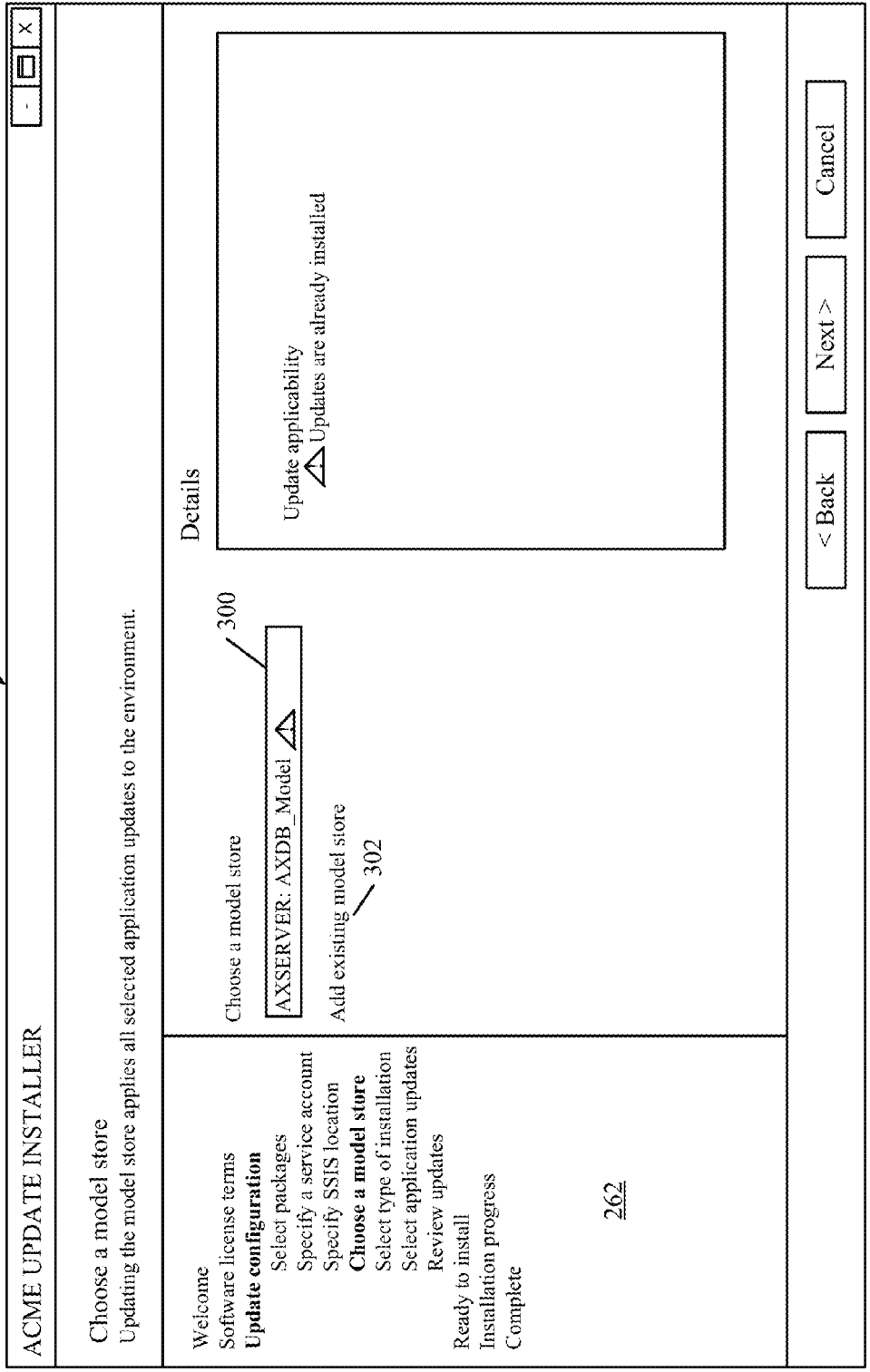
Figure 10:
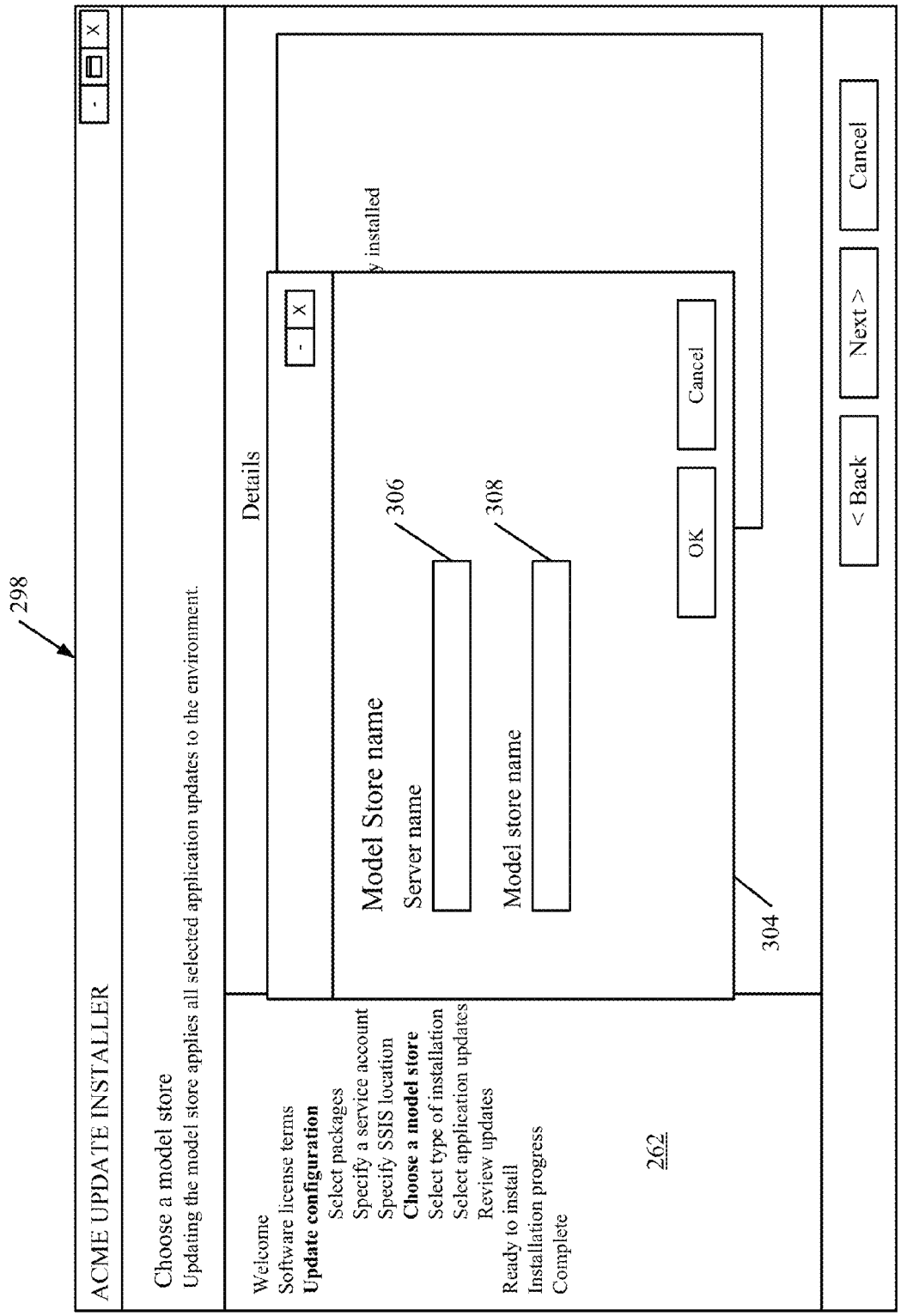
Figure 11:
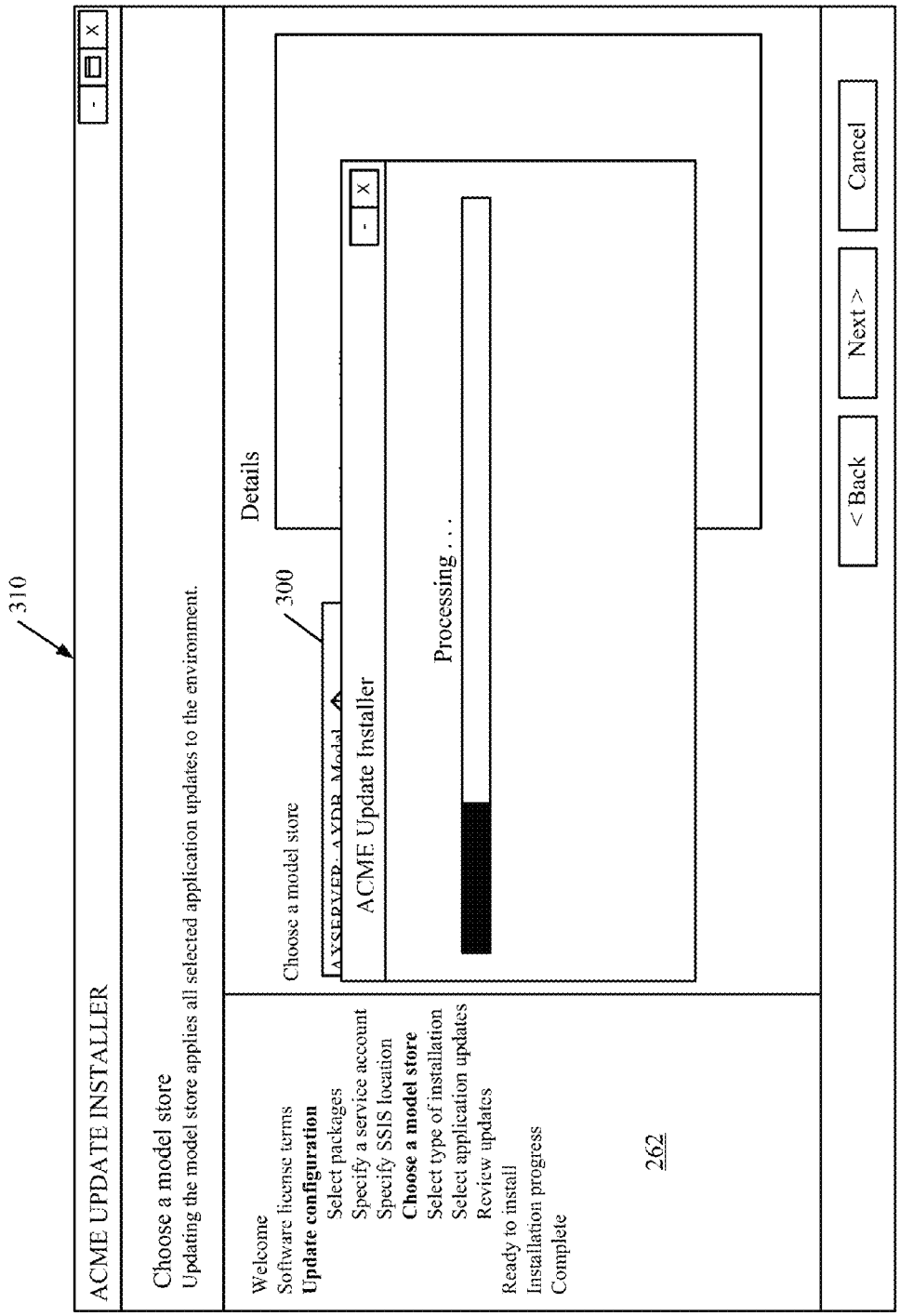

FIGS. 4-6 are exemplary user interface displays that allow the user to select an update package that is to be applied (or from which certain updates are to be applied) to business system 101. Display 268 shows that the user has now advanced to the "select packages" node in pane 262. Display 268 also includes a packages display portion 270 and a details pane or display portion 272. Packages display portion 270 illustratively displays update packages that can be applied to the various components in business system 101. Details pane 272 illustratively displays details corresponding to the packages displayed in portion 270. For instance, in the embodiment shown in FIG. 4, details pane 272 indicates that the updates corresponding to the "application object server" node 274 in packages pane 270 have already been installed.

FIG. 5 shows an exemplary user interface display 276 where user 114 has selected or highlighted the "data import/export framework" node 278 in pane 270. Selecting one or more update packages is indicated by block 257 in the flow diagram of FIG. 1B. It can thus be seen that the details pane 272 is updated to display detailed information about the highlighted node 278. When the user actuates next button 280, the user will illustratively be navigated to a prerequisite user interface display, such as display 282 shown in FIG. 6. Display 282 displays prerequisites (generally shown at 284) that are needed in order to install the update packages selected by the user in the display of FIG. 5.

Referring again to the flow diagram of FIG. 1B, once the user has selected one or more update packages for application to business system 101, update installer component 106 illustratively generates a set of user interface displays that allow the user to specify the environments where the updates are to be applied. This is indicated by block 286 in FIG. 1B. FIGS. 7-11 show exemplary user interface displays for doing this.

FIG. 7 shows user interface display 288 which asks user 114 to specify a particular account for the update installation process. For instance, in one embodiment, user 114 is asked to enter a username in field 290 and password in field 292 that correspond to an account that has read/write access and administration rights to the various models and other information in business system 101, that are to be updated. Once the user has entered this information, update installer component 106 illustratively generates a user interface display, such as display 294 shown in FIG. 8, that allows the user to specify the name of the server that is running the database integration service that will be used to apply the updates. For instance, user 114 can enter a server name in field 296.

When the user does this, and actuates the next actuator, update installer component 106 illustratively generates a user interface display (such as display 298 shown in FIG. 9) that allows the user to specify a model store that is to be updated with selected updates. For instance, user interface display 298 allows the user to enter (such as by typing or through a drop down menu or otherwise) the data store that stores the models that are to be updated with user input mechanism 300. The user can also illustratively add a new model store by actuating user input mechanism 302.

By way of example, if user 114 actuates mechanism 302, update installer component 106 illustratively generates a display (such as display 304 shown in FIG. 10) that allows the user to enter a server name in field 306 and a model store name in field 308, in order to add a server for updating. At any point during the processing, update installer component 106 can generate a user interface display such as display 310 shown in FIG. 11 that updates the user has to the progress of the processing being performed.

Figure 12:
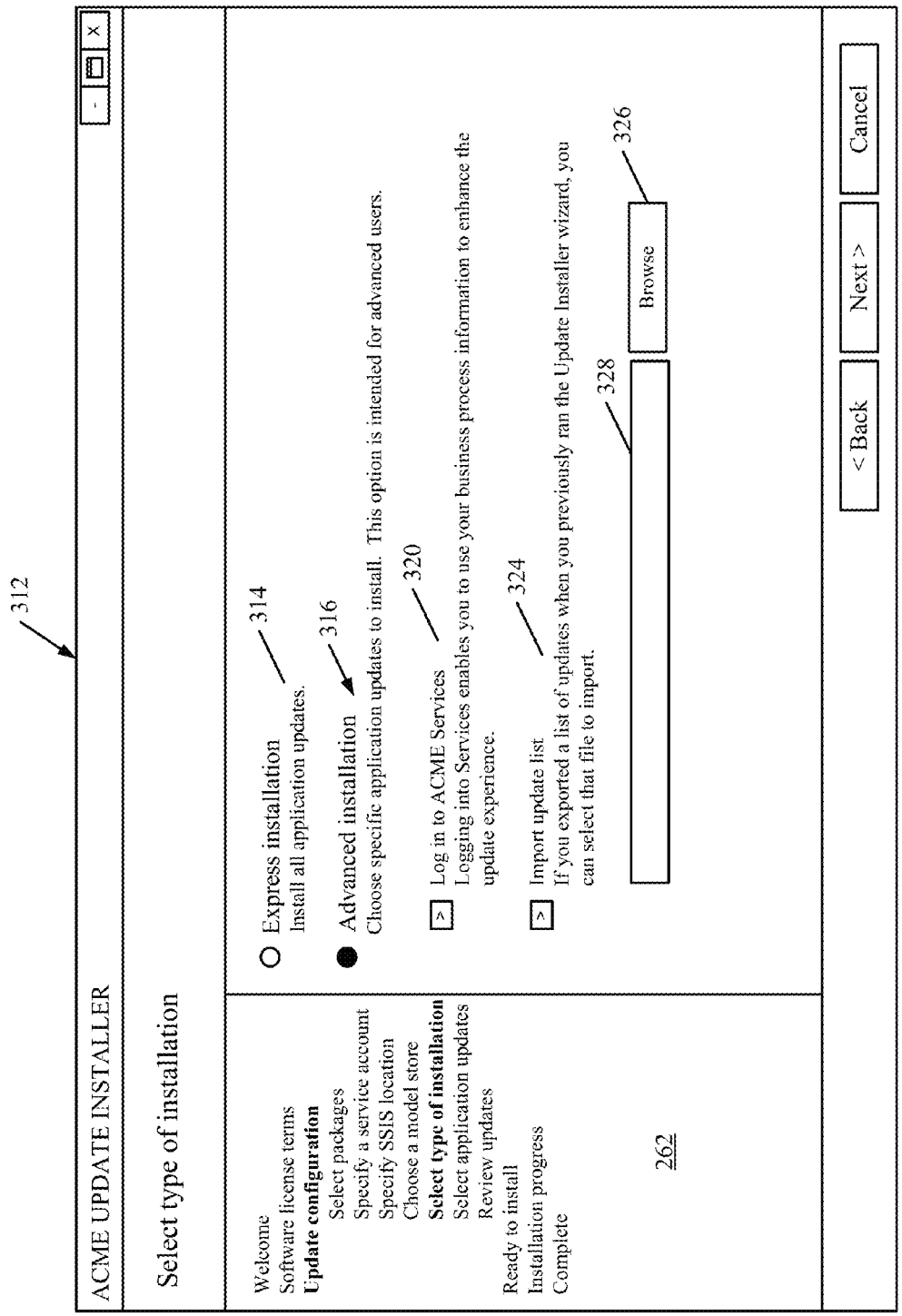

Once the user has identified the particular update packages that are to be applied, and the particular environment where they are to be applied, update installer component 106 illustratively generates a user interface display, such as display 312 shown in FIG. 12, that allows user 114 to select a type of installation that is to be performed. Receiving a user input selecting the type of installation is indicated by block 317 in FIG. 1B.

For instance, the user can choose an express installation in which all updates in the selected update package are be applied. This can be done, for instance, by actuating user input mechanism 314. Selecting all updates is indicated by block 313 in the flow diagram of FIG. 1B. However, user 114 can also select user input mechanism 316 which allows the user to perform an advanced installation in which the user can select specific application updates (from the selected package) for application to the identified environment. Selecting a subset of updates is indicated by block 315 in the flow diagram of FIG. 1B. When the user indicates that he or she will be selecting a subset of updates, component 106 generates a set of UI displays that allow the user to do this. Generating user interface display 312 to select a subset of updates to install is indicated by block 318 in the flow diagram of FIG. 1B. The user can do this in a variety of different ways. For instance, in one embodiment, the user can actuate user input mechanism 320 in order to log into life cycle system 200 (shown in FIG. 1) to use the information in system 200 to select the updates. Logging into life cycle system 200 is indicated by block 322 in FIG. 1B.

However, it may be that user 114 has already selected a set of updates for application to a different environment (other than the one that was chosen as described above). In that case, user 114 may have saved those selected updates as a list that can be applied to other environments. Thus, if the user actuates user input mechanism 324, the user can input the update list for application to the newly selected environment. In one embodiment, when the user actuates mechanism 324, "browse" button 326 becomes active and allows the user to enter a file in box 328 for importing into the update installation process. Importing a saved list of updates is indicated by block 330 in the flow diagram of FIG. 1B.

It is now assumed that the user has actuated user input mechanism 320 to select individual updates to be applied. In response to the user selecting the advanced installation and logging into life cycle system 200, update installer component 106 illustratively generates a user interface display, such as display 332 in FIG. 13, that allows the user to search for, and select, various updates that are to be applied in the identified environment. User interface display 332 includes a first set of user input mechanisms 334. User input mechanisms 334 allow the user to either select all updates for application, or to select only applicable updates. When the user selects the user input mechanism to apply only applicable updates, then those which can be accessed, searched and viewed by the user are only the ones targeted for the environment that the user has selected, and for the various features that the user has licensed in business system 101.

Display 332 also illustratively includes a set of filter user input mechanisms 336. Each of the filter user input mechanism 336 illustratively allow the user to select one or more items, upon which to filter the applicable updates. In the example shown, mechanisms 336 include a "module" user input mechanism that is shown as a drop down menu. The module mechanism allows the user to filter the applicable updates by module. In the embodiment shown in FIG. 3, the user has selected the "cash and bank management" module.

The "license code" filter mechanism 336 allows the user to filter the applicable updates by license code elements. Such elements can include, for example, an electronic banking code element, the general ledger code element (or application), etc.

The "country context" filter mechanism 336 allows the user to filter the applicable updates by country context. For instance, systems that are deployed in one country may not be interested in some updates that were generated, in particular, for a system in another country. Thus, the applicable updates can be filtered by country context.

The "business process" filter mechanism 336 allows the user to filter the applicable updates based on the business processes to which they apply. By way of example, in one embodiment, life cycle system 200 includes a service 202-204 that uses a business process modeler to generate a model of the business processes in a given customer business system 101. Thus, the set of business processes 209 for the individual customer business system 101 is stored so that the user can view the various business processes in system 101. Update installer component 106 illustratively accesses the set of business processes 209 from life cycle system 200 and displays those processes in the user input mechanism. Thus, the user can select the particular business processes in business system 101 to filter applicable updates.

Figure 13:
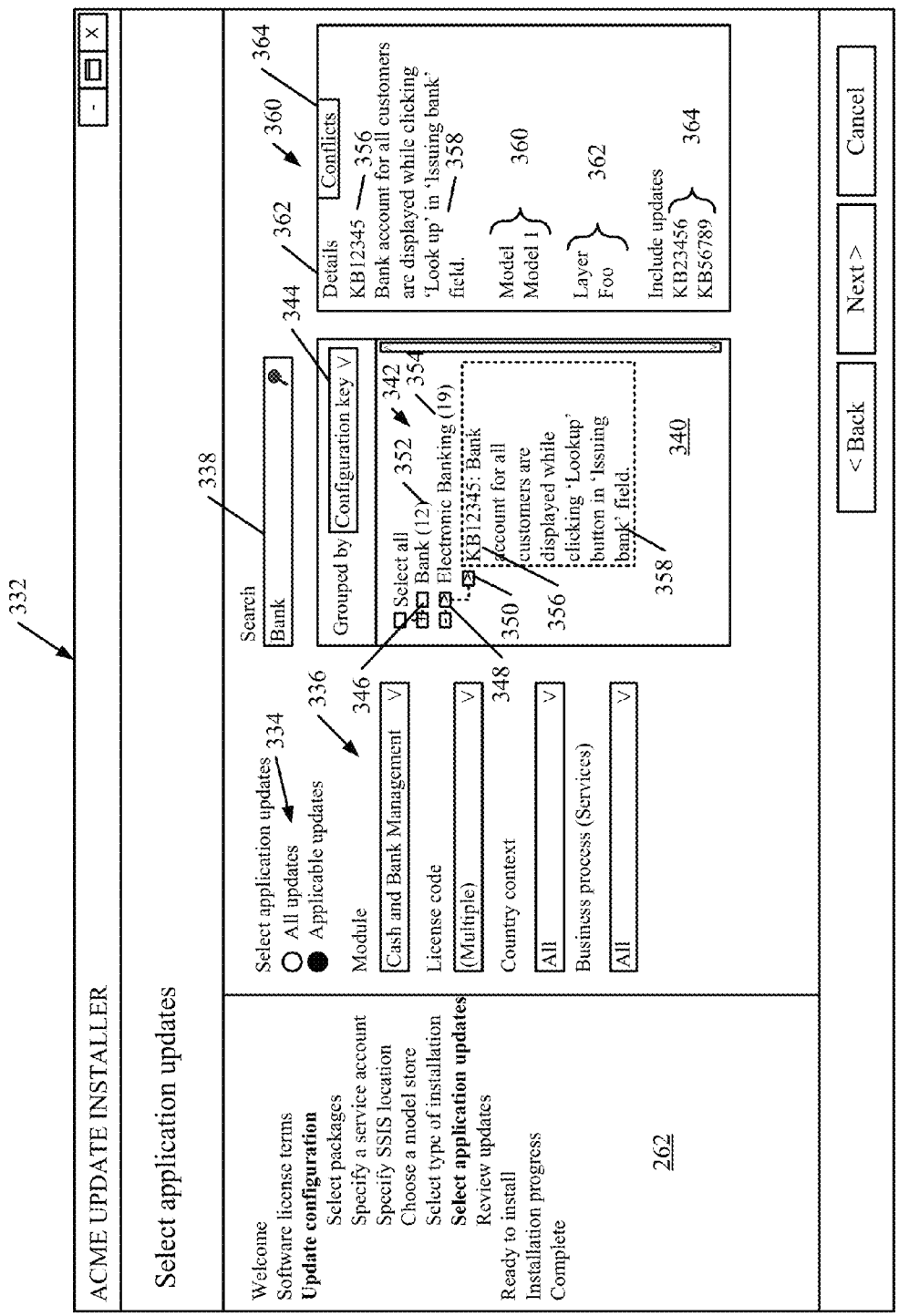

In the embodiment shown in FIG. 13, user interface display 332 also illustratively includes a search user input mechanism 338. In the embodiment shown, input mechanism 338 is simply a text box that allows the user to type in keywords or search query terms that are used by update search component 130 in update installer component 106 in order to search through the updates based on the keywords. For example, the user may search for updates by title, or by update identifier number. The update identifier number may be a knowledge-base reference or another identifier.

Display 332 also illustratively includes a results display pane 340. Display pane 340 illustratively displays information corresponding to the applicable updates that are identified by update search component 130 in update installer component 106 based upon all of the user selections, filters, and search terms. The returned results (or results update set) 342 can be grouped in a variety of different ways. For instance, the grouping user input mechanism 344 allows the user to select one of a variety of different sets of sort criteria for sorting the returned update results displayed in pane 340.

FIG. 13 shows that the resultant update set 342 that is displayed in pane 340 shows a hierarchical tree structure which includes parent nodes 346 and 348. Each of the nodes can have child nodes, such as node 350. Each node has an associated check box. In one embodiment, when a parent node is selected, all of the children nodes, from that parent node, are also selected. FIG. 13 also shows that each of the parent nodes includes a numerical identifier 352 and 354. The numerical identifiers associated with each parent node identify the number of updates that are in the result set 342 that will be applied to each of those nodes. In the example shown in FIG. 13, 12 updates in the result set apply to the bank node and 19 updates in the result set apply to the electronic banking node.

FIG. 13 shows that child node 350 corresponds to a given update set. The update set has an update identifier 356 and an update description 358. The identifier is a unique identifier for the given update (or update set) and the description describes how the update will affect the parent node.

FIG. 13 also illustratively includes a more detailed information section 360. In the embodiment shown, section 360 includes a details tab 362 and a conflicts tab 364. When the user focuses on a parent node in result pane 340, the details tab 362 may illustratively be empty. Conflict resolution component 119 in business system 101 illustratively generates a conflict summary display that shows a summary of conflicts for all of the updates under the selected parent node. This is described in greater detail below with respect to FIGS. 16 and 17.

When the user selects or focuses on a non-patent node in pane 340 (such as on node 350) then details tab 362 displays details corresponding to the selected non-parent node. In the embodiment shown in FIG. 13, for instance, details tab 362 displays details corresponding to the update identified by update identifier 356. The details illustratively include the update identifier 356, the summary description 358, the models 360 that are affected by the update, the layers 362 that are affected by the update, and any other updates 364 that are included within the selected node 350.

Also, when the user focuses on a non-parent node in pane 340, the conflicts tab 364 illustratively shows a conflict summary for that particular non-parent node (e.g., corresponding to the particular update identified by identifier 356). Again, this is described in greater detail below.

It will also be noted that, in another embodiment, update installer component 106 can display recommended updates, automatically, given the user's particular environment and configuration information stored in life cycle system 200.

Returning again to the flow diagram of FIG. 1B, showing recommended updates is indicated by block 366, showing a list of all available updates (such as when the user selects the "all updates" user input mechanism 334) is indicated by block 368, displaying a search user input mechanism 338 is indicated by block 370, allowing the user to group and filter the search results by applicability, module, country context, configuration, etc., is indicated by block 372 and allowing the user to select available updates in other ways is indicated by block 374.

Figure 14:
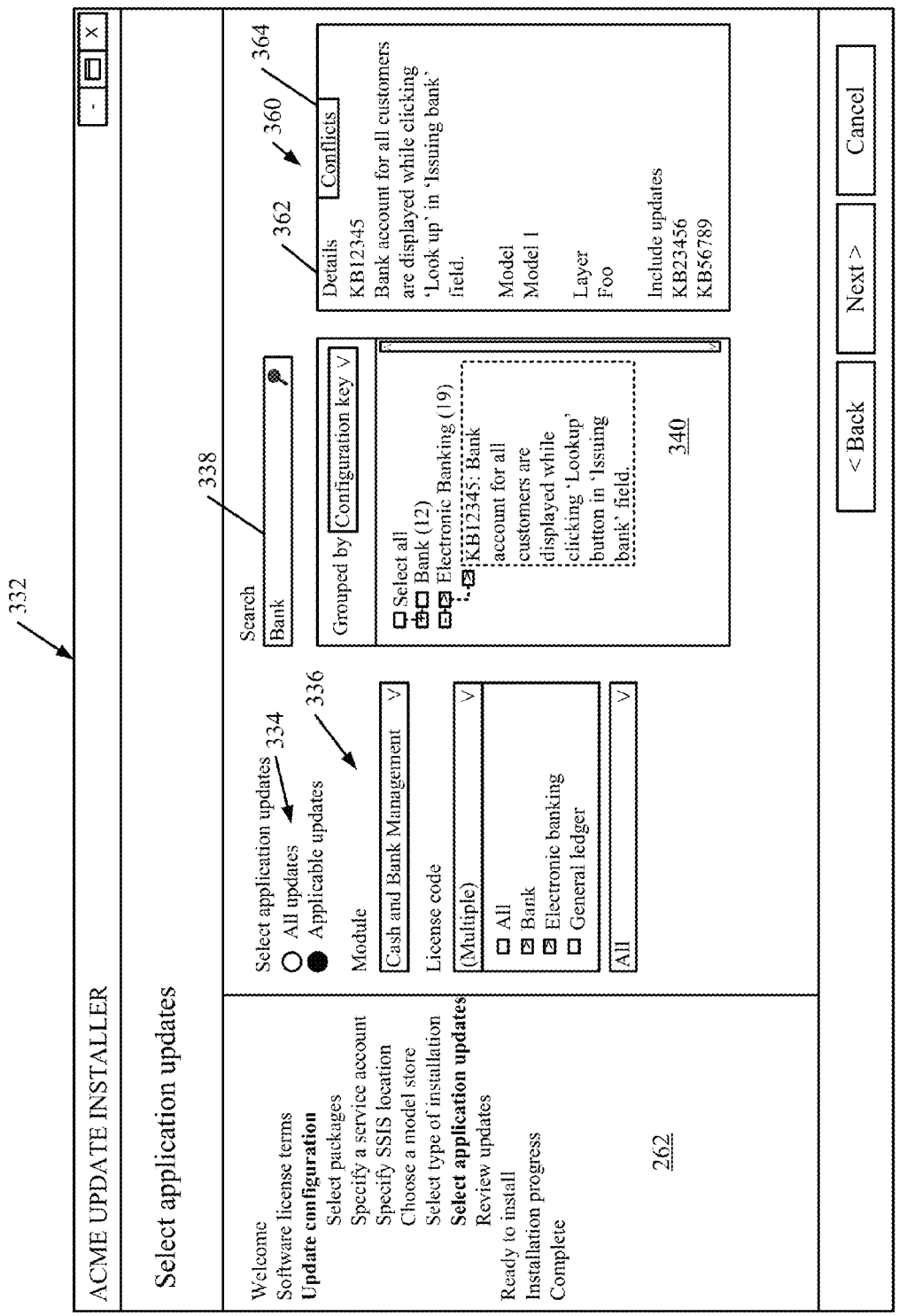

FIG. 14 is similar to FIG. 13, and similar items are similarly numbered. However, FIG. 14 is provided to explicitly illustrate that the filter user input mechanisms 336 can each allow the user to select multiple filters. For example, the "license code" user input mechanism allows the user to choose one or all of the "bank" code element, the "electronic banking" code element, or the "general ledger" code element. These are exemplary only and other items can be used as well.

Figure 15:
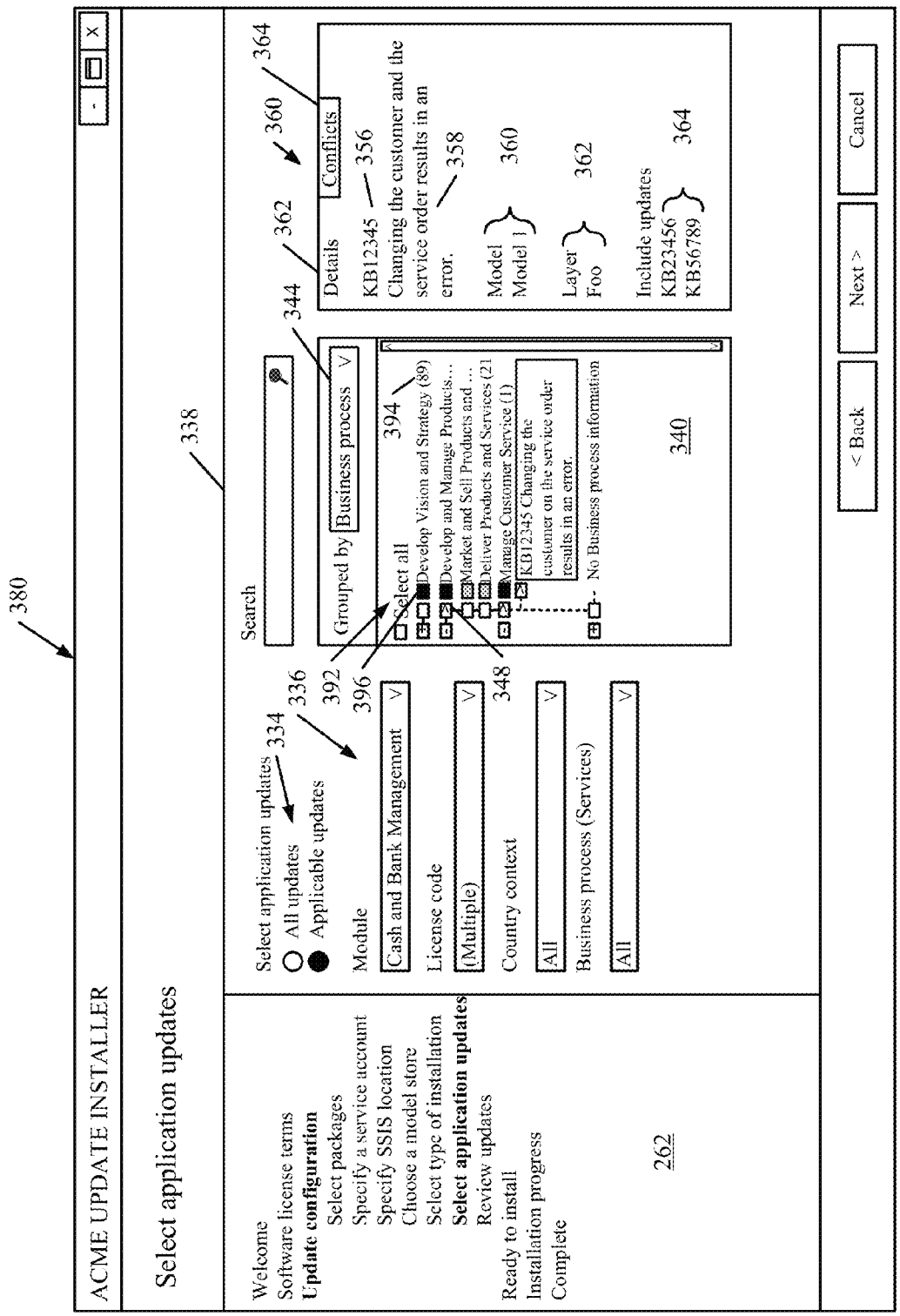

FIG. 15 shows another user interface display. Display 380 is similar to display 332 (discussed above), and similar items are similarly numbered. However, it can be seen that display 380 also provides an indication as to what type of impact the selected updates in the result set displayed in result pane 340 will have on the underlying customer business system 101, if they are applied. Generating the view of how the system will be affected if the selected updates are installed (or applied) is indicated by block 382 in the flow diagram of FIG. 1B.

In one embodiment described herein, the impact of the selected updates on business system 101 can be shown in these different ways: the impact on the business processes, the impact on the objects and layers of business system 101, and the level of conflicts that will be generated. In one embodiment, business process analyzer component 134 in update installer component 106 illustratively generates a business process heat map that identifies the business processes in business system 101 that will be affected by the selected updates. This is indicated by block 384 in the flow diagram of FIG. 1B. In another embodiment, impact analyzer component 132 in update installer component 106 displays an analysis of which objects and layers in business system 101 will be most affected by the selected updates. This is indicated by block 386 in FIG. 2. Conflict resolution component 119 (in FIG. 1) can also generate a display of a conflict summary or conflict details that will arise if the selected updates are applied. This is indicated by block 388. Each of these will now be described.

The affect of the selected updates on the underlying business process will first be described. Referring again to the user interface display 380 of FIG. 15, it can be seen that the user has elected to group the returned result set shown in pane 340 by business process. This can be done by making that selection using the sort or group-by user input mechanism 344. Thus, the result set is grouped by business process. The set of parent nodes (with corresponding check boxes 392) each represent a business process that will be affected if the selected updates are installed. Each parent node has a numerical indicator 394 that identifies the number of updates that affect the corresponding business process. For example, the "develop vision and strategy" business process will be affected by 89 updates. On the other hand, the "manage customer service" business process will be affected by one update.

The hierarchical structure in pane 340 also shows that each of the parent nodes in the result set includes a heat map indicator 396. In the embodiment shown in FIG. 15, the heat map indicator is a color-coded visual element that identifies the underlying business processes in system 101 that will be affected by the selected updates, and the degree to which they will be affected. For instance, if the indicator 396 corresponding to a given parent node is colored red, that may indicate that the corresponding business process (corresponding to that parent node) will be greatly affected by the selected updates. If it is yellow or green, on the other hand, that may indicate that the underlying business process will be less affected or least affected, respectively.

The thresholds for determining whether a parent node has a heat map indicator 396 indicating that it will be greatly affected or less affected can be set in a variety of different ways. For instance, they can be set anecdotally, they can be set based on user preference (for instance, a user may identify certain business processes as more important than others), they can be set heuristically, or in other ways. For example, in one embodiment, the top 20% most affected parent nodes may have a red heat map indicator 396. That is, if the total number of updates that will be applied to a given process is in the top 20% of all of the business processes, that given process is assigned a heat map indicator 396 that indicates that it will be one of the most affected business processes. The parent nodes with the next 60% of updates applied may be assigned an intermediate heat map indicator 396 indicating that they will be less affected than the most severely affected business processes. The parent nodes with the bottom 20% of updates applied to them may be given a heat map indicator 396 indicating that they will be least affected, among the various business processes. Of course, this is an exemplary breakdown only, and a wide variety of other thresholds or breakdowns can be used.

Figure 1C:
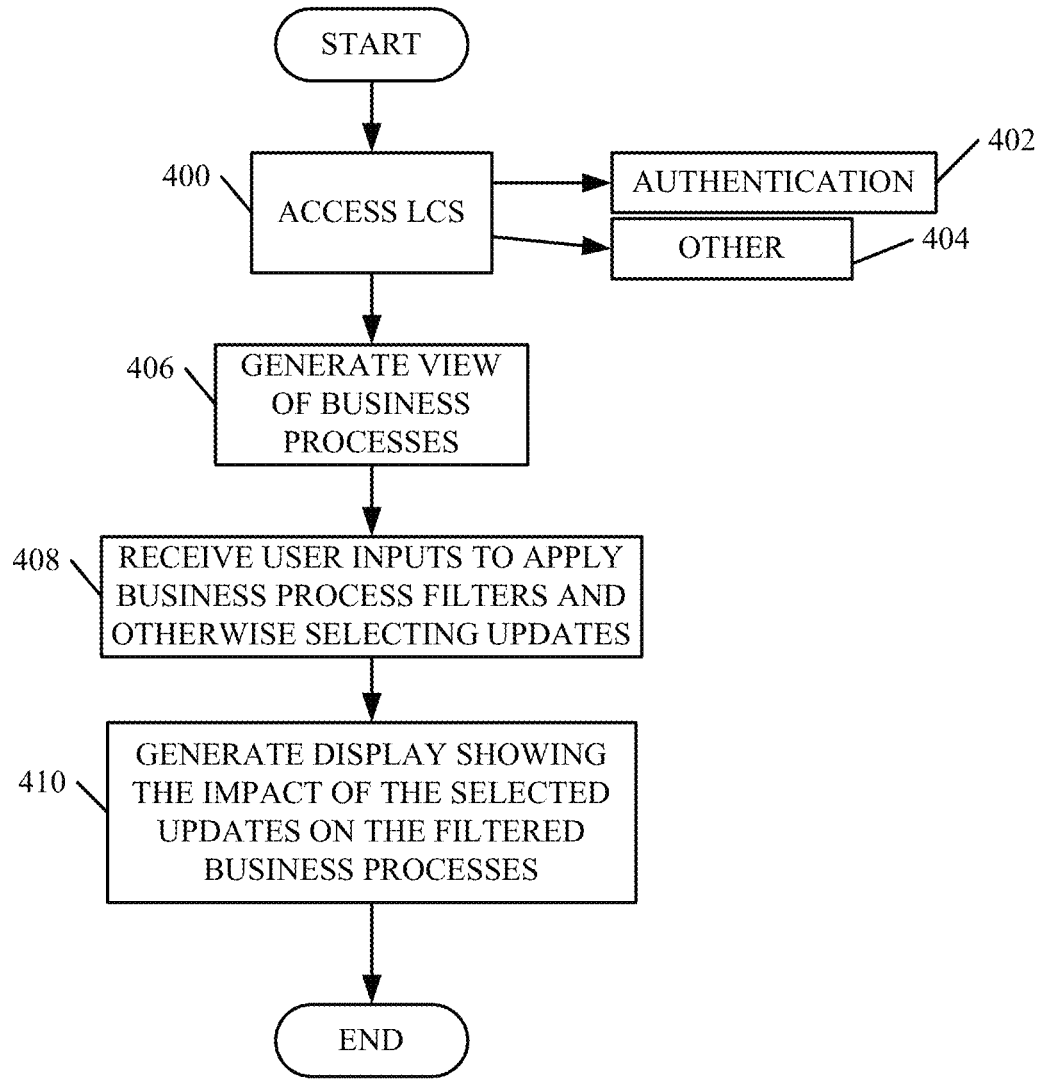
FIG. 1C is a flow diagram illustrating one embodiment of the operation of the architecture shown in FIG. 1 in generating a business process impact analysis.

Before continuing with the description of FIG. 1B, FIG. 1C will now be described. FIG. 1C is a flow diagram illustrating one embodiment of the operation of business process analyzer component 134 in generating the business process heat map shown in FIG. 15. In one embodiment, user 114 first accesses life cycle system 200. This is indicated by block 400. This can be done in a wide variety of ways, such as by providing authentication information 402 or other information 404. This allows business process analyzer component 134 to access the information in system 200 in order to perform its analysis. The system then generates a view of the business processes in system 101. For instance, when the user accesses the business process filter input mechanisms 336, the various business processes that the user can choose from are displayed there. Generating a view of the business processes is indicated by block 406 in FIG. 1C. The update installer component 106 then receives the various user inputs to select the business processes used in filtering, and to otherwise select the applicable updates. This is indicated by block 408. Business process analyzer component 134 then generates the display (e.g., the heat map) showing the impact of the selected updates on the business processes, as filtered by the user input selections with the business process filter input mechanisms 336. This is indicated by block 410.

Figure 16:
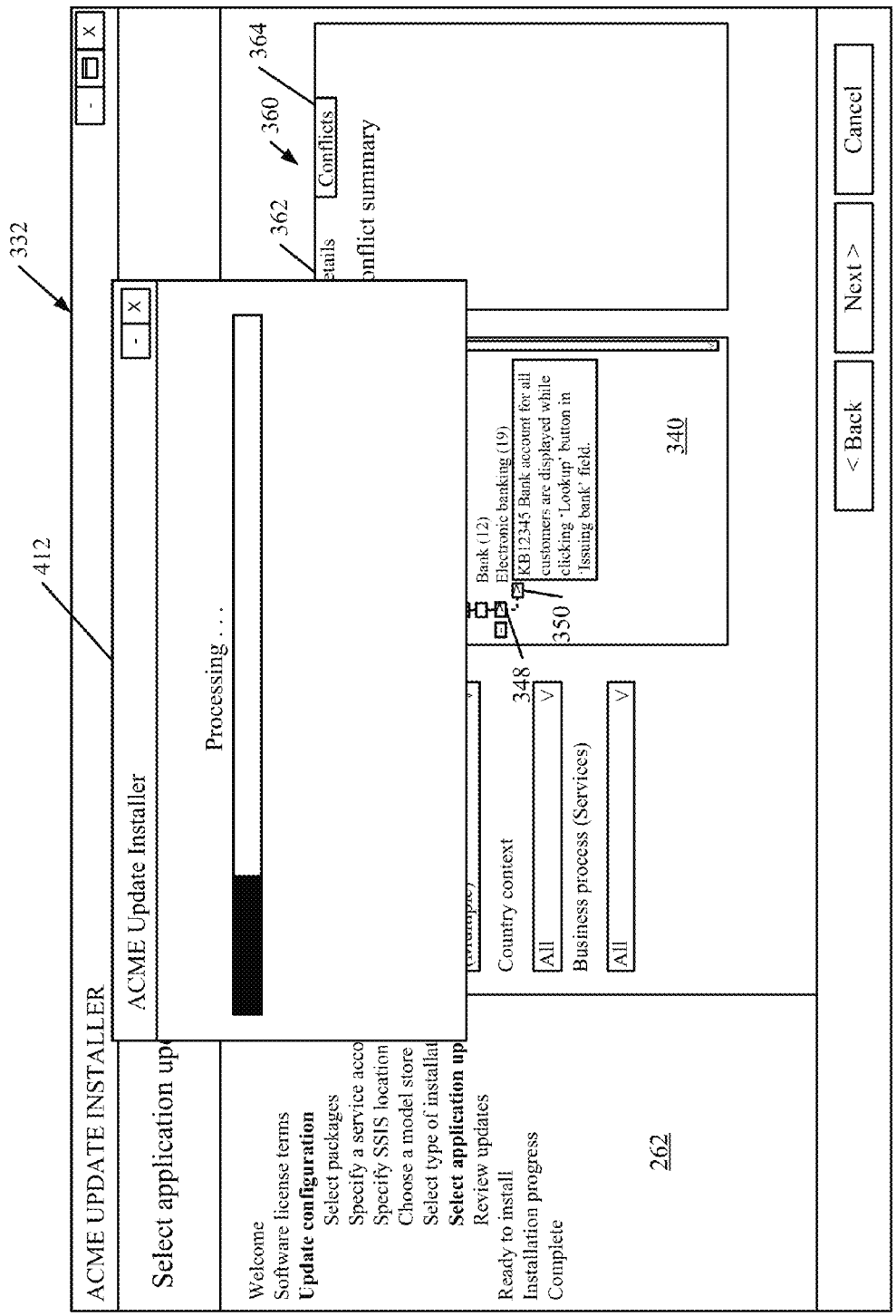
Figure 17:
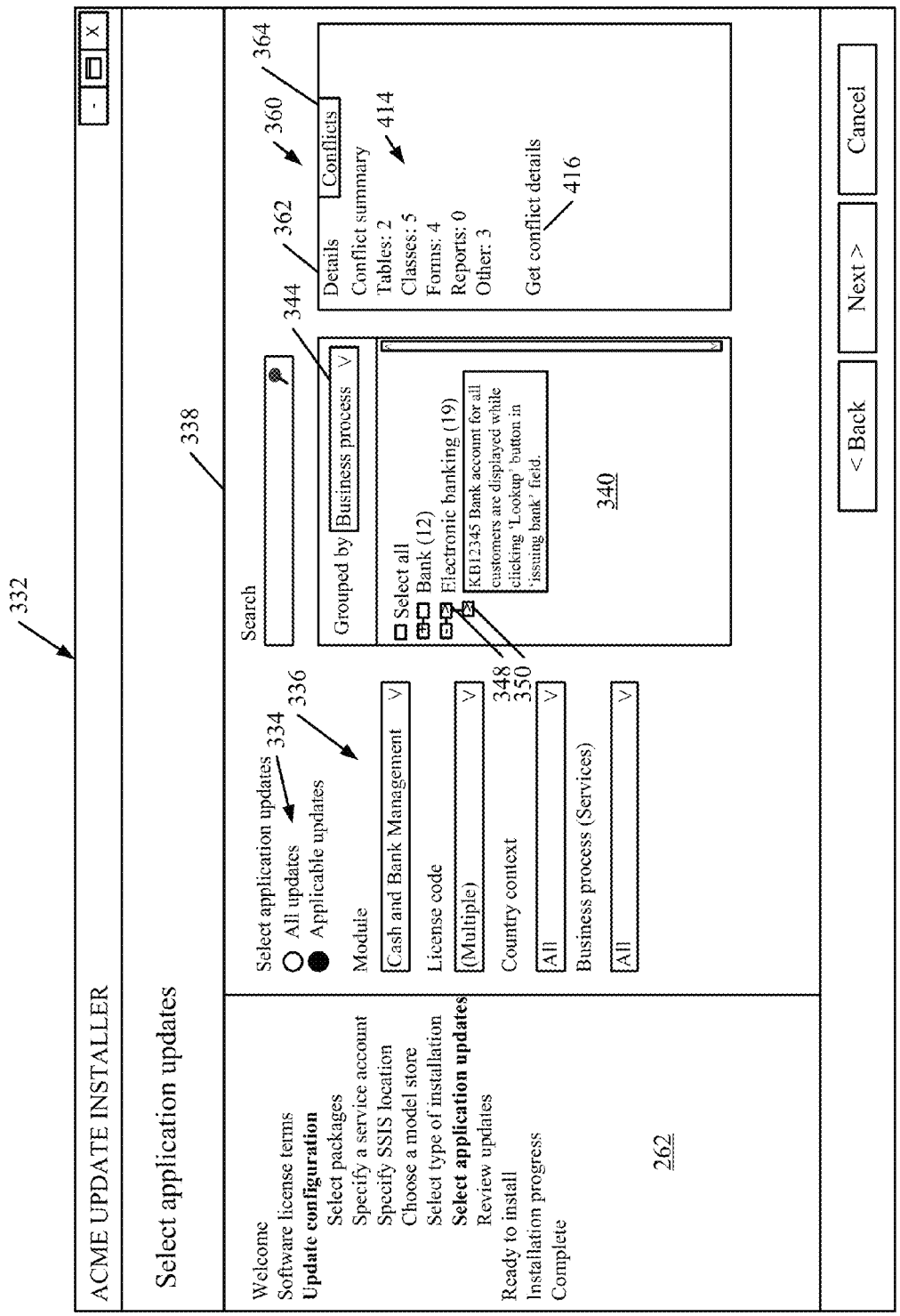
Figure 18:
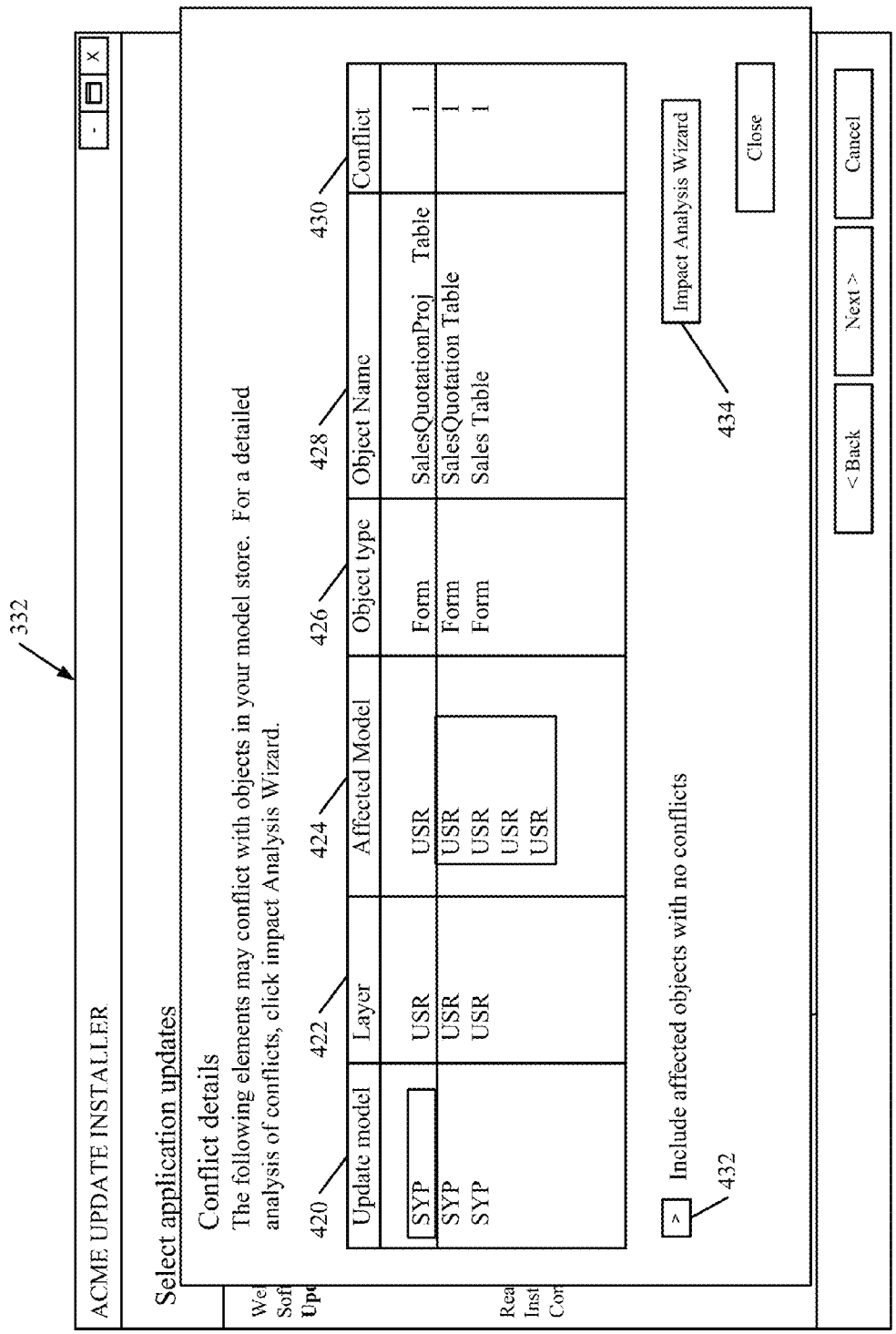

Generating a display to show the level of conflicts that will be created by the selected conflicts will now be described. FIGS. 16-18 show various user interface displays that can be generated by conflict resolution component 119 in order to display the various conflicts that will be encountered if the user applies the selected updates to the identified environment in business system 101. It is first assumed that the user has selected parent node 348 in result display pane 340 (which will automatically select the child nodes, such as child node 350). It is also assumed that the user has actuated the conflicts tab 364. Conflict resolution component 119 then analyzes the various conflicts that will be generated in the portions of business system 101 represented by parent node 348, and its corresponding child nodes 350. Of course, the system can generate a progress display 412, as desired.

FIG. 17 shows that conflicts tab 364 is now populated with conflict summary information 414 that summarizes the various conflicts that will occur in the part of system 101 corresponding to parent node 348 and corresponding to child nodes 350. It can be seen, for instance, that conflicts will be generated in two tables, five classes, four forms, no reports, and three other elements. Conflicts tab 364 also illustratively includes a conflict details user input mechanism 416. If the user actuates mechanism 416, conflict resolution component 119 illustratively generates a conflict details display such as that shown in FIG. 18. It can be seen that the display in FIG. 18 includes conflict details pane 418. Conflict details pane 418 identifies the update (or update model) generally at 420 that may conflict with objects in the model store (or environment) selected by the user. The conflict information includes, for instance, the particular layer 422 that may have a conflict, the affected model 424, the object type 426, the object name 428, and an identification of the number of conflicts 430. In one embodiment, pane 418 also includes user input mechanism 432 that allows the user to view the objects that are affected by the updates, even if there are no conflicts identified.

Figure 19:
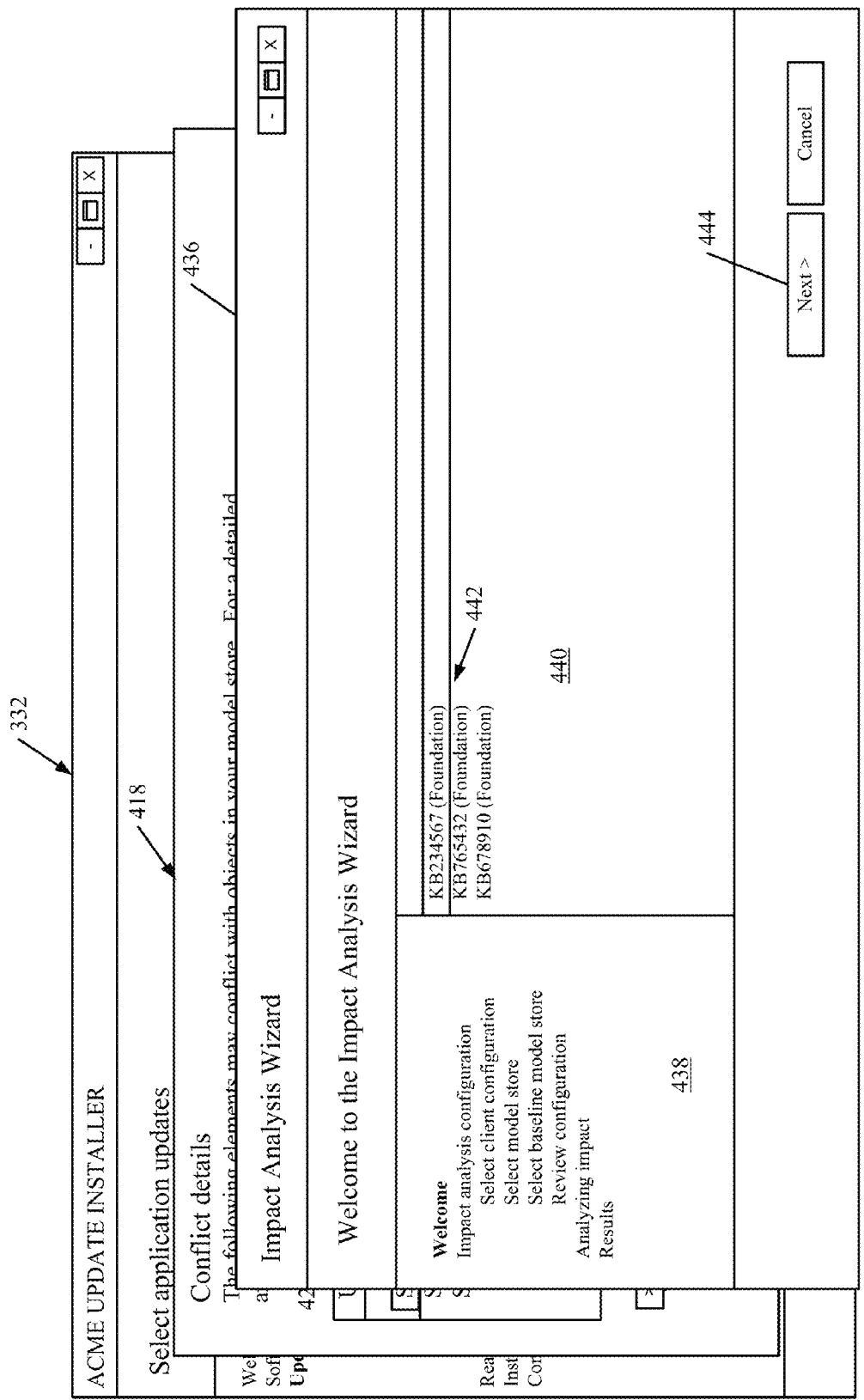
Figure 21:
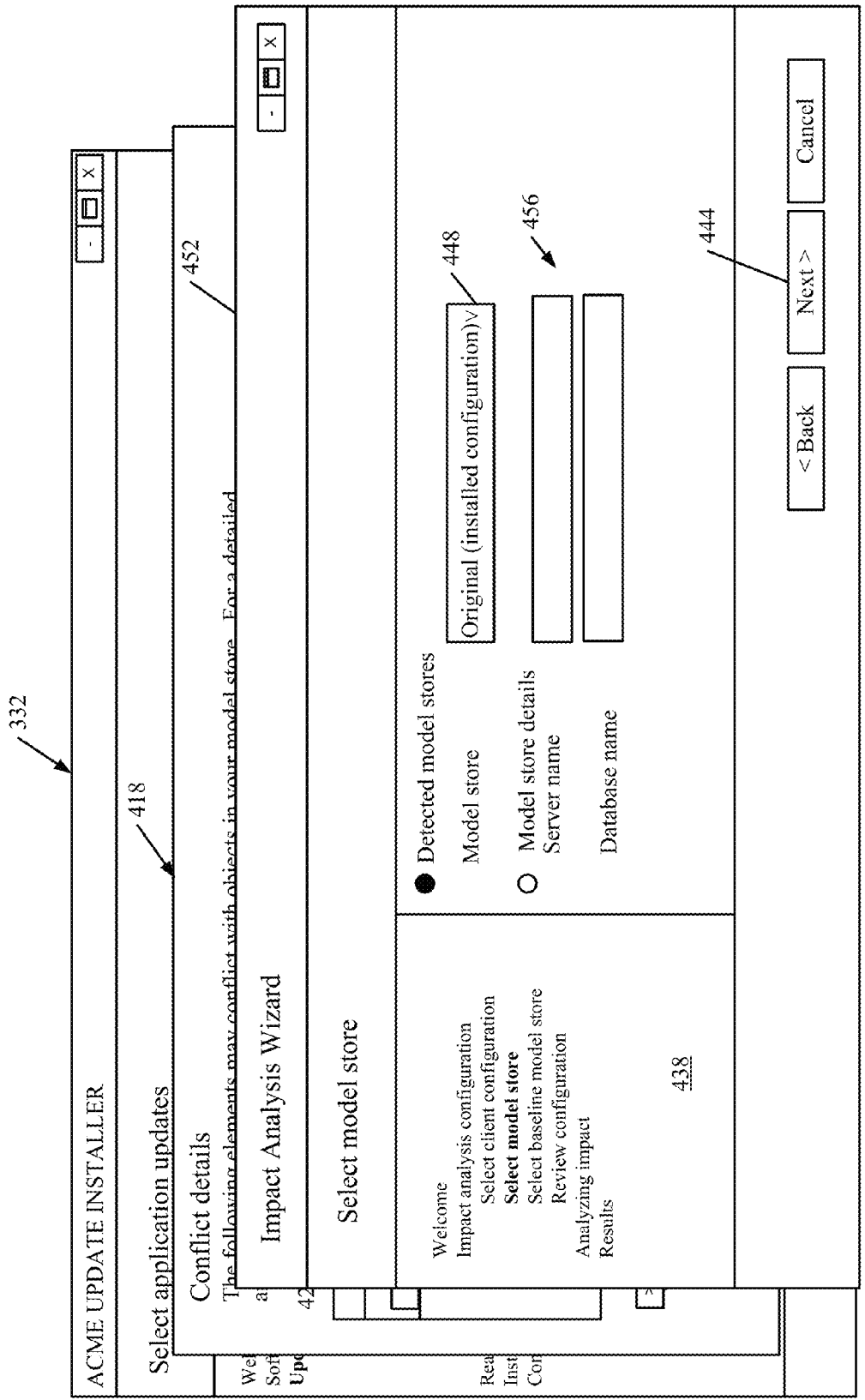

Generating a display showing object and layer level impact will now be described. It may be that the user wishes to view a more detailed impact analysis that shows the particular layers, models, object types, and specific objects, that are affected by the selected updates. In doing so, the user can illustratively actuate impact analysis wizard user input mechanism 434 in order to invoke impact analyzer component 132 in update installer component 106. When the user does this, impact analyzer component 132 generates an impact analysis pane such as pane 436 shown in FIG. 19. Pane 436 illustratively includes a navigation section 438 that allows the user to see where the user is in the impact analysis flow. Pane 436 also illustratively includes an update display 440 that shows the particular updates 442 for which the impact analysis is being performed. The user can verify this information and actuate next button 444. Impact analyzer component 132 then generates user interface display 446 that allows the user to select a client configuration or configuration file to be used in performing the impact analysis. The user can illustratively select a client configuration using user input mechanism 448 and a configuration file using user input mechanism 450. Once the client configuration is selected, the user can illustratively actuate next button 444. This causes impact analyzer component 132 to generate user interface display 452 shown in FIG. 21, which allows the user to select a model store which will be used in performing the impact analysis. The user can select one of a number of model stores that are detected in system 101 using user input mechanism 454. The user can also specifically identify a different model store using input mechanism 456. The user can then actuate next button 444.

Figure 23:
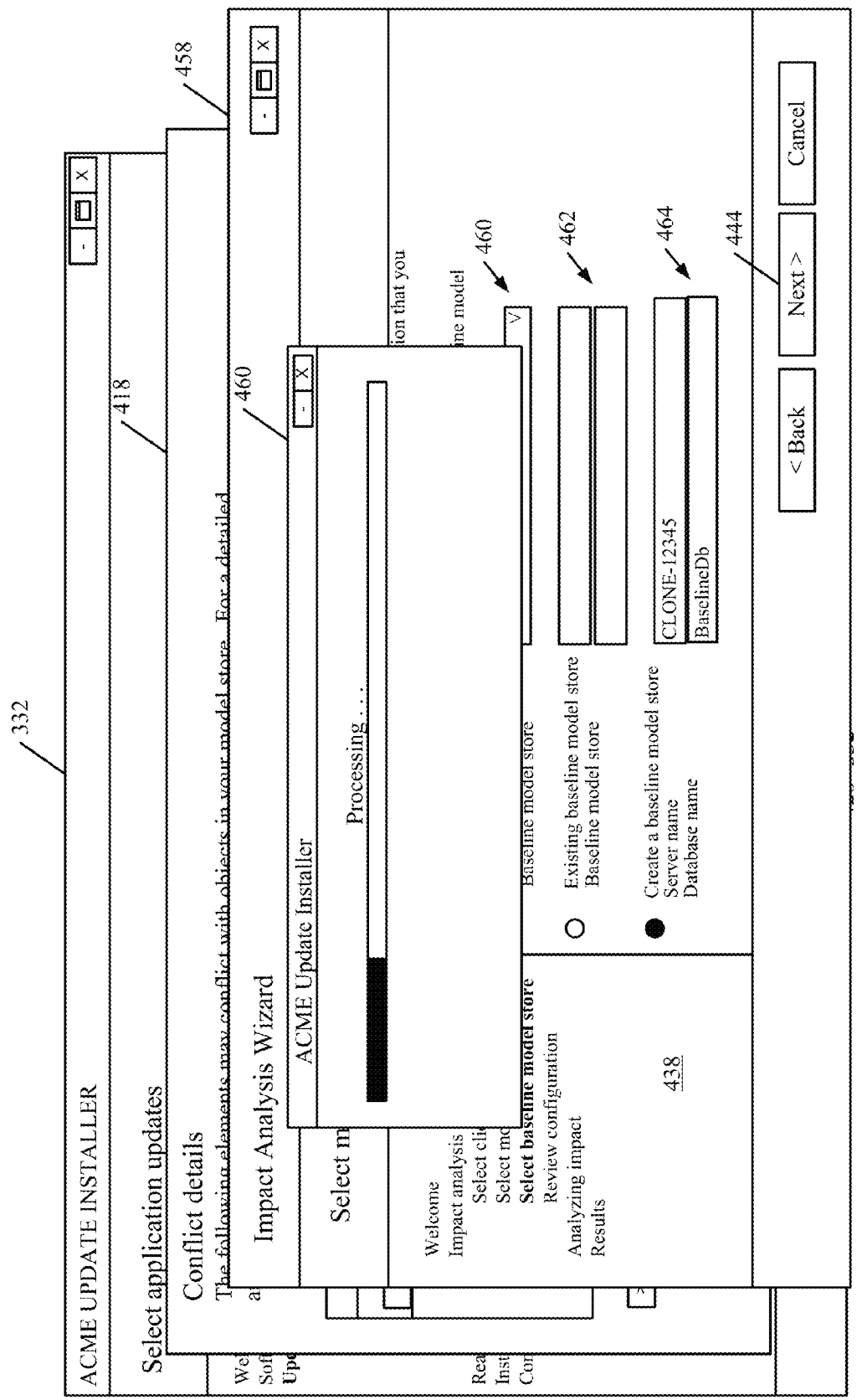

This causes impact analysis component 132 to generate a pane 458 shown in FIG. 2. Pane 458 allows the user to select a baseline model store, associated with the selected client configuration, the model store holds the particular update or update set that is to be analyzed by impact analyzer component 132. The user can illustratively select a model store that has been detected using input mechanism 460. The user can also illustratively select an existing baseline model store using input mechanism 462, or the user can create a new baseline model store using input mechanism 464. Once the user has identified the baseline model store that holds the particular update or update set to be analyzed, the user can illustratively actuate next button 444. At any point during the processing, the system can illustratively generate a progress indicator, such as indicator 460 shown in FIG. 23.

Figure 24:
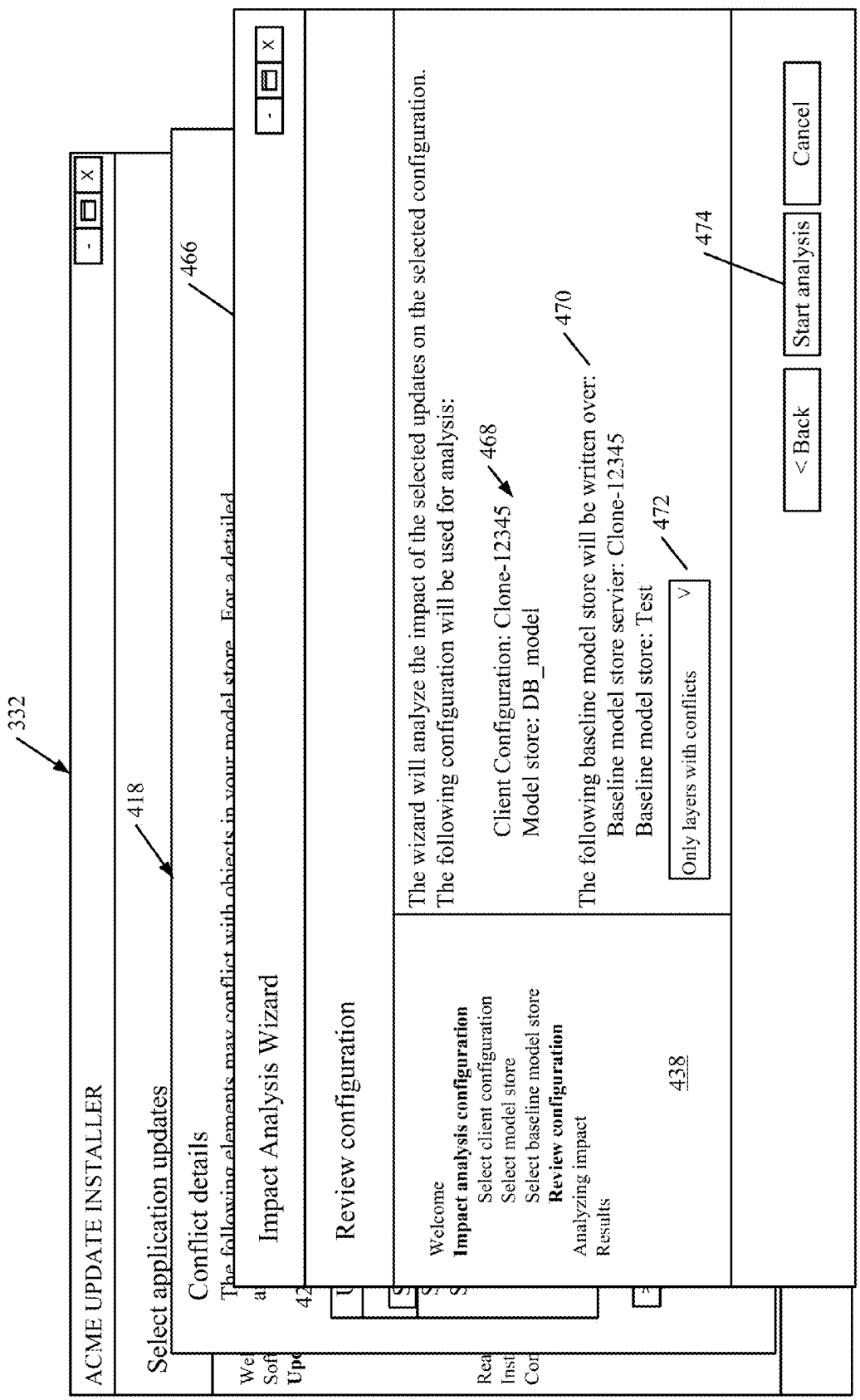

In any case, impact analyzer component 132 then displays the overall configuration that the user has identified for analysis. This can be done by generating a display, such as display 466 shown in FIG. 24. Display 466 illustratively displays a summary 468 of the selected configuration and explicitly indicates that the baseline model store will be written over at 470. Display 466 also illustratively allows the user to select the layers to be analyzed by impact analyzer component 132 using input mechanism 472. For instance, the user can select the analysis to be performed on all layers that are affected by the selected updates, or on only those layers that have conflicts, as examples.

Figure 25:
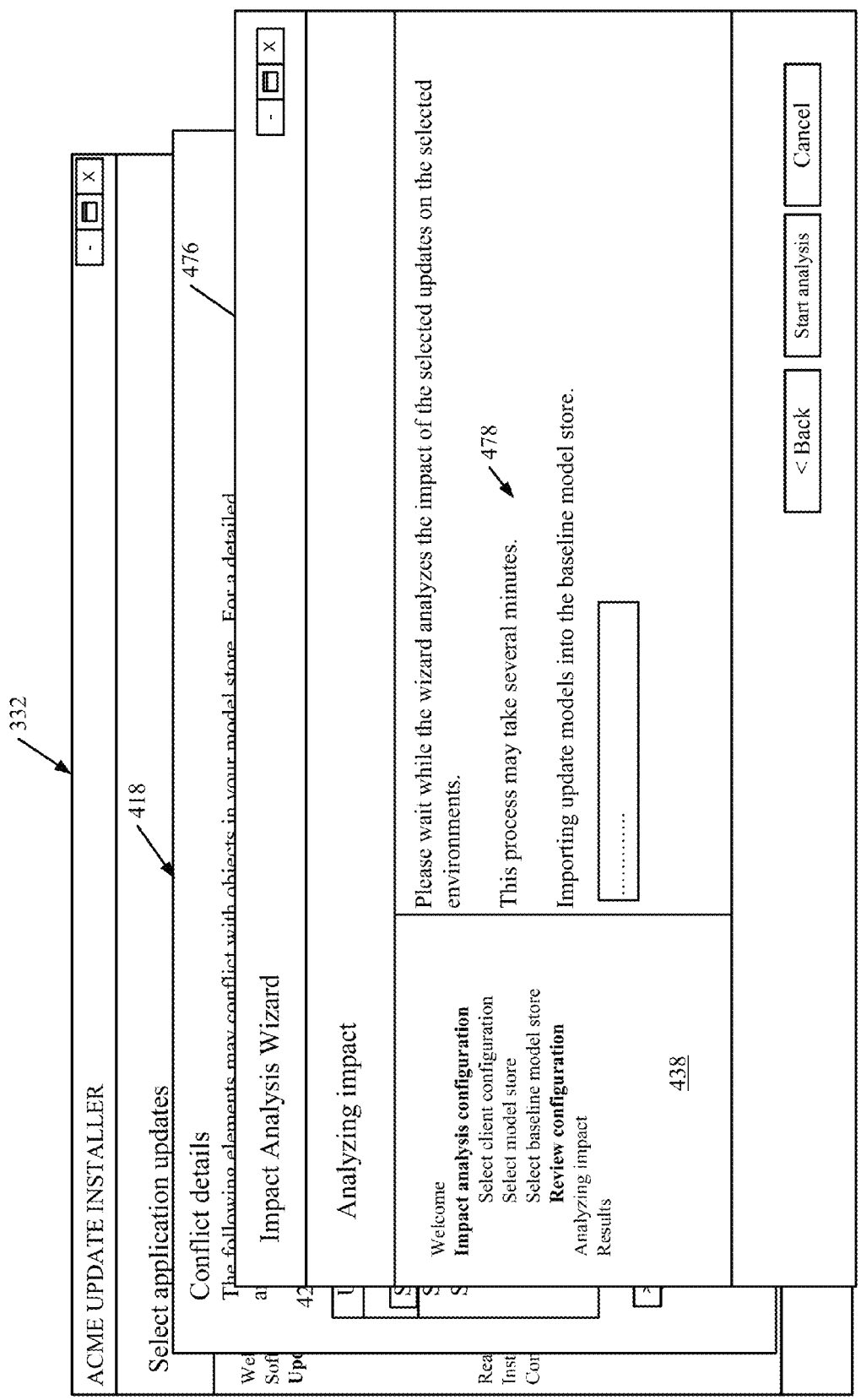

When the user actuates start analysis button 474, impact analyzer component 132 performs the impact analysis, to generate information indicative of how the selected updates will impact the model files and other parts of system 101, in the configuration specified by the user. In doing so, impact analyzer component 132 can generate progress update displays, such as display 476 shown in FIG. 25. By way of example, display 476 is showing that impact analyzer component 132 is currently importing the update models into the baseline model store. This is shown generally at 478.

Figure 26:
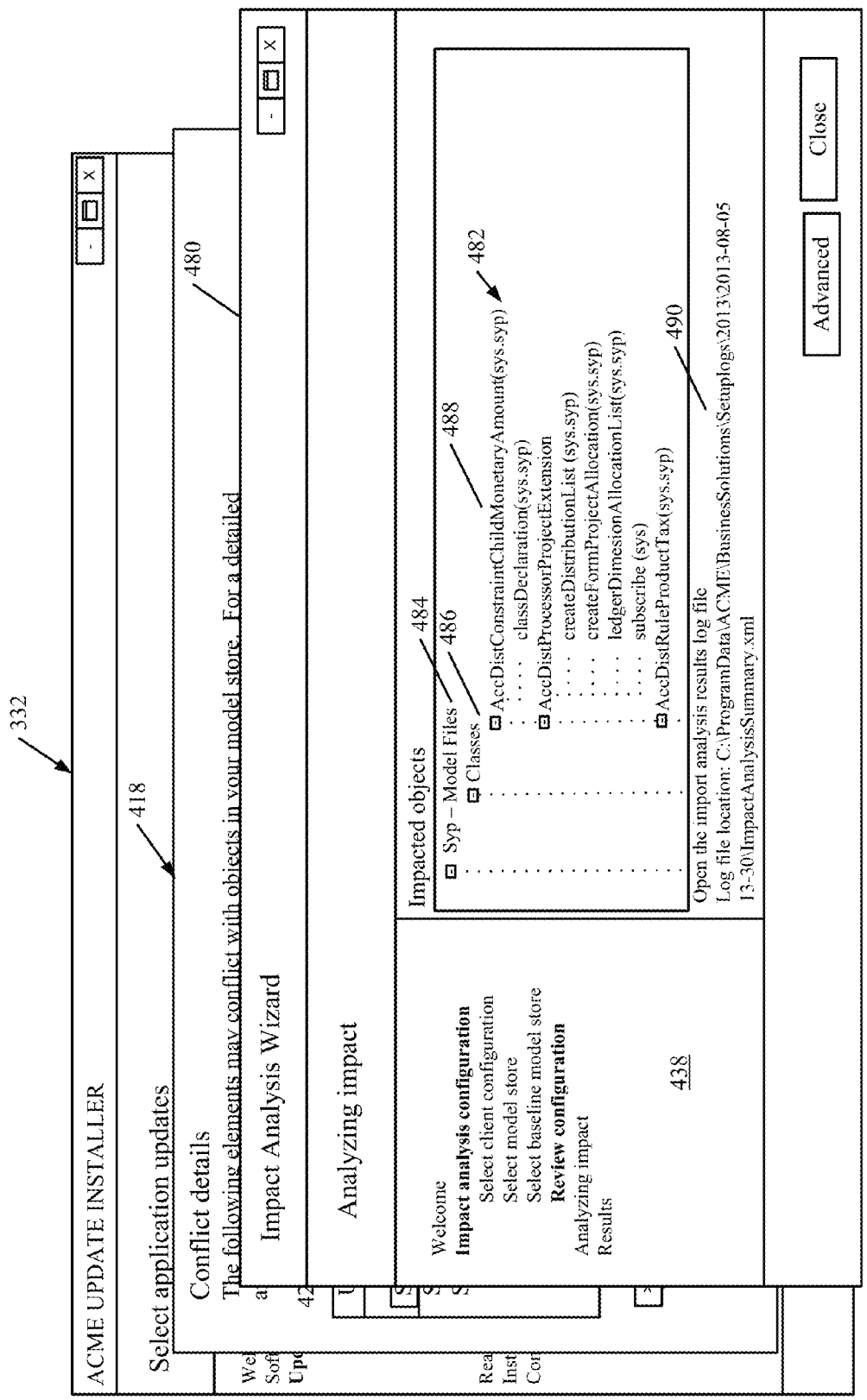

Once impact analyzer component 132 has completed its analysis, it illustratively generates an impact display that displays the impact information. The impact information generally indicates the impact that the selected updates will have on the objects identified by the user. One example of an impact analysis display is display 480 shown in FIG. 26. Display 480 illustratively includes a hierarchical structure 482 that identifies the particular impacted objects. The structure 482 not only identifies the model files at node 484, but also the classes at node 486 and sub-classes at 488. Of course, a wide variety of other information can be identified as well. In addition, should the user wish to examine the results of the analysis, the user can illustratively actuate results button 490 to view more detailed results.

Figure 1D:
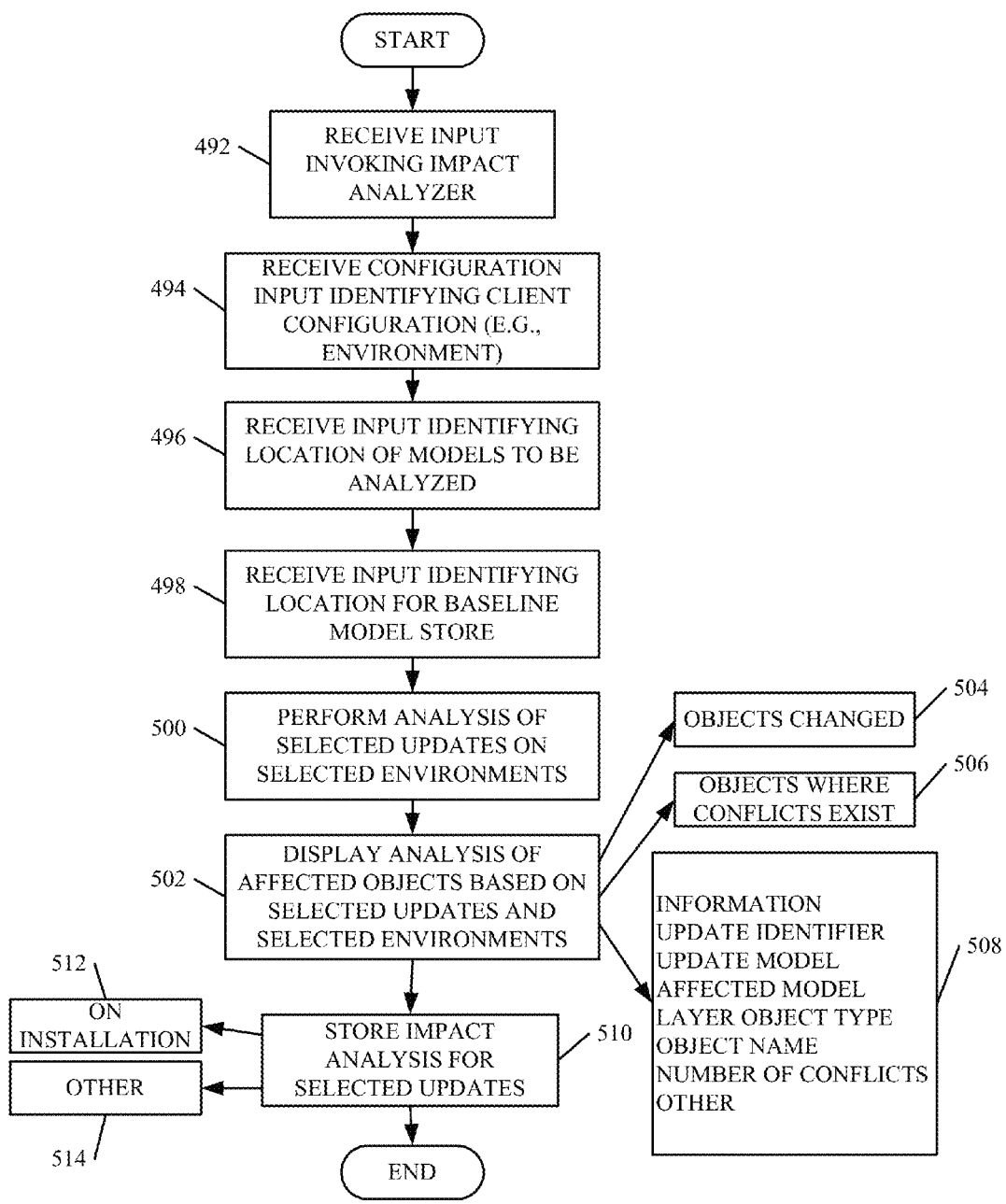
FIG. 1D is a flow diagram illustrating one embodiment of the operation of the architecture shown in FIG. 1 in generating an object and layer level impact analysis.
Figure 2:
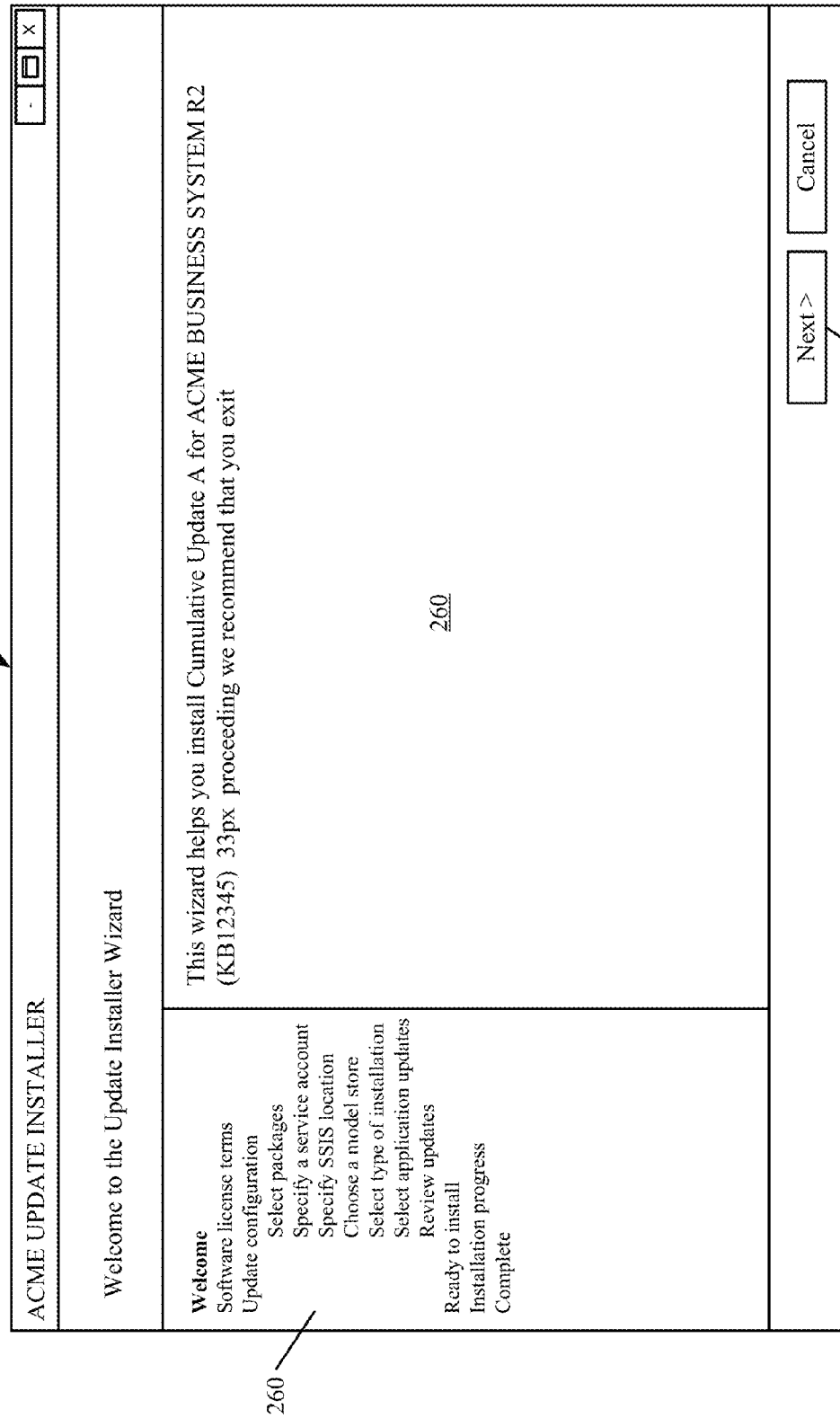
Figure 3:
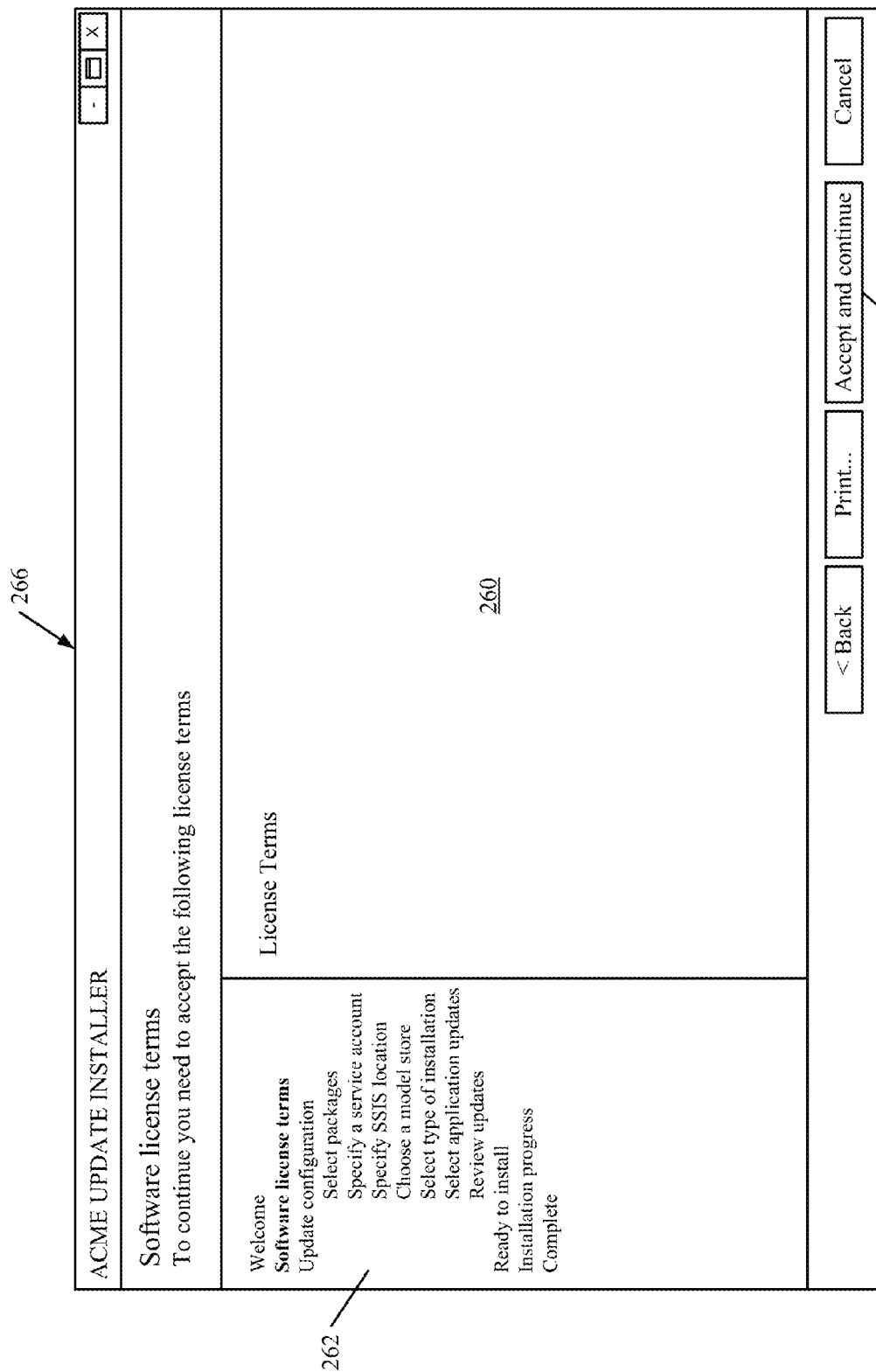
Figure 20:
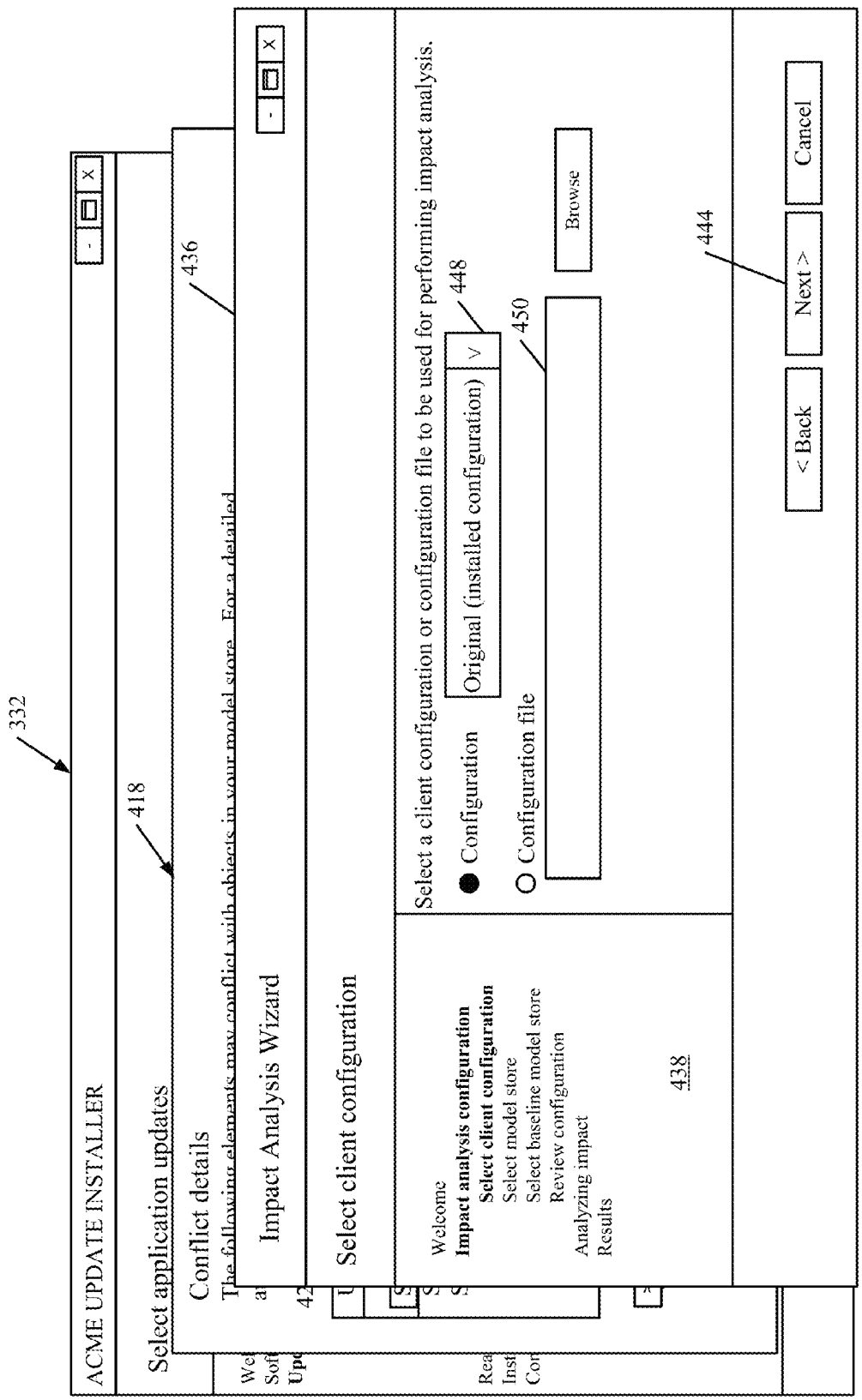
Figure 22:
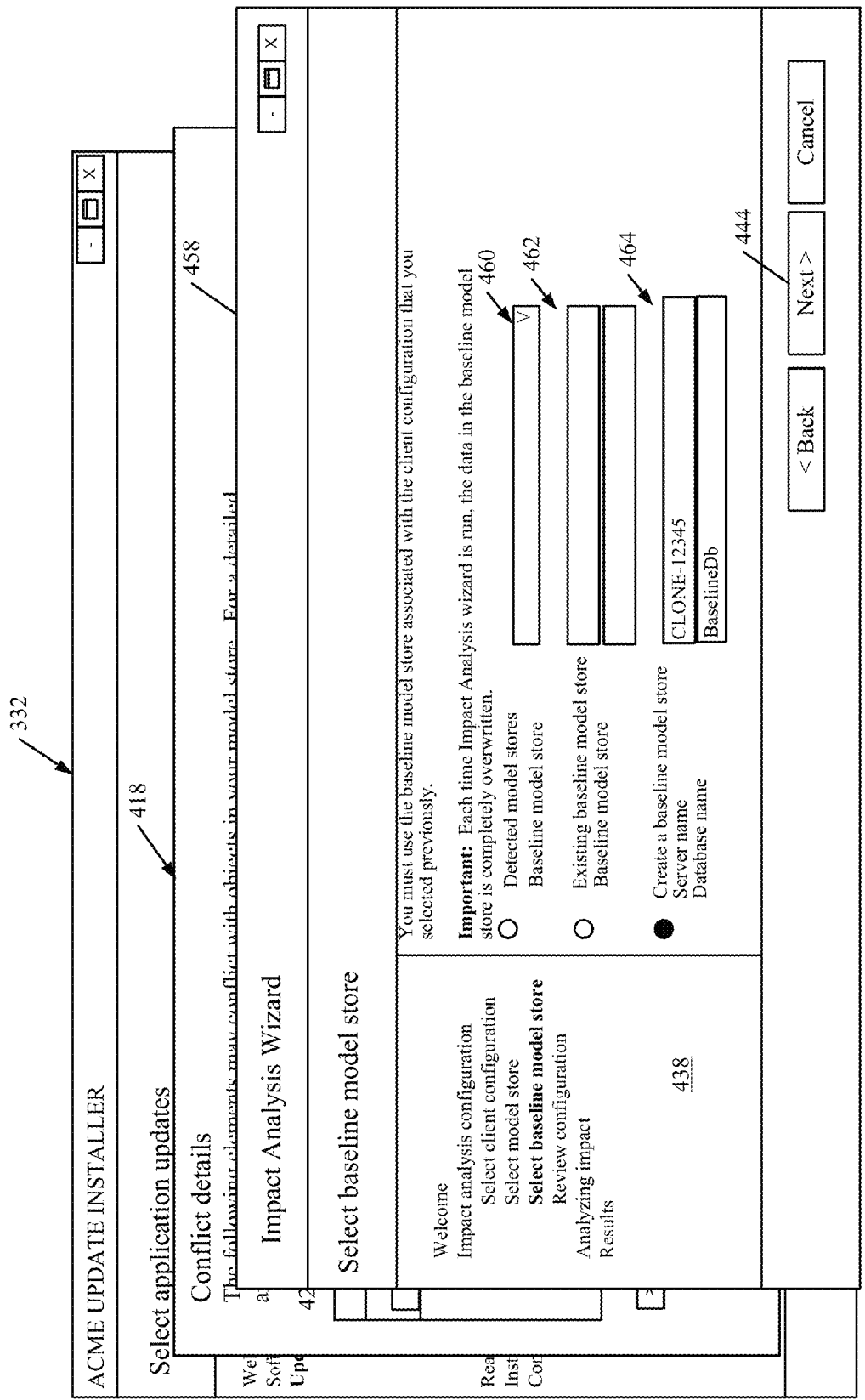

FIG. 1D is a flow diagram illustrating, in more detail, one embodiment of the overall operation of impact analyzer component 132 in performing the impact analysis that the selected updates will have on the identified configuration of system 101. Impact analyzer component 132 first receives an input invoking it to perform an analysis. This is indicated by block 492. This can be done, for example, by having the user actuate the impact analysis wizard button in FIG. 18. Component 132 then receives configuration inputs from the user identifying a selected client configuration (or environment). This is indicated by block 494 and is described above with respect to FIG. 20. Component 132 then receives user inputs identifying a location of the models to be analyzed. This is indicated by block 496 and is described above with respect to FIG. 21. Component 132 then receives an input identifying a location of the baseline model store that holds the updates to be analyzed. This is indicated by block 498 and is described above with respect to FIG. 22. Impact analysis component 132 then performs the analysis to identify the impact of the selected updates on the selected environment. This is indicated by block 500. Component 132 then displays the analysis of the affected objects based upon the selected updates and selected environment. This is indicated by block 502.

The displayed information can take a wide variety of different forms. For instance, it can identify the objects that will be changed as indicated by block 504. It can identify objects or conflicts that exist as indicated by block 506. It can also include a wide variety of other information such as the particular update identifier that caused the impact, the update model, the affected model, the layer, object type, object name, and number of conflicts, among other information. This is indicated at block 508. Impact analyzer component 132 can then store the impact analysis information, for the selected updates, for later use. This is indicated by block 510 in FIG. 1D. It can be stored on installation of the selected updates as indicated by block 512, or it can be stored at other times as well, as indicated by block 514.

Continuing on with the description of the flow diagram of FIG. 1B, user 114 can, at any time, view the current update state or history for system 101 by accessing update state tracking information 210 in life cycle system 200. This is indicated by block 390 in the flow diagram of FIG. 1B.

At this point in the description, the user has now selected a potential set of updates to be applied (or installed) and has reviewed not only the impact that the selected updates will have on the set of business processes in business system 101, but the impact it will have on the object and layer levels as well. The user has reviewed the conflicts that will be generated and can review even detailed information corresponding to the impact and to the conflicts. Thus, it may be that, after reviewing this information, the user wishes to select different updates and view the impact that they will have. This is indicated by block 516 in FIG. 1B. If this happens, processing reverts to block 318, where the user can select different updates. If not, however, then the current update selection is saved. It can be saved along with impact analysis information 211 that shows the impact that the selected updates will have on the business processes 112 in system 101 and on the objects and layers in system 101. This is indicated by block 518. The update selection is saved so that it can be exported for application in other environments as well.

Figure 27:
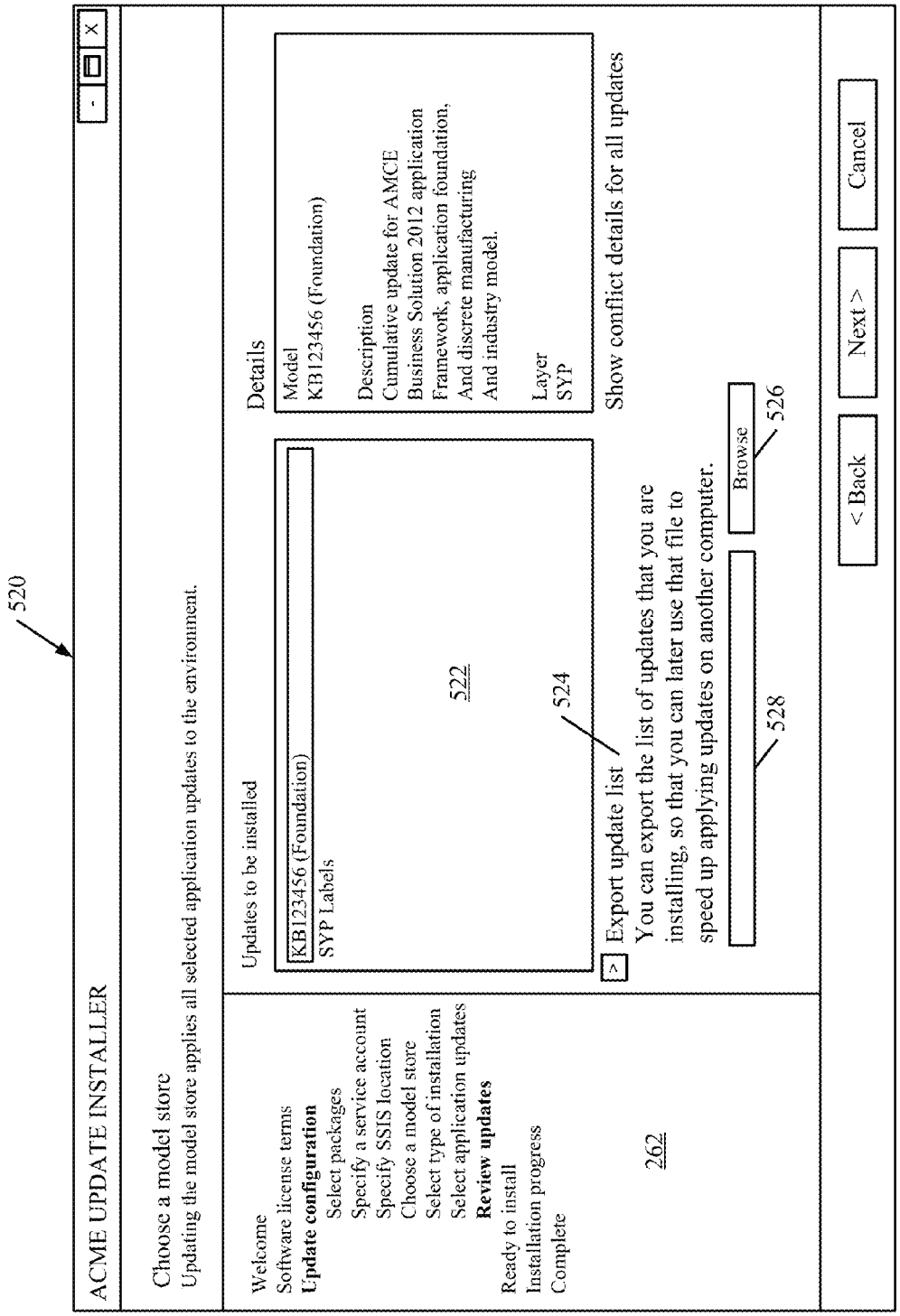

By way of example, update installer component 106 can generate a user interface display, such as display 520 shown in FIG. 27. Display 520 includes an updates display pane 522 that shows the updates that have been selected for installation by the user. Display 520 also illustratively includes an export user input mechanism 524 that allows the user to export the selected updates so that they can be used later to speed up applying updates on another computer or in a different environment that the user accesses. When the user actuates input mechanism 524, the user is illustratively allowed to browse using user input mechanism 526 for a location where the list of updates is to be exported. The user can select the location for export and this will illustratively appear is box 528. The selected updates are exported (or saved) to that location.

Figure 28:
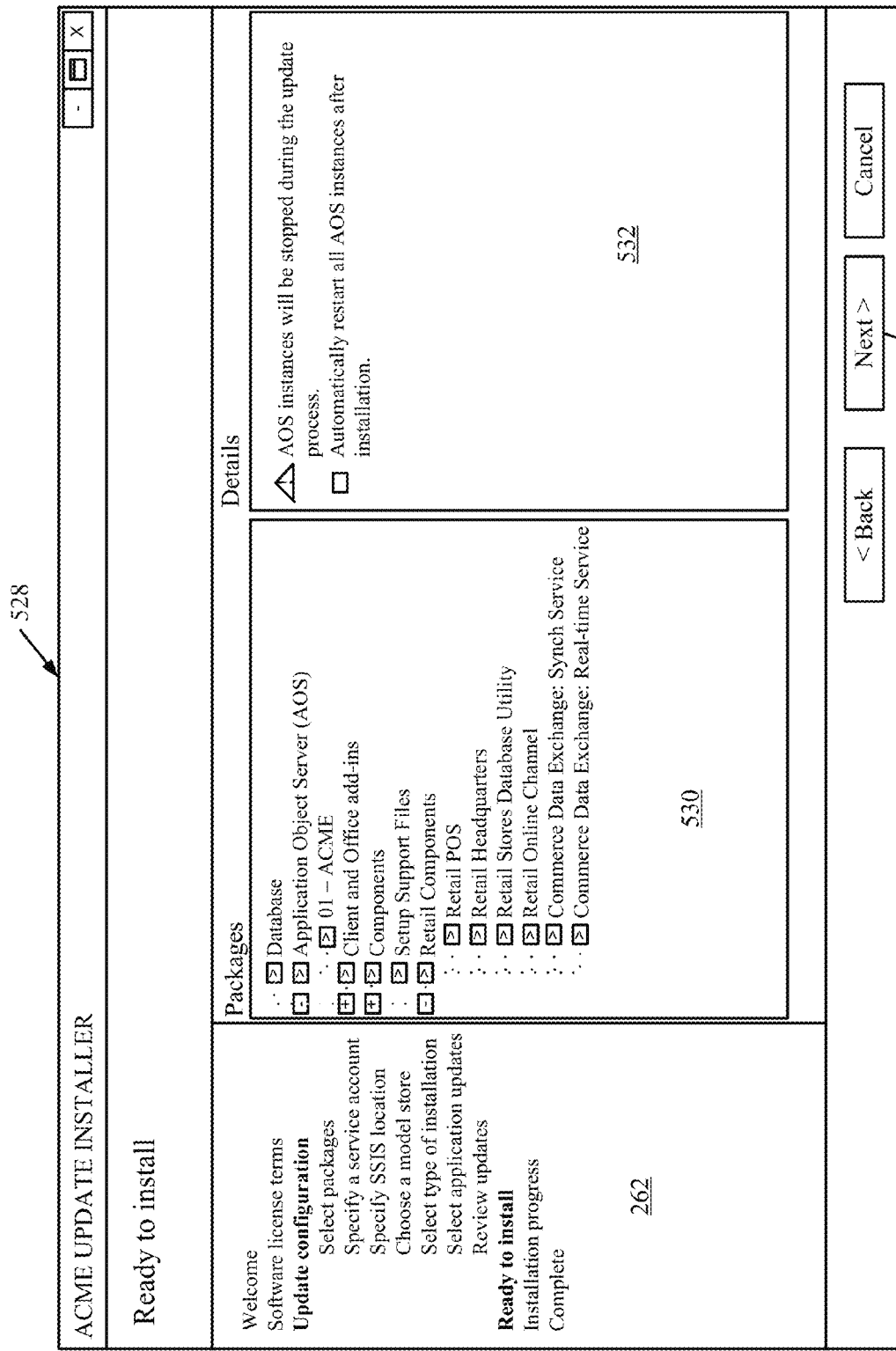

When the user is ready to install the updates, installation engine 136 illustratively generates a user interface display, such as display 528 that allows the user to confirm that the updates are to be installed. Display 528 illustratively includes a components display pane 530 which identifies the particular components that will be updated by the selected updates. Details display pane 532 displays relevant details corresponding to the installation process. For instance, in the embodiment shown in FIG. 28, pane 532 indicates that some instances will be stopped during the update process, and it allows the user to automatically restart those instances after installation.

Figure 29:
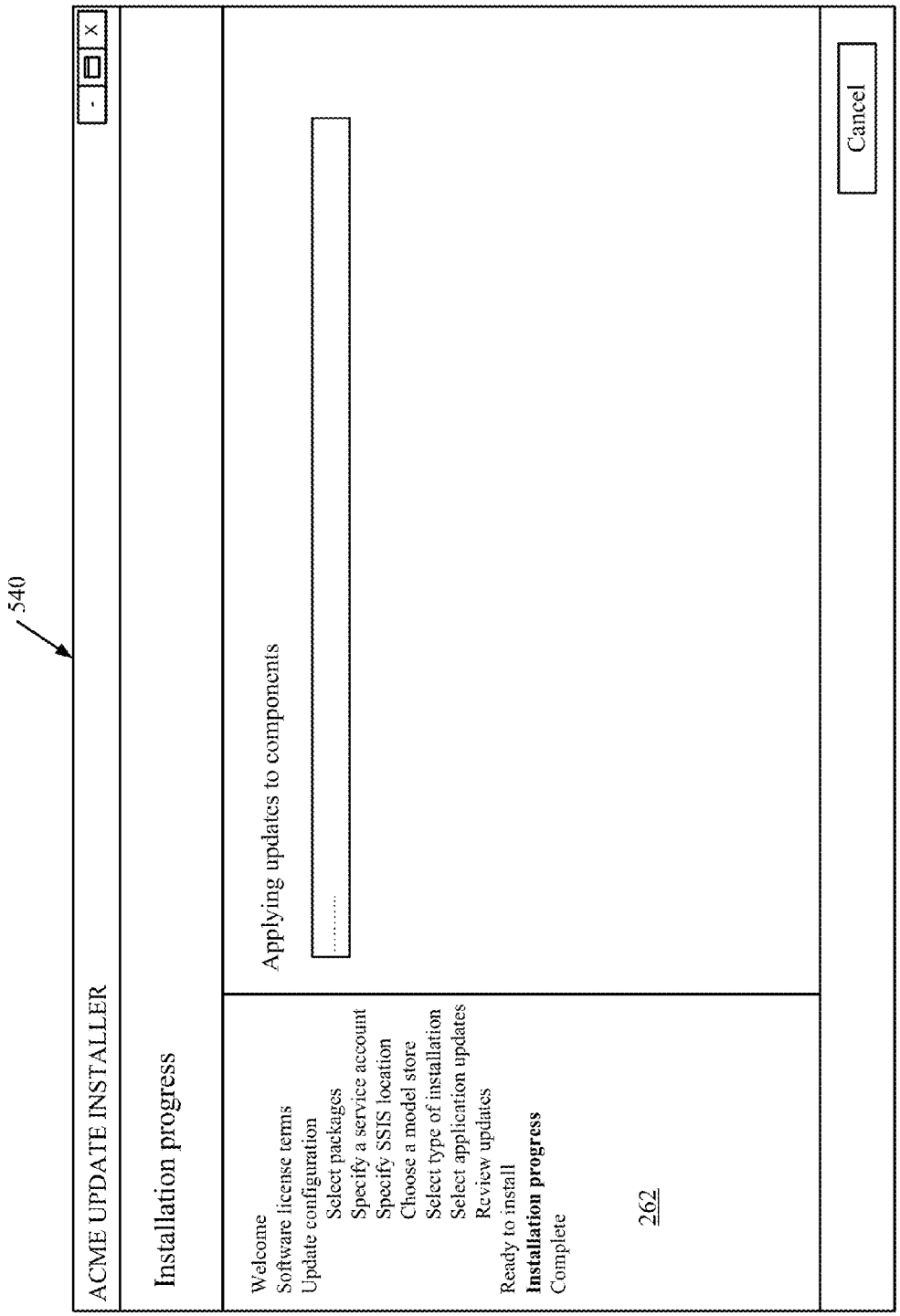

Once the user has confirmed that installation is to commence, the user can illustratively actuate install button 534. This causes installation engine 136 to install the selected updates. This is also indicated by blocks 536 and 538 in the flow diagram of FIG. 1B. During installation, installation engine 136 can generate a progress update display, such as display 540 shown in FIG. 29. Of course, other progress update displays can be shown as well.

Figure 30:
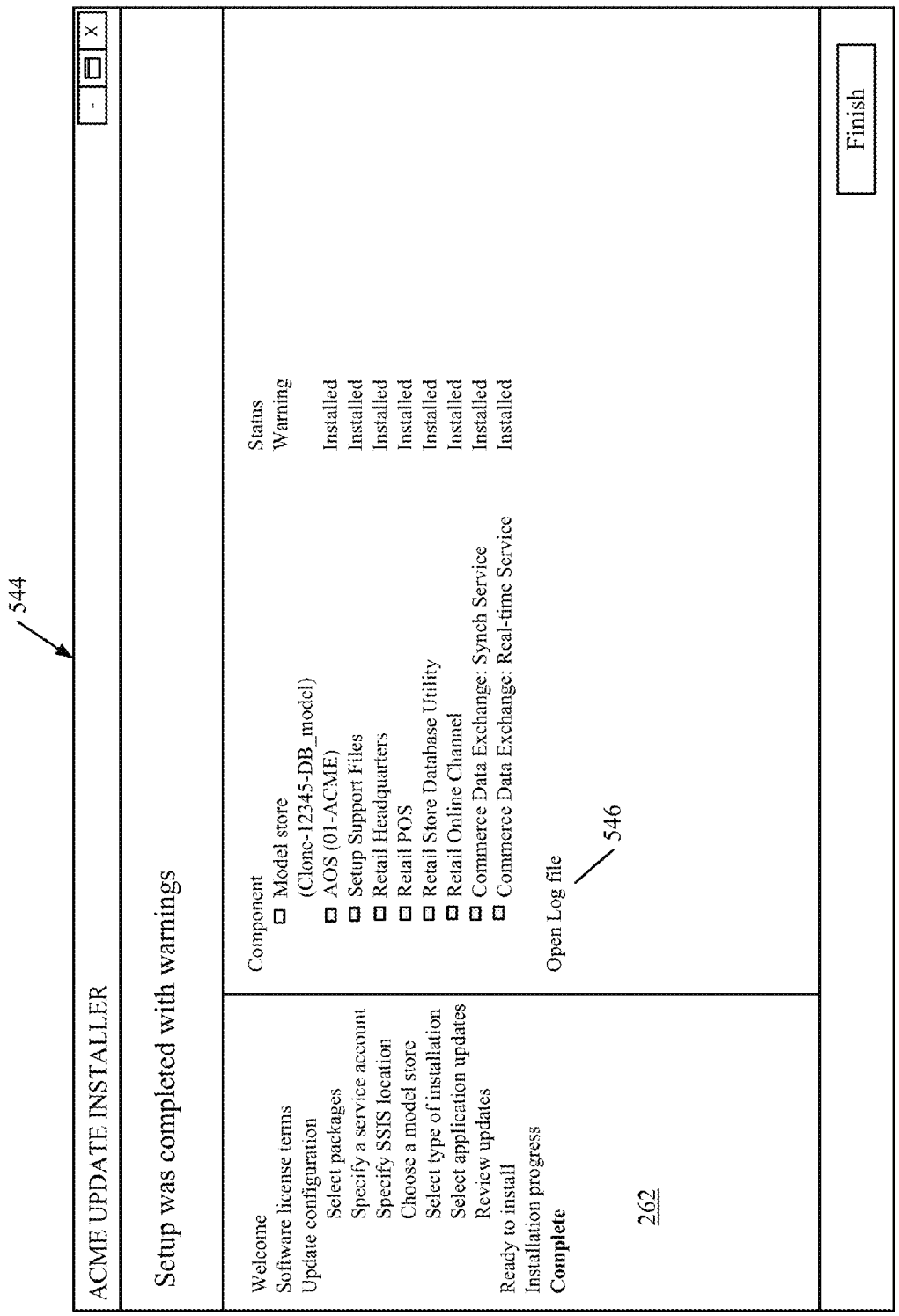

When installation engine 136 completes installing the updates, it also illustratively updates the update state tracking information 210 in life cycle system 200. This is indicated by block 542 in the flow diagram of FIG. 1B. Installation engine 136 then generates a user interface display, such as display 544 shown in FIG. 30 that displays the status of the installation. It can be seen, for example, that the updates to some of the various components have been successfully installed, while the updates to others have not been successfully installed. If the user wishes to view more details, the user can illustratively actuate user input mechanism 546 to be navigated to a more detailed log file that shows the details of the corresponding installation.

Figure 31:
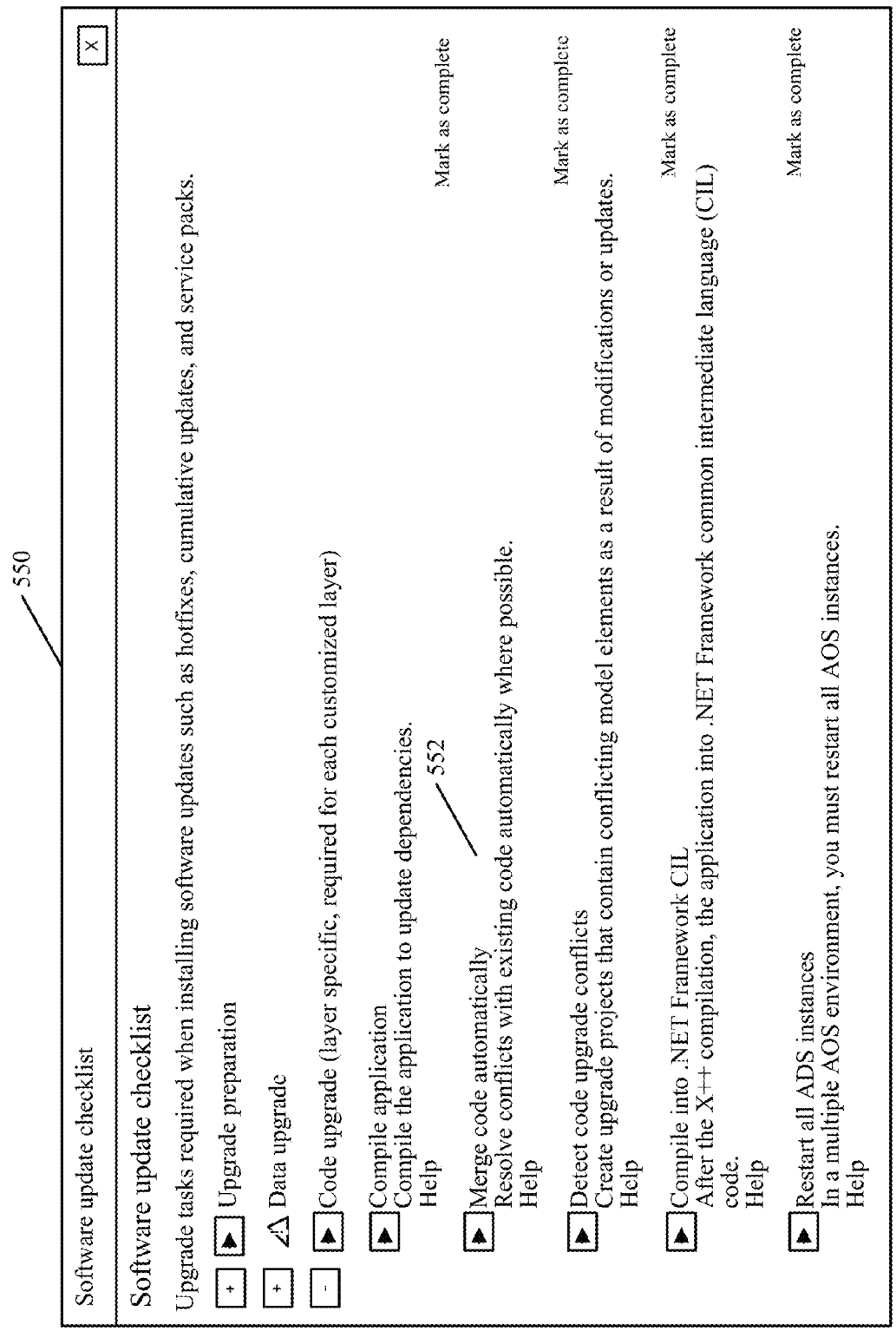

After the installation is complete, conflict resolution component 119 illustratively generates a user interface display that allows the user to request that conflict resolution component 119 will automatically resolve as many conflicts as it can, without user intervention. Resolving conflicts is also referred to herein as performing a code merge. Displaying the user interface display allowing the user to select automatic conflict resolution (or code merging) is indicated by block 548 in the flow diagram of FIG. 1B. FIG. 31 shows one example of user interface display 550 that indicates this.

Figure 32:
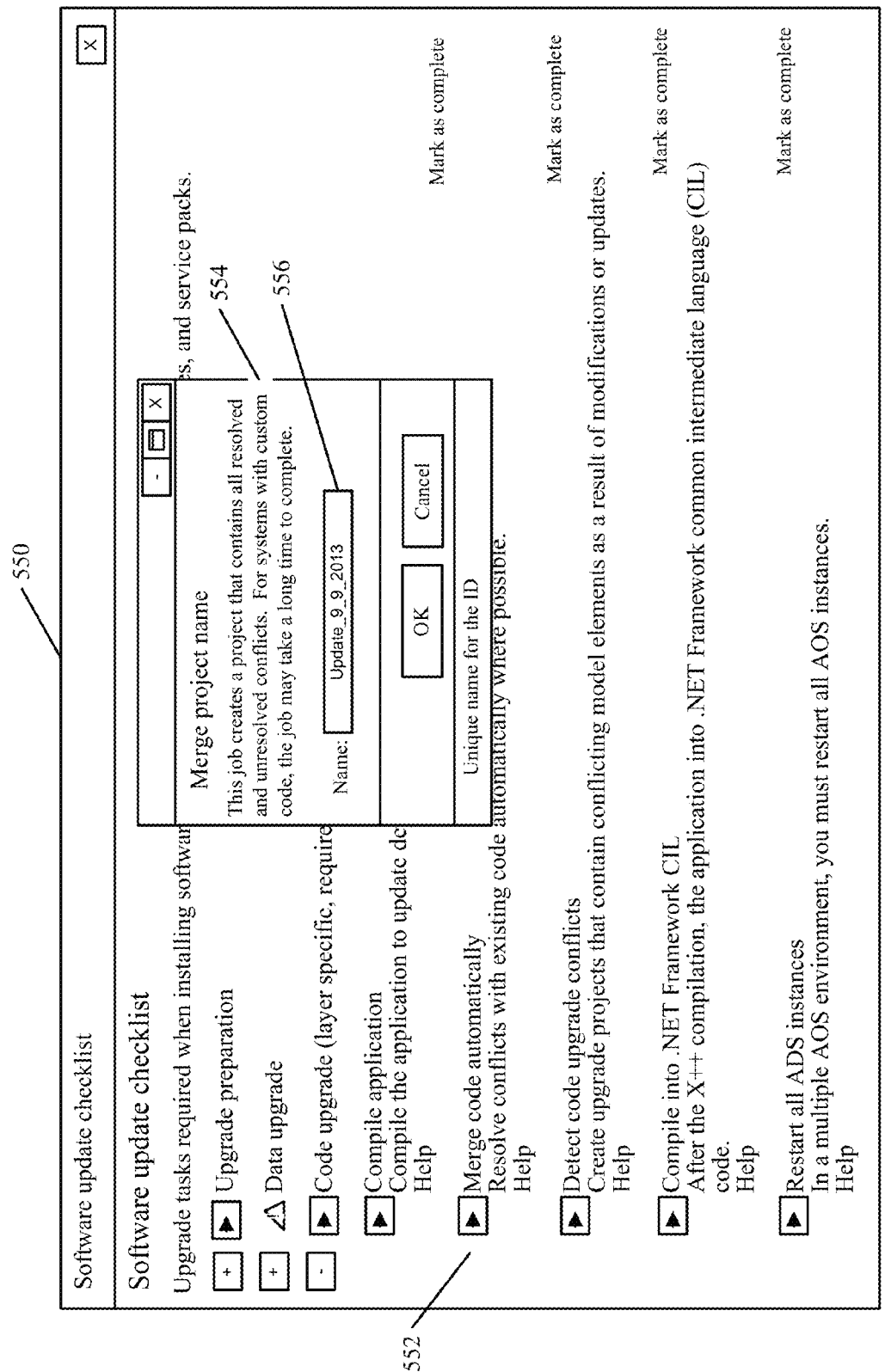

Display 550 includes user input mechanism 552 that can be actuated by the user in order to indicate that the user wishes conflict resolution component 119 to automatically resolve conflicts, where possible. When the user actuates mechanism 552, conflict resolution component 119 illustratively generates a display, such as display 554 shown in FIG. 32. Display 554 allows the user to name the particular merge project name using input mechanism 556. Conflict resolution component 119 then performs the automatic conflict resolution. This is indicated by blocks 558 and 560 in the flow diagram of FIG. 2.

The conflict resolution component 119 can do this in a variety of different ways. For instance, it may be that the base system of business system 101 offered by the manufacturer of system 101 is being updated with cumulative update package 120. Thus, there may be an original base version of system 101, that is updated to obtain an updated version of system 101. However, it may also be that the organization deploying system 101 has modified or otherwise customized the base version of system 101. Thus, in one embodiment, conflict resolution component 119 does a three-way compare that compares the original base version of system 101, with the updated version of system 101, and with the customized version of system 101 that is actually deployed at the organization. Conflict resolution component 119 then performs operations so that the customized version of system 101 that is actually deployed will be updated in a way to eliminate conflicts.

An example may be helpful. For instance, assume that the base version of system 101 has an element named "string S clock". Assume that the user has customized the base version of system 101 so that the element in the deployed version of system 101 is now called "string S+1 clock". If the particular update being installed by the user changes the value of "string S clock" in the base version of system 101, then there is a conflict because the user has already customized that element to "string S+1 clock". Thus, conflict resolution component 119 does a three-way text based comparison to revise the update so that it is consistent with the user's customization of "string S clock" to "sting S+1 clock". Performing a multi-level text based comparison is indicated by block 562 in the flow diagram of FIG. 1B. Of course, conflict resolution component 119 can resolve conflicts in a wide variety of other ways as well, and this is indicated by block 564.

Conflict resolution component 119 then stores conflict resolution (or code merge) results information so that it can be reviewed, or used, later. This is indicated by block 566 in the flow diagram of FIG. 1B. For instance, component 119 can store the object path where the merge was performed as indicated by block 568. It can store the total number of conflicts 570, the number of resolved conflicts 572, and a time stamp 574. Of course, if can store other information 576 as well. This can be stored as code merge information 213 in life cycle system 200, or elsewhere.

The code merge information 213 can be used by the manufacturer of business system 101, update installer component 106 and/or conflict resolution component 119, or others. For instance, it can be used to improve conflict resolution, add more features based on what is normally customized by the user, or other things.

Figure 33:
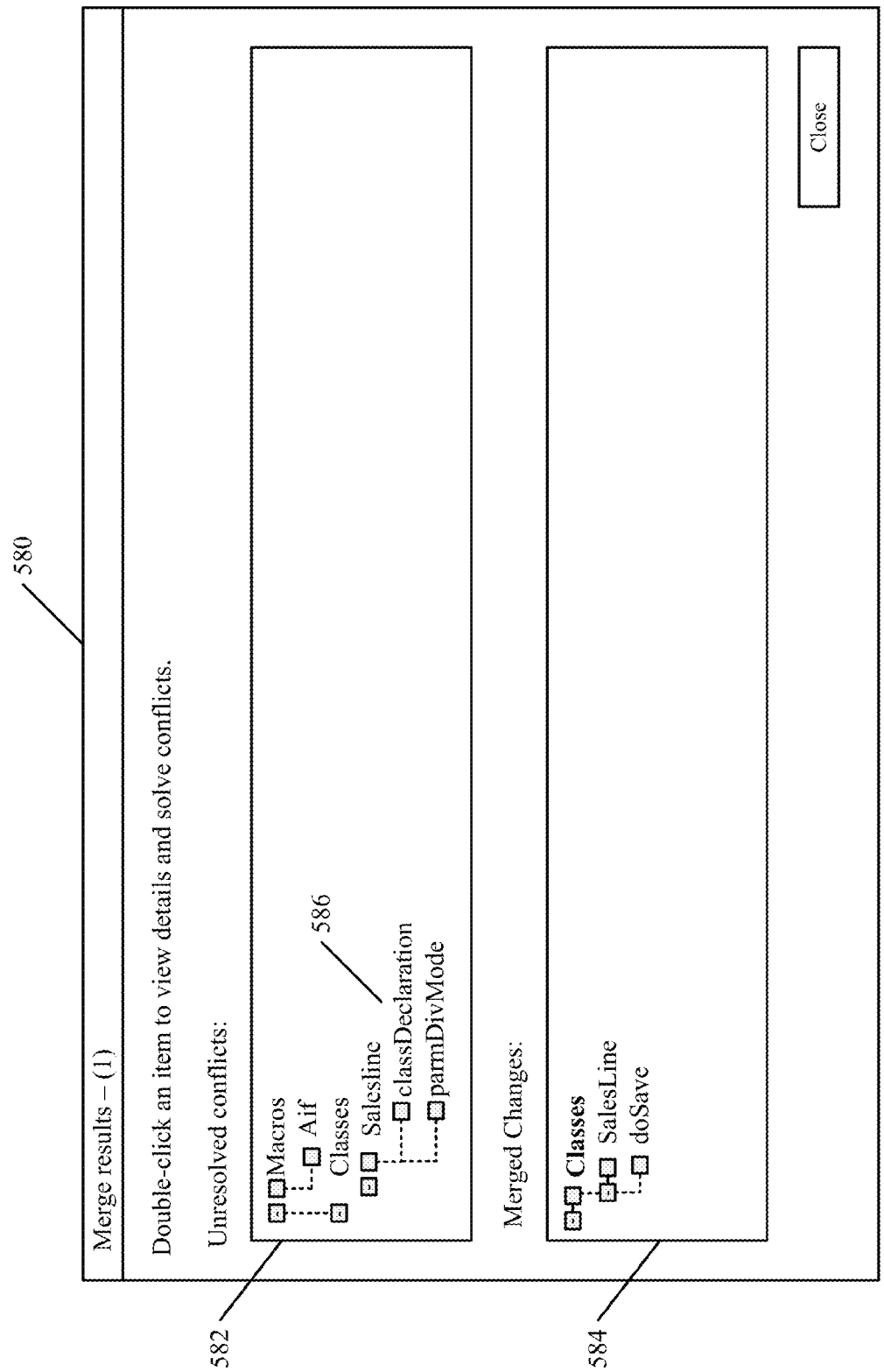

Conflict resolution component 119 then generates a display of the conflict resolution (or code merge) results information for review by the user. This is indicated by block 578. FIG. 33 shows one embodiment of such a display 580. Display 580 illustratively includes an unresolved conflicts display section 582 and a merged (or resolved) conflicts section 584. Both sections show the items or elements where conflicts still exist or where they have been resolved.

In one embodiment, the information in sections 582 and 584 is displayed in terms of user-actuatable input mechanisms. Therefore, when the user actuates one of the items, the user can be navigated to the code location in the code of business system 101 where the conflicts occurred. The user can thus view the details corresponding to those conflicts, or actually work to resolve the conflicts directly from that detailed display screen. For instance, if the user actuates the class declaration node 586 on display portion 582, the user will be navigated to that particular class that contains an unresolved conflict, so that the user can view and work to resolve the conflict. Receiving a user drill down input in this manner is indicated by block 588 in the flow diagram of FIG. 2, and navigating the user to the code location is indicated by block 590.

It will also be appreciated that, where the user has exported the selected updates, they can be applied using the overall operation shown in FIG. 1B, in other environments as well. For example, at block 318, instead of selecting individual updates, the user can import the saved list as indicated by block 330. The processing thus continues to flow as shown in FIG. 1B, except that the selected updates will be those on the imported list, instead of other updates.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 34:
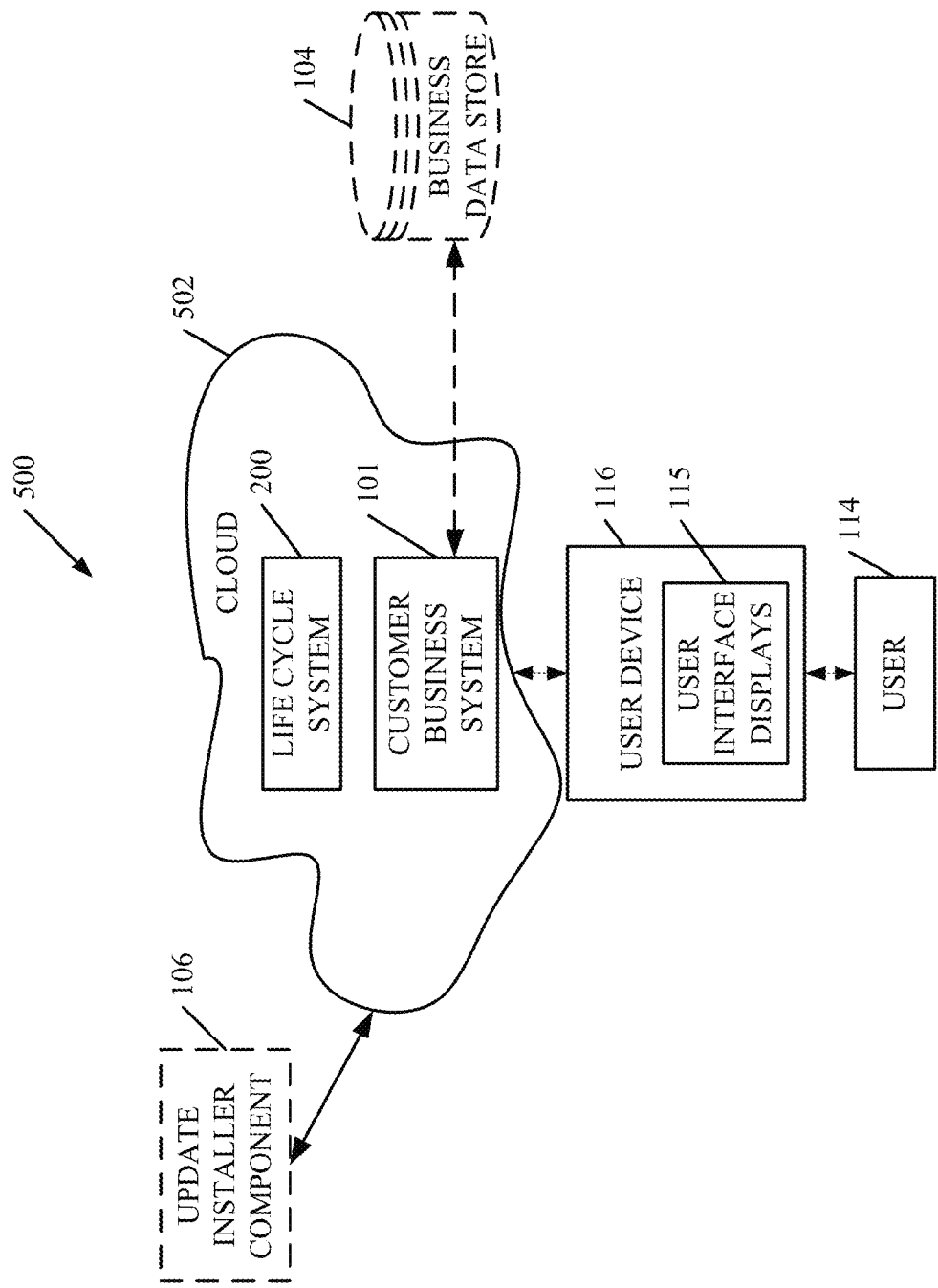
FIG. 34 shows one embodiment of the architecture shown in FIG. 1 deployed in a cloud computing architecture.

Business system 101 and update component 106 or other items in architecture 100 can be on-premise or located (fully or partially) in a cloud (public or private) deployment. FIG. 34 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the embodiment shown in FIG. 34, some items are similar to those shown in FIG. 1 and they are similarly numbered. FIG. 34 specifically shows that systems 101 and 200 can be located in cloud 502 (which can be public, private, or a combination where portions are public while others are private). Therefore, user 114 uses a user device 116 to access those systems through cloud 502.

FIG. 34 also depicts another embodiment of a cloud architecture. FIG. 34 shows that it is also contemplated that some elements of architecture 100 are disposed in cloud 502 while others are not. By way of example, data store 104 can be disposed outside of cloud 502, and accessed through cloud 502. In another embodiment, update installer component can also be outside of cloud 502. Regardless of where they are located, they can be accessed directly by device 116, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 35:
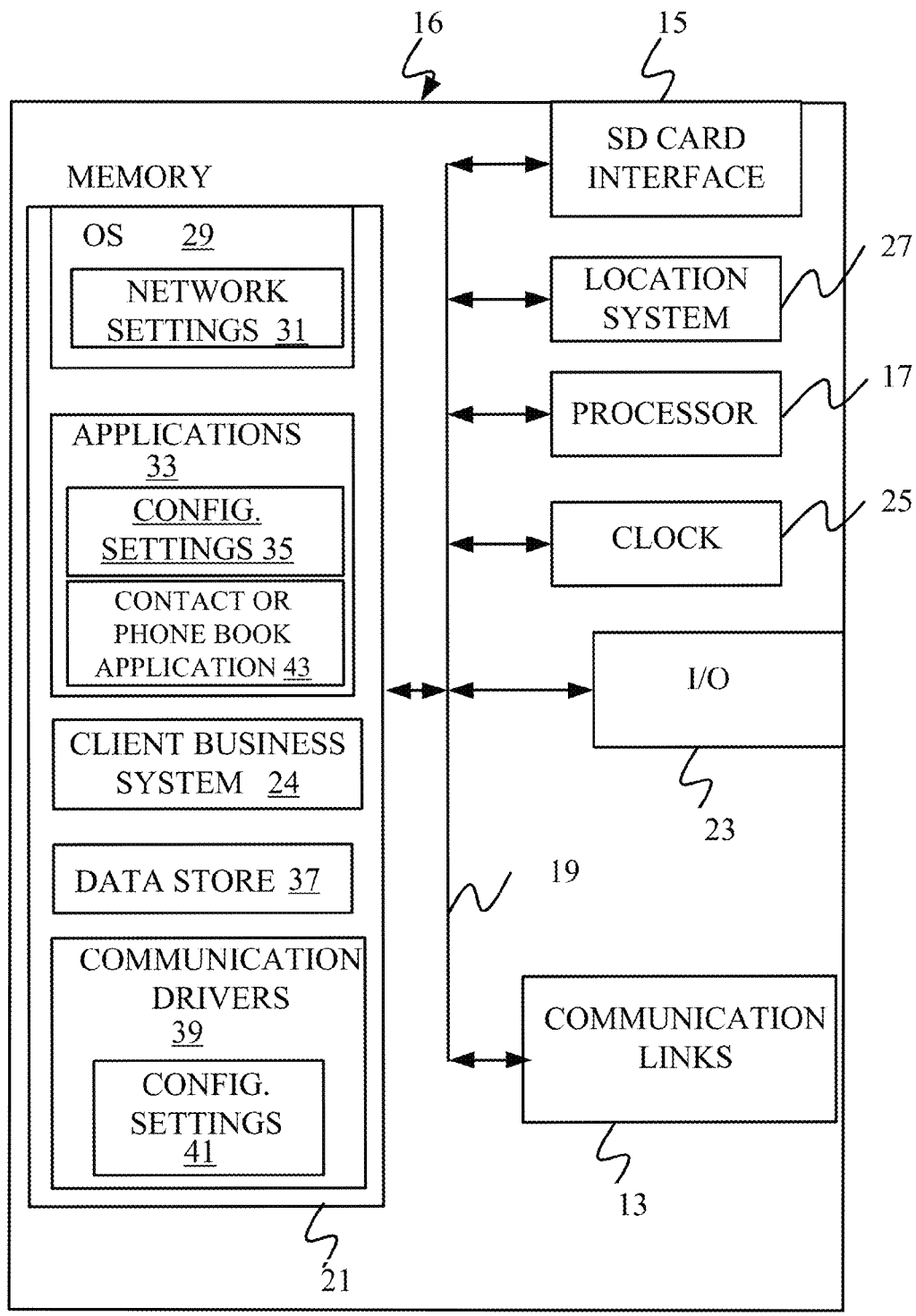
FIGS. 35-40 show various embodiments of mobile devices.

FIG. 35 is a simplified block diagram of one illustrative embodiment of a handheld or mobile computing device that can be used as a user's or client's hand held device 16, in which the present system (or parts of it) can be deployed. FIGS. 36-40 are examples of handheld or mobile devices.

FIG. 35 provides a general block diagram of the components of a client device 16 that can run components of architecture 100 or that interacts with architecture 100, or both. In the device 16, a communications link 13 is provided that allows the handheld device to communicate with other computing devices and under some embodiments provides a channel for receiving information automatically, such as by scanning Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as 802.11 and 802.11b (Wi-Fi) protocols, and Bluetooth protocol, which provide local wireless connections to networks.

Under other embodiments, applications or systems are received on a removable Secure Digital (SD) card that is connected to a SD card interface 15. SD card interface 15 and communication links 13 communicate with a processor 17 (which can also embody processor 102 or processors in system 200 or device 116 from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

Figure 36:
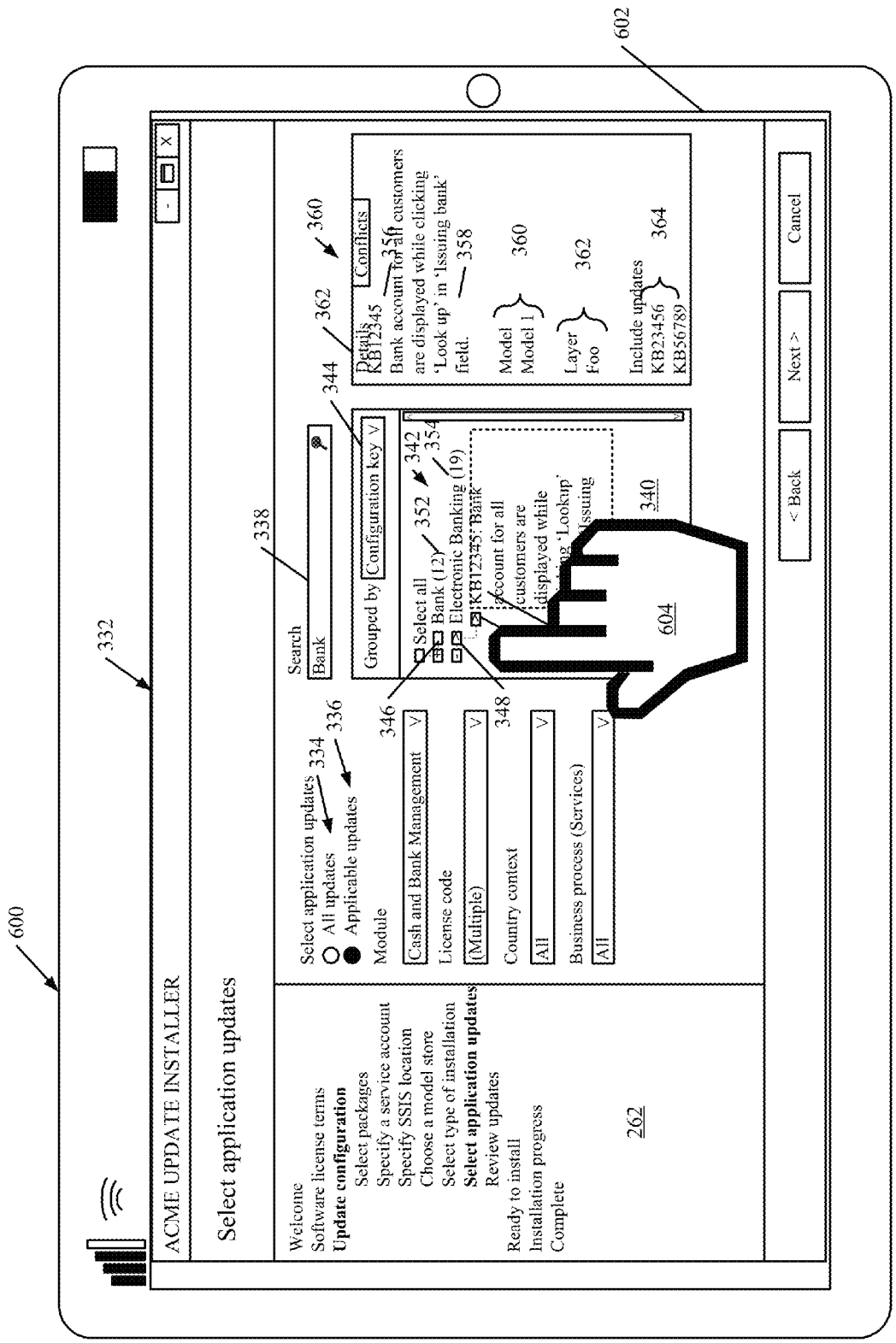

FIG. 36 shows one embodiment in which device 16 is a tablet computer 600. In FIG. 36, computer 600 is shown with user interface display 332 (From FIG. 13) displayed on the display screen 602. Screen 602 can be a touch screen (so touch gestures from a user's finger 604 can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Figure 37:
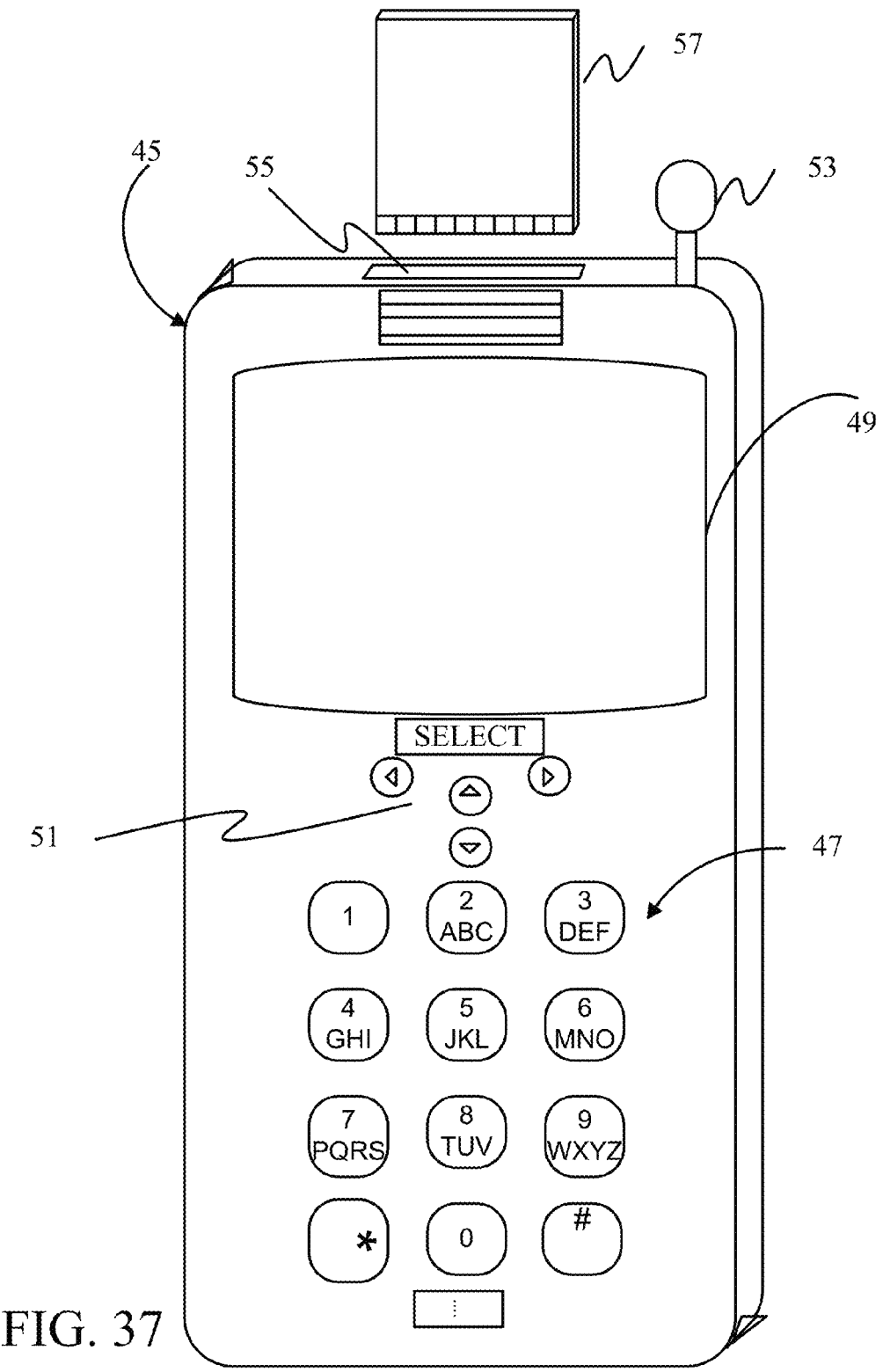
Figure 38:
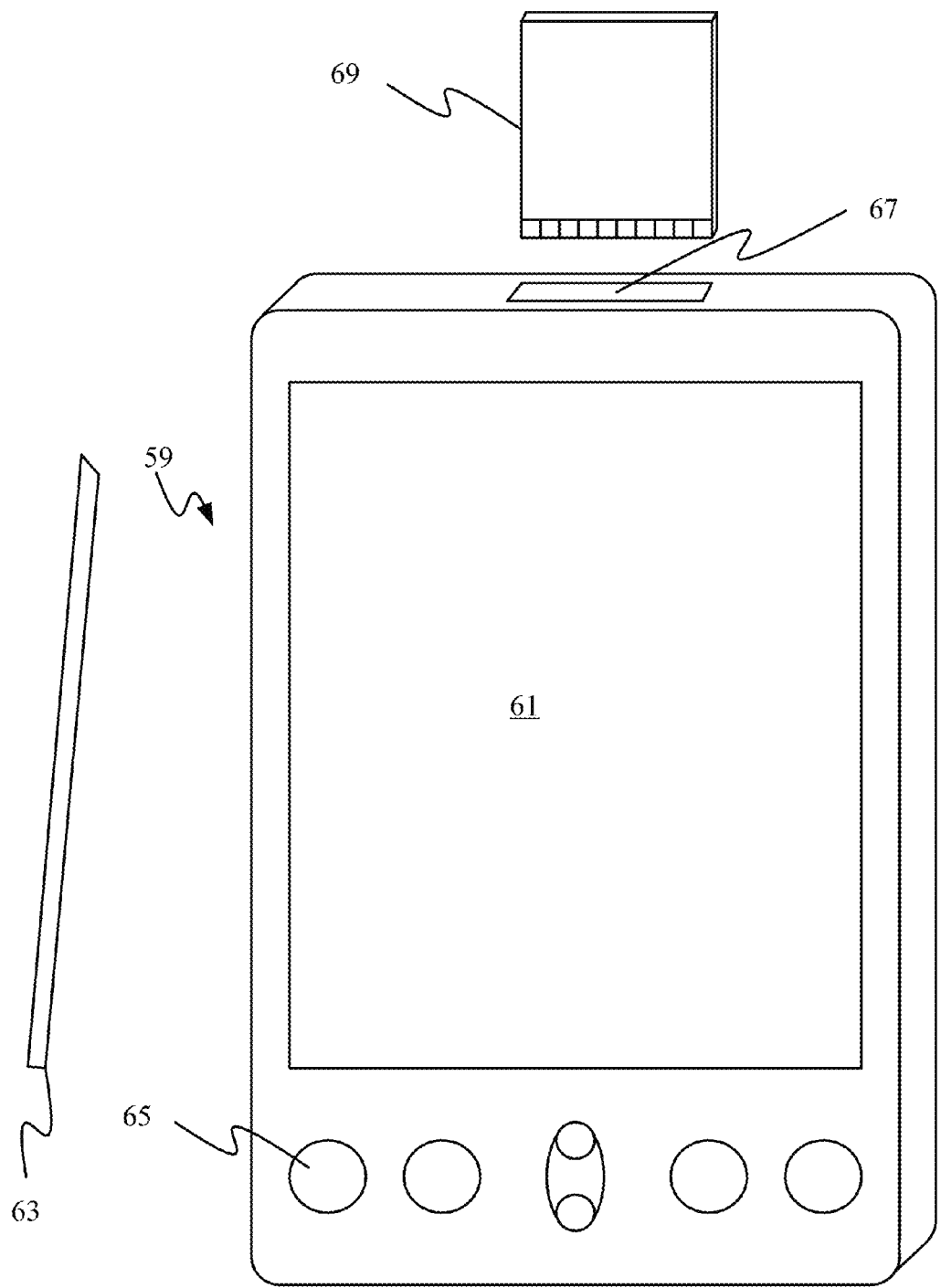

FIGS. 37 and 38 provide additional examples of devices 16 that can be used, although others can be used as well. In FIG. 37, a feature phone, smart phone or mobile phone 45 is provided as the device 16. Phone 45 includes a set of keypads 47 for dialing phone numbers, a display 49 capable of displaying images including application images, icons, web pages, photographs, and video, and control buttons 51 for selecting items shown on the display. The phone includes an antenna 53 for receiving cellular phone signals such as General Packet Radio Service (GPRS) and 1Xrtt, and Short Message Service (SMS) signals. In some embodiments, phone 45 also includes a Secure Digital (SD) card slot 55 that accepts a SD card 57.

The mobile device of FIG. 38 is a personal digital assistant (PDA) 59 or a multimedia player or a tablet computing device, etc. (hereinafter referred to as PDA 59). PDA 59 includes an inductive screen 61 that senses the position of a stylus 63 (or other pointers, such as a user's finger) when the stylus is positioned over the screen. This allows the user to select, highlight, and move items on the screen as well as draw and write. PDA 59 also includes a number of user input keys or buttons (such as button 65) which allow the user to scroll through menu options or other display options which are displayed on display 61, and allow the user to change applications or select user input functions, without contacting display 61. Although not shown, PDA 59 can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections. In one embodiment, mobile device 59 also includes a SD card slot 67 that accepts a SD card 69.

Figure 39:
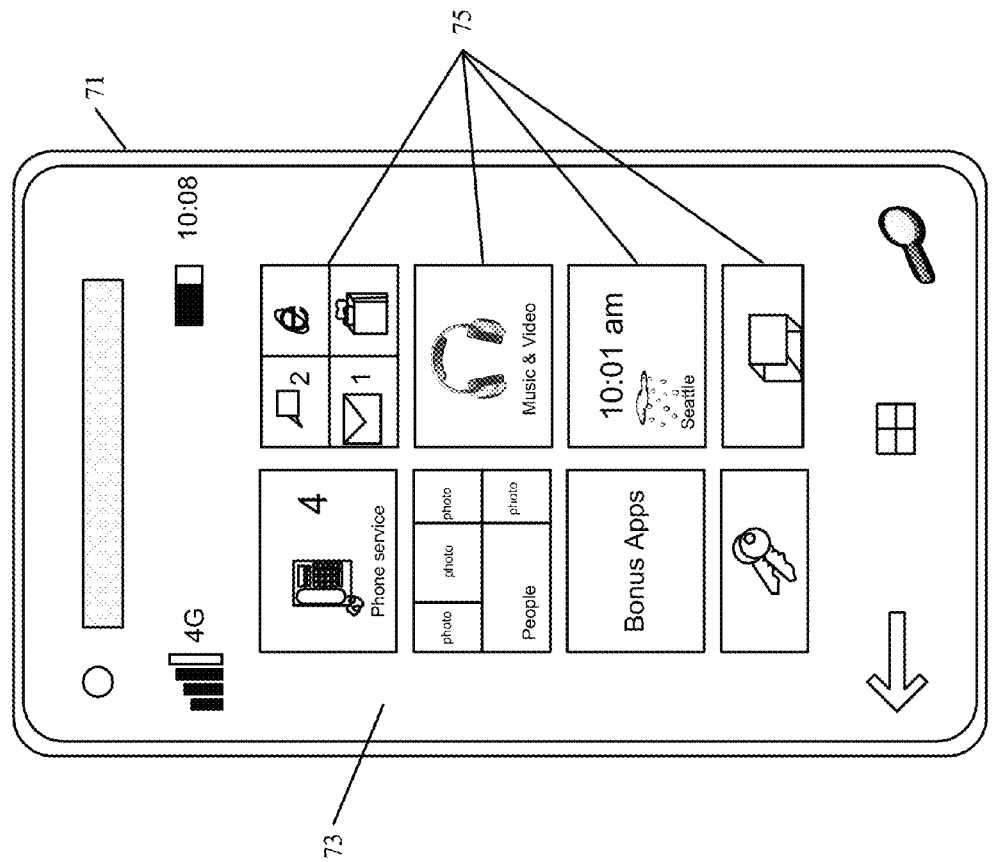
Figure 40:
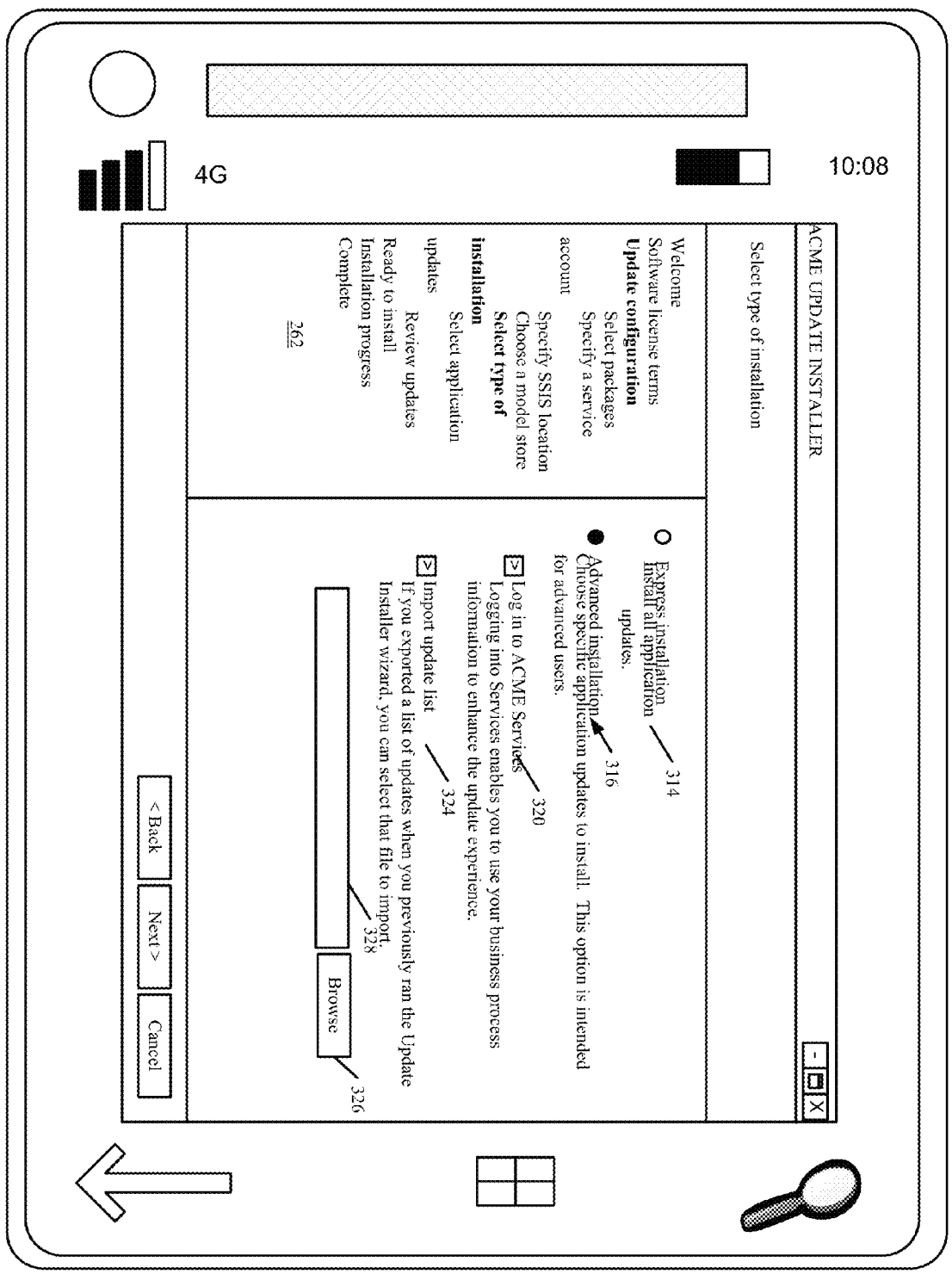

FIG. 39 is similar to FIG. 37 except that the phone is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone. FIG. 40 shows phone 71 with the user interface display from FIG. 12 displayed thereon.

Note that other forms of the devices 16 are possible.

Figure 41:
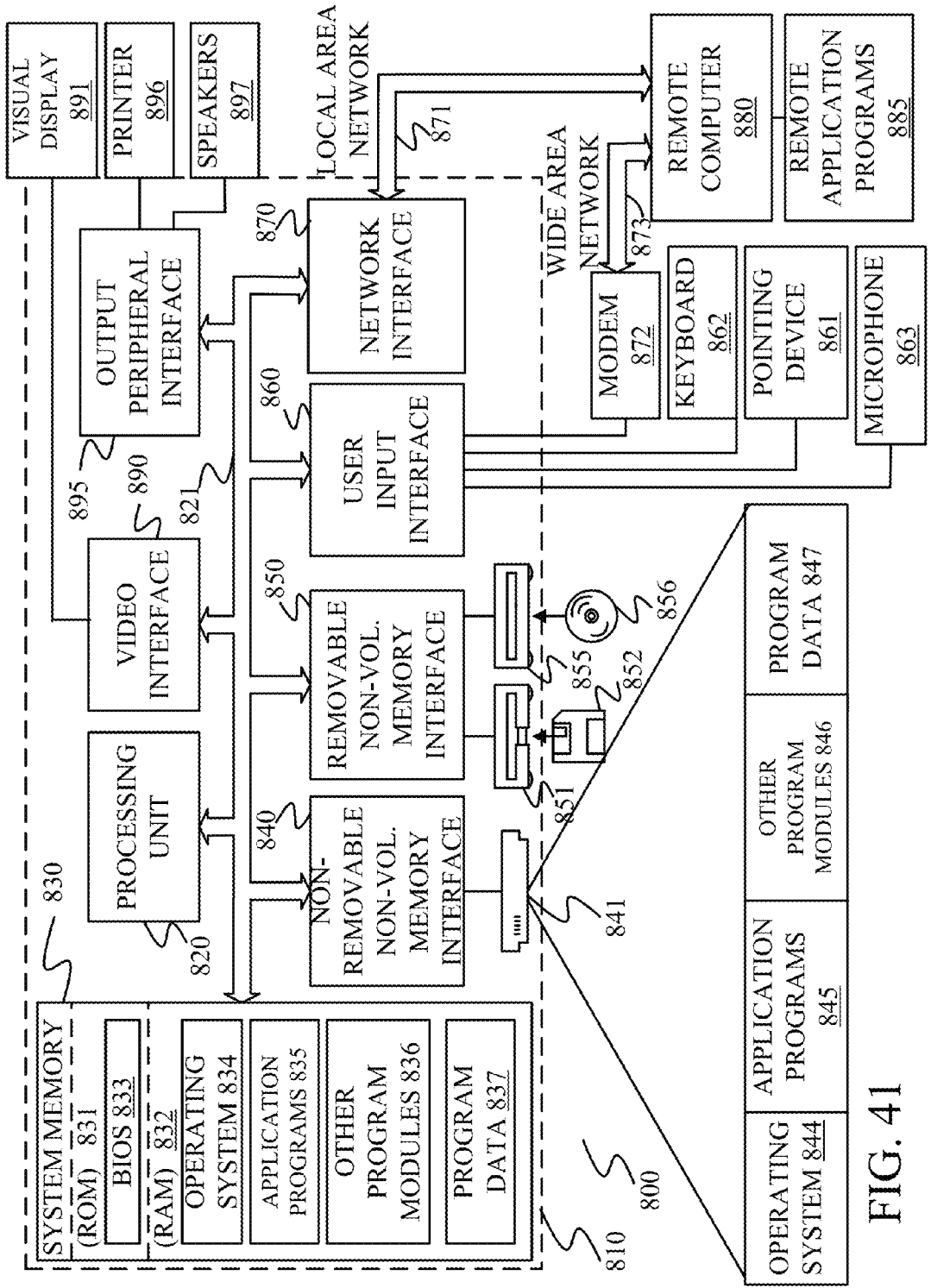
FIG. 41 is a block diagram of one illustrative computing environment.

FIG. 41 is one embodiment of a computing environment in which architecture 100, or parts of it, (for example) can be deployed. With reference to FIG. 41, an exemplary system for implementing some embodiments includes a general-purpose computing device in the form of a computer 810. Components of computer 810 may include, but are not limited to, a processing unit 820 (which can comprise processor 102 or the processor in system 200 or device 116), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 41.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 41 illustrates operating system 834, application programs 835, other program modules 836, and program data 837.

The computer 810 may also include other removable/non-removable volatile/nonvolatile computer storage media. By way of example only, FIG. 41 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 41, provide storage of computer readable instructions, data structures, program modules and other data for the computer 810. In FIG. 41, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 41 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 41 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method, comprising:
   receiving impact analysis information indicative of an impact of a plurality of application updates on a first environment on a computer system;
   generating a representation of a filter selection user input mechanism;
   receiving an indication of user actuation of the filter selection user input mechanism;
   based on the indication of user actuation of the filter selection user input mechanism, identifying filter criterion;
   applying the filter criterion to the plurality of application updates to identify a filtered set of application updates;
   generating a representation of an update selection user interface display that displays the filtered set of application updates and that displays an indication of the impact analysis information corresponding to the filtered set of application updates, the representation of the update selection user interface display including an update selection user input mechanism;
   receiving an indication of a user selection input through the update selection user input mechanism;
   based on the indication of the user selection input, selecting the set of application updates to install in the first environment;
   installing the set of application updates in the first environment based on the indication of the user selection input;
   generating a representation of an export user interface display with an export user input mechanism;
   receiving an indication of a user export input through the export user input mechanism that defines an export of the set of application updates; and
   saving the set of application updates for subsequent installation in a second environment based on the indication of the user export input, wherein the second environment is separate from the first environment.

2. The computer-implemented method of claim 1 and further comprising:
   generating a representation of an import user interface display with an import user input mechanism;
   receiving an indication of user actuation of the import user input mechanism to identify the selected set of application updates; and
   importing the selected set of application updates to the second environment for application to the second environment.

3. The computer-implemented method of claim 1 wherein saving comprises:
   generating a representation of an export location user interface display with a location user input mechanism;
   receiving an indication of actuation of the location user input mechanism that identifies an export location; and
   exporting the selected set of application updates to the identified export location.

4. The computer-implemented method of claim 1, and further comprising:
   generating a representation of a cumulative update package selection user interface display with a cumulative update selection user input mechanism; and
   receiving an indication of user actuation of the cumulative update user input mechanism to identify a cumulative update package that includes the plurality of application updates.

5. The computer-implemented method of claim 4 wherein generating a representation of a cumulative update package selection user interface display comprises:
   generating a representation of a packages display in a first display pane that shows available cumulative update packages; and
   generating a representation of a details display in a second display pane that displays details of a selected cumulative update package that is selected in the first pane prior to installation of the selected set of application updates in the first environment.

6. The computer-implemented method of claim 4 wherein generating a representation of an update selection user interface display comprises:
   generating a representation of an environment identifier user interface display with an environment identifier user input mechanism; and
   receiving an indication of user actuation of the environment identifier user input mechanism to identify the first environment.

7. The computer-implemented method of claim 4 wherein generating a representation of an update selection user interface display comprises:
   generating a representation of a search user interface display with a search user input mechanism to identify search criteria;
   receiving an indication of user actuation of the search user input mechanism; and
   generating a representation of a search results user interface display that indicates updates, in the identified cumulative update package, identified based on the search criteria.

8. The computer-implemented method of claim 1, wherein the filter criterion indicates a computing process in the computer system, and wherein the filtered updates comprise updates filtered based on impact on the computing process.

9. A computer system, comprising:
a processor; and
memory storing instructions executable by the processor, wherein the instructions configure the computer system to:
perform an impact analysis on a plurality of application updates to obtain impact analysis information that indicates a technical impact of the application updates on a first environment in the computer system;
generate a representation of a user interface display that displays the impact analysis information, the representation of the user interface display including a filter selection user input mechanism and an update selection user input mechanism;
receive an indication of a filter selection user input through the filter selection user input mechanism;
based on the indication of the filter selection user input, identify a filtered set of the application updates;
generate the representation of the user interface display to display the filtered set of application updates;
receive an indication of an update selection user input through the update selection user input mechanism selecting the set of application updates; and
install the selected set of application updates to an application in the first environment based on the indication of the user selection input; and
save the selected set of application updates for export to and installation in a second environment that is separate from the first environment.

10. The computer system of claim 9, wherein the instructions configure the computer system to:
generate an import user interface display that includes an environment identifier user interface display with an update identifier user input mechanism that is actuated to identify the second environment in which the application is to be updated by the selected application update.

11. The computer system of claim 10 wherein the instructions configure the computer system to:
generate an import user input mechanism each time an environment is identified so the selected update is used to update the application in different identified environments.

12. The computer system of claim 10 wherein the instructions configure the computer system to:
generate an update pane identifying the selected application update to be installed in the identified environment and a details pane that displays update details corresponding to the update selected in the update pane.

13. The computer system of claim 9, the impact analysis information being indicative of a technical impact of the plurality of application updates on the first environment, wherein the plurality of application updates are selected by the user selection input, installed in the first environment, and saved for export and installation in the second environment.

14. A computer-implemented method, comprising:
generating a representation of an environment identifier user interface display with an environment identifier user input mechanism;
receiving an indication of user actuation of the environment identifier user input mechanism to identify a first environment on a computer system;
generating a representation of a filter selection user input mechanism;
receiving an indication of user actuation of the filter selection user input mechanism;
based on the indication of user actuation of the filter selection user input mechanism, identifying filter criterion;
applying the filter criterion to a set of application updates from a cumulative update package to identify a subset of the application updates, that are filtered based on the filter criterion;
generating a representation of an update selection user interface display that displays impact analysis information for the subset of application updates and includes a selection user input mechanism, the impact analysis information indicating an impact of the subset on the first environment;
receiving an indication of a user selection input through the selection user input mechanism that selects the subset of application updates to install in the first environment;
based on the indication of the user selection input, using a computer processor to install the selected subset of application updates in the first environment;
generating a representation of an export user interface display with an export user input mechanism;
receiving an indication of a user export input through the export user input mechanism that defines an export of the selected subset of application updates for installation in a second environment that is separate from the first environment;
saving the selected subset of application updates;
generating a representation of an import user interface display with an import user input mechanism;
receiving an indication of a user import input, through the import user input mechanism, to install the selected subset of application updates in the second environment; and
installing the selected subset of application updates in the second environment based on the user import input.

15. The computer-implemented method of claim 14 wherein saving comprises:
generating a representation of an export location user interface display with a location user input mechanism that is actuated to identify an export location; and
exporting the selected subset of application updates to the identified export location.

16. The computer-implemented method of claim 14, the impact analysis information being indicative of an impact of a plurality of application updates from the cumulative update package, wherein the plurality of application updates are selected by the user selection input, installed in the first environment, and saved for export and installation in the second environment.

17. The computer-implemented method of claim 16 wherein generating a representation of an update selection user interface display comprises:
generating a representation of a search user interface display with a search user input mechanism to identify search criteria;
receiving an indication of user actuation of the search user input mechanism; and generating a representation of search results that are indicative of updates in the cumulative update package identified based on the search criteria.

\* \* \* \* \*